(12) United States Patent
Wang

(10) Patent No.: US 11,929,872 B2
(45) Date of Patent: Mar. 12, 2024

(54) METHOD FOR CONFIGURING HOME DEVICES IN BATCHES AND DEVICE

(71) Applicant: HUAWEI TECHNOLOGIES CO., LTD., Shenzhen (CN)

(72) Inventor: Ying Wang, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 18/043,725

(22) PCT Filed: Aug. 18, 2021

(86) PCT No.: PCT/CN2021/113267
§ 371 (c)(1),
(2) Date: Mar. 1, 2023

(87) PCT Pub. No.: WO2022/057558
PCT Pub. Date: Mar. 24, 2022

(65) Prior Publication Data
US 2023/0353450 A1 Nov. 2, 2023

(30) Foreign Application Priority Data
Sep. 18, 2020 (CN) .......................... 202010988445.0

(51) Int. Cl.
*H04L 12/24* (2006.01)
*H04L 41/0806* (2022.01)
(Continued)

(52) U.S. Cl.
CPC ...... *H04L 41/0806* (2013.01); *H04L 41/0893* (2013.01); *G16Y 10/80* (2020.01)

(58) Field of Classification Search
CPC . H04L 41/08; H04L 41/0803; H04L 41/0806; H04L 41/0893; H04L 41/22; G16Y 10/80
See application file for complete search history.

(56) References Cited

U.S. PATENT DOCUMENTS 10,148,495 B1 * 12/2018 Oczkowski ............. H04W 8/20
10,979,299 B1 * 4/2021 Askar ................. H04L 41/0806
(Continued)

FOREIGN PATENT DOCUMENTS

CN 107426722 A 12/2017
CN 108011726 A 5/2018
(Continued)

OTHER PUBLICATIONS

Written Opinion of the PCT International Search Authority for corresponding international application No. PCT/CN/2021/113267 (Year: 2021).*

*Primary Examiner* — Boris D Grijalva Lobos
(74) *Attorney, Agent, or Firm* — HUAWEI TECHNOLOGIES CO., LTD.

(57) ABSTRACT

An electronic device that has a first APP installed and includes a first antenna and a second antenna. The electronic device is configured to: display a first interface of the first APP; display a second interface in response to a first operation on the first interface; receive and display a quantity M set by a user on the second interface; receive and display a device type of M home devices that is set by the user on the second interface; request, in response to a second operation on the second interface, a cloud server to allocate a registration credential to the M home devices; broadcast, by using the first antenna, a first message including the registration credential, an SSID, and an access password, to indicate the M home devices to access a wireless local area network and register with the cloud server based on the registration credential.

20 Claims, 31 Drawing Sheets

(51) Int. Cl.
*H04L 41/0893*  (2022.01)
*G16Y 10/80*  (2020.01)

(56) References Cited

U.S. PATENT DOCUMENTS

| | | | |
|---|---|---|---|
| 2015/0358364 A1 | 12/2015 | Lee | |
| 2018/0054854 A1 | 2/2018 | Liu | |
| 2018/0262497 A1 | 9/2018 | Raje et al. | |
| 2019/0394278 A1* | 12/2019 | Fujimoto | G06Q 50/16 |
| 2020/0169460 A1* | 5/2020 | Bartlett | H04L 67/12 |
| 2021/0014675 A1* | 1/2021 | Li | H04W 48/10 |
| 2021/0257085 A1* | 8/2021 | Arumugam | H01L 21/823807 |
| 2021/0351929 A1* | 11/2021 | Palanisamy | G06K 7/1417 |
| 2022/0201473 A1* | 6/2022 | Alpert | H04B 10/116 |
| 2023/0353450 A1* | 11/2023 | Wang | H04L 41/0806 |

FOREIGN PATENT DOCUMENTS

| | | |
|---|---|---|
| CN | 108270464 A | 7/2018 |
| CN | 108667778 A | 10/2018 |
| CN | 109474692 A | 3/2019 |
| CN | 109714440 A | 5/2019 |
| CN | 110098984 A | 8/2019 |
| CN | 110213323 A | 9/2019 |
| CN | 110447146 A | 11/2019 |
| CN | 110519131 A | 11/2019 |
| CN | 110601870 A | 12/2019 |
| CN | 110740424 A | 1/2020 |
| CN | 110692280 B | 6/2023 |

\* cited by examiner

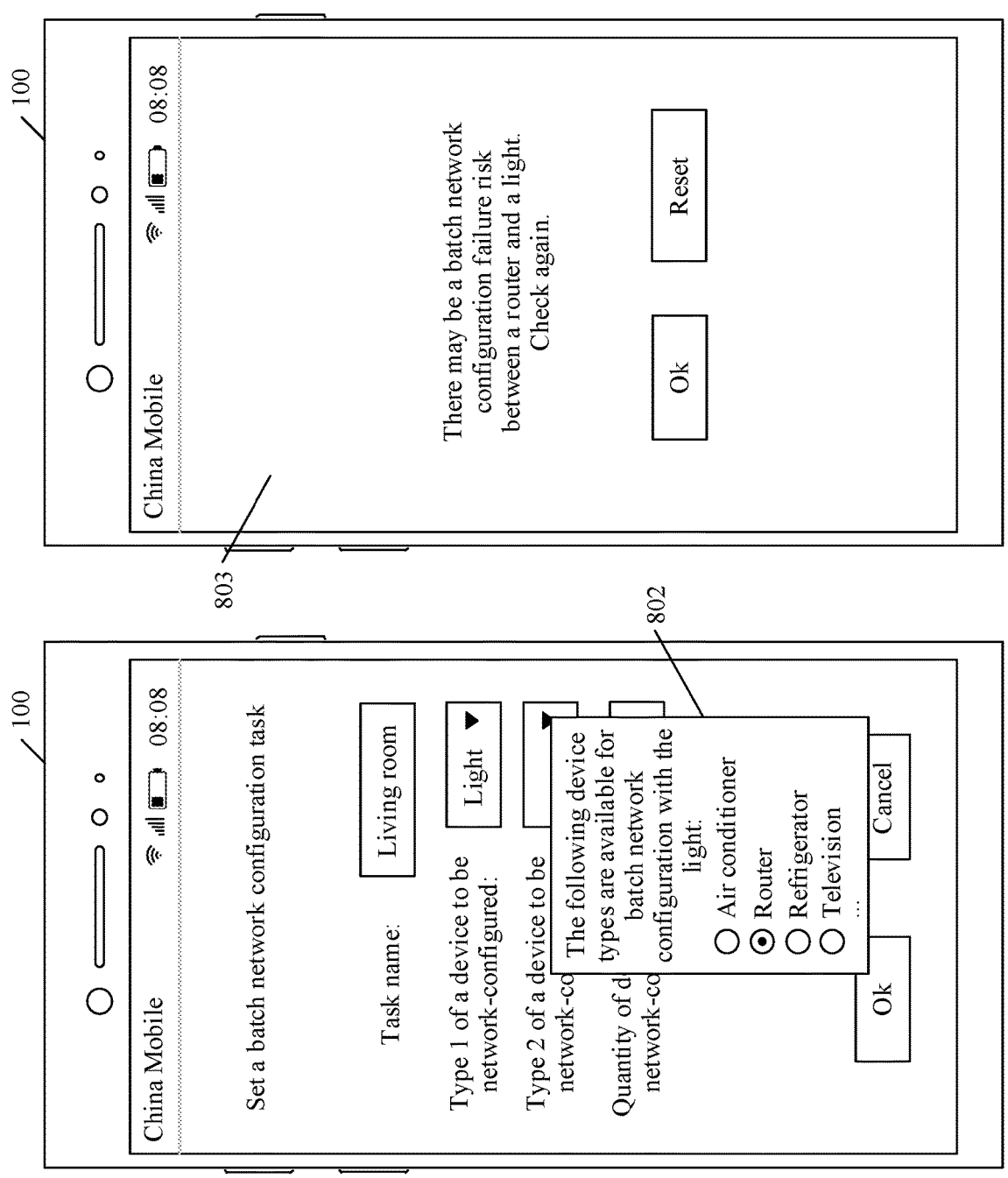

METHOD FOR CONFIGURING HOME DEVICES IN BATCHES AND DEVICE

CROSS REFERENCE TO RELATED APPLICATIONS

This application is a national stage of International Application No. PCT/CN2021/113267, filed on Aug. 18, 2021, which claims priority to Chinese Patent Application No. 202010988445.0, filed on Sep. 18, 2020 . Both of the aforementioned applications are incorporated herein by reference in their entireties.

TECHNICAL FIELD

Embodiments of this application relate to the communication field, and in particular, to a method for configuring home devices in batches, and devices.

BACKGROUND

With development of electronic information technologies, smart home devices gradually enter people's daily lives. The smart home device may use a house as a platform to integrate home devices related to home life for controlling over a wireless local area network like a wireless fidelity (Wireless Fidelity, Wi-Fi) network, to improve home security, convenience, and comfort.

Specifically, a smart home application (Application, APP) for controlling a home device may be installed in an electronic device (like a mobile phone or a tablet computer) of a user. A prerequisite for controlling the home device by using a management APP is that the home device has been configured with a network and registered with a home cloud of the smart home APP.

A network configuration and registration process of the home device may include the following four steps: (1) The home device enters a to-be-network-configured state, and broadcasts a Wi-Fi signal, so as to be discovered. (2) An electronic device (like a mobile phone) scans and discovers the home device by using a smart home APP. (3) The mobile phone establishes a Wi-Fi connection to the home device, and sends an SSID and a password of the wireless local area network to the home device, so that the home device connects to a router based on the SSID and the password. (4) The mobile phone assists the home device in registering with the home cloud of the smart home APP by using the smart home APP, and the home cloud allocates a device identifier device ID to the home device.

By using the foregoing solution, each home device needs to perform the foregoing four steps to complete network configuration and registration. Consequently, the network configuration and registration process of the home device is complex, and consumes a long period of time. In addition, when batch network configuration and registration is performed for a large quantity of home devices, the mobile phone needs to sequentially perform network configuration and registration for each of the large quantity of home devices in a serial manner. Consequently, network configuration and registration efficiency of the home devices is low.

SUMMARY

This application provides a method for configuring home devices in batches and devices, to simplify a network configuration and registration process of the home device, reduce time spent on network configuration and registration for the home device, and further improve efficiency of performing batch network configuration and registration for the home devices.

According to a first aspect, this application provides a method for configuring home devices in batches. The method may be used by an electronic device to perform batch network configuration for a plurality of home devices. A first APP is installed in the electronic device, and the electronic device includes a first antenna and a second antenna. A transmit distance of the first antenna is a first distance, a transmit distance of the second antenna is a second distance, and the first distance is less than the second distance.

In the method, the electronic device may display a first interface of the first APP. The first interface is used to trigger the electronic device to perform batch network configuration for the plurality of home devices. The electronic device may display a second interface in response to a first operation of a user on the first interface. The second interface is used to set a quantity and at least one device type of home devices to be network-configured. The device type of the home device is classified based on a function of the home device. Then, the electronic device may receive and display a quantity M that is set by the user on the second interface, and receive and display a device type of M home devices that is set by the user on the second interface, where M≥2, and M is a positive integer. Then, the electronic device may request a cloud server to allocate a registration credential to the M home devices in response to a second operation of the user on the second interface. The cloud server is a server of the first APP. Finally, the electronic device may broadcast a first message by using the first antenna. The first message includes the registration credential, and a service set identifier (service set identifier, SSID) and an access password of a wireless local area network. The first message is used to indicate the M home devices to access the wireless local area network and register with the cloud server based on the registration credential.

It should be noted that before the method in this application is performed, the user may control all home devices to be network-configured to be powered on, and put all the home devices to be network-configured together. After being powered on, the home device to be network-configured home device may start a wireless communication module, to receive network configuration data from the electronic device. All home devices to be network-configured are put together, so that it can be convenient for the user to use the electronic device to separately approach the home devices to be network-configured, and implement batch network configuration for the home devices in a manner in which the electronic device approaches the home device at a short distance (for example, within 30 millimeters) in a short time (for example, 1 second).

According to the method in this application, the electronic device can be supported in performing batch network configuration for the M home devices at a time. For example, all the M home devices whose distances to the electronic device are less than the first distance may receive the first message broadcast by the electronic device by using the first antenna. In this way, the M home devices may access the wireless local area network based on the SSID and the access password in the first message, and register with the cloud server based on the registration credential.

According to the method in this application, a network configuration registration process of the home device can be simplified, time spent on network configuration and registration for the home device can be reduced, and efficiency of performing batch network configuration registration for the home device can be improved.

In a possible design manner of the first aspect, the method further includes: The electronic device displays a third interface in response to the second operation of the user on the second interface. The third interface includes a first icon of each of the M home devices and first state information of each home device. The first icon is a general icon of home devices of a same device type, and the first state information is used to indicate that the home device is in a to-be-network-configured state.

The third interface displayed by the electronic device in response to the second operation includes a general icon of each of the M home devices. Home devices of different device types have different general icons. For example, an air conditioner and a refrigerator have different general icons. The electronic device displays the general icon of the home device, so that the user can easily identify the device type of the home device to be network-configured.

The third interface further includes state information of each home device, for example, the first state information. The user may determine, by using the first state information, that the home device is in a to-be-network-configured state.

In another possible design manner of the first aspect, after that the electronic device broadcasts a first message by using the first antenna, the method in this embodiment of this application may further include: The electronic device receives a first response message from a first home device; and the electronic device updates first state information of the first home device on the third interface to second state information in response to the first response message, where the second state information is used to indicate that network configuration is being performed for the first home device. The first response message is sent after the first home device receives the first message, and the first home device is any one of the M home devices.

The first response message is sent after the first home device receives the first message. After receiving the first message, the first home device may access the wireless local area network based on the SSID and the access password in the first message, and then register with the cloud server based on the registration credential. In other words, after the first home device receives the first message, network configuration and registration may be performed, that is, network configuration is being performed for the first home device. Therefore, after receiving the first response message, the electronic device may update the first state information of the first home device to the second state information, to indicate that network configuration is being performed for the first home device.

In this design manner, the electronic device may update a network configuration state of the home device in time. For example, the first state information (for example, "to be network-configured") is updated to the second state information (for example, "being network-configured") in time. In this way, it can be convenient for the user to learn a network configuration progress of the home device, and user experience in a network configuration process of the home device can be improved.

In another possible design manner of the first aspect, after the first home device successful registers with the cloud server, the cloud server may send first configuration information of the first home device to the electronic device, so that the electronic device can update an icon and state information of the first home device.

Specifically, the electronic device may receive the first configuration information of the first home device from the cloud server. The first configuration information includes a second icon of the first home device. The first configuration information is determined based on a product type of the first home device, and home devices of different product types have different first configuration information. The second icon is a dedicated icon of home devices of a same product type. Then, the electronic device may update a first icon of the first home device on the third interface to the second icon, and update the first state information or the second state information of the first home device to third state information. The third state information is used to indicate that network configuration for the home device succeeds, and the second state information is used to indicate that network configuration is being performed for the first home device.

Home devices of different product types have different second icons (that is, dedicated icons). The electronic device updates the first icon (that is, the general icon) of the first home device on the third interface to the second icon (that is, the dedicated icon), so that the user can easily identify the product type of the first home device.

In this design manner, the electronic device may update a network configuration state of the home device in time. For example, the second state information (for example, "being network-configured") is updated to the third state information (for example, "network configuration succeeds") in time. In this way, it can be convenient for the user to learn a network configuration progress of the home device, and user experience in a network configuration process of the home device can be improved.

In another possible design manner of the first aspect, the method further includes: If the electronic device does not receive the first configuration information of the first home device from the cloud server within second preset duration starting from broadcasting the first message, the electronic device updates the first state information or the second state information of the first home device on the third interface to fourth state information. The fourth state information is used to indicate that network configuration for the first home device fails.

It should be understood that there is a relatively high probability that network configuration for the first home device fails if the electronic device does not receive the first configuration information of the first home device from the cloud server within the second preset duration starting from broadcasting the first message. In this case, the electronic device updates the first state information or the second state information of the first home device to the fourth state information, to indicate, to the user, that network configuration for the first home device fails. In this way, the user can learn a network configuration state of the first home device in time, and determine whether to perform network configuration for the first home device again.

In another possible design manner of the first aspect, the first configuration information further includes an interface element and a control instruction that are used by the electronic device to remotely control a control page of the first home device via the first APP. The method in this embodiment of this application further includes: The electronic device controls the first home device by using the first APP based on the control page and the control instruction of the first home device.

For example, the electronic device may display the control page of the first home device, interact with the user by using the control page of the first home device, and send the control instruction to the first home device to control the first home device.

In another possible design manner of the first aspect, the electronic device may further receive a third operation performed by the user on the third interface, where the third operation is used to trigger the electronic device to exit displaying of the third interface; and in response to the third operation, the electronic device stops broadcasting the first message. In other words, after exiting the third interface, the electronic device may stop broadcasting the first message, to stop a network configuration process of the M home devices.

In another possible design manner of the first aspect, the electronic device may request, in the following manner, a cloud server to allocate a registration credential to the M home devices: in response to the second operation, the electronic device sends a first request to the cloud server, where the first request is used to request the cloud server to allocate the registration credential to the M home devices; and the electronic device receives a first response from the cloud server, where the first response includes the registration credential.

In another possible design manner of the first aspect, the electronic device may determine whether the electronic device stores a first icon corresponding to the device type of the M home devices. If the electronic device stores the first icon corresponding to the device type of the M home devices, the electronic device may display the first icon stored in the electronic device.

In another possible design manner of the first aspect, the electronic device may obtain, from a cloud server, second configuration information including the first icon of the M home devices. Specifically, the first request includes indication information of the device type of the M home devices, and the first request is further used to obtain the first icon of the M home devices from the cloud server based on the indication information of the device type of the M home devices. The first response further includes second configuration information of the M home devices, and the second configuration information includes the first icon of the M home devices.

In another possible design manner of the first aspect, the electronic device may obtain, from a cloud server, second configuration information including the first icon of the M home devices only when the electronic device does not store the first icon corresponding to the device type of the M home devices.

In another possible design manner of the first aspect, the first request further includes a quantity M of home devices to be network-configured. In this way, the cloud server may determine that the M home devices to be network-configured need to register with the cloud server by using the registration credential. In this case, when an (M+1)th home device registers with the cloud server by using the registration credential, the cloud server may reject a registration request of the (M+1)th home device.

In another possible design manner of the first aspect, the first request further includes a first account used by the electronic device to log in to the first APP. The registration request further includes the first account.

The first request includes the first account. The first account may be used by the cloud server to perform authentication on the home device that requests registration, and determine whether the registration request initiated by the home device is triggered by the electronic device using the first account to log in to.

In another possible design manner of the first aspect, the electronic device may actively obtain, from a cloud server, first configuration information of a home device for which network configuration succeeds. Specifically, before that the electronic device receives first configuration information of the first home device from the cloud server, the method in this application further includes: The electronic device sends a second request to the cloud server, where the second request includes a first account used by the electronic device to log in to the first APP.

That the electronic device receives first configuration information of the first home device from the cloud server includes: The electronic device receives a second response from the cloud server, where the second response includes a device identifier and first configuration information of a home device that registers with the cloud server by using the first account, and the home device that registers with the cloud server by using the first account includes the first home device.

According to a second aspect, this application provides a method for configuring home devices in batches. The method may be used by an electronic device to perform batch network configuration for a plurality of home devices. The electronic device includes a first antenna and a second antenna. A transmit distance of the first antenna is a first distance, a transmit distance of the second antenna is a second distance, and the first distance is less than the second distance. The electronic device is applied to a home device.

In the foregoing method, the home device may receive a first message from the electronic device. The first message is sent by the electronic device by using the first antenna, and the first message includes a registration credential, and an SSID and an access password of a wireless local area network. The home device may access the wireless local area network by using the SSID and the access password, and then send a registration request to a cloud server by using the wireless local area network, to request to register with the cloud server. The registration request includes the registration credential, indication information of a product type of the home device, and a product serial number (serial number, SN) of the home device.

In this application, all home devices whose distances to the electronic device are less than the first distance can receive the first message. In this way, all home devices that receive the first message can perform the method in the second aspect for network configuration and registration. In other words, according to the method in this application, the electronic device can be supported in performing batch network configuration for the M home devices at a time. According to the method in this application, a network configuration registration process of the home device can be simplified, time spent on network configuration and registration for the home device can be reduced, and efficiency of performing batch network configuration registration for the home device can be improved.

In another possible design manner of the second aspect, the method further includes: After receiving the first message, the home device sends a first response message to the electronic device, where the first response message is used to indicate that network configuration is being performed for the home device.

In another possible design manner of the second aspect, the first message further includes a first account used by the electronic device to log in to a first application APP, and the registration request further includes the first account.

It may be understood that, for beneficial effects that can be achieved by the method in the second aspect and any possible design manner of the second aspect, refer to beneficial effects in the first aspect and any possible design manner of the first aspect. Details are not described herein again.

According to a third aspect, this application provides a method for configuring home devices in batches. The method may be applied to a cloud server. The cloud server may receive a first request from an electronic device, where the first request includes a device type of M home devices, M≥2, and M is a positive integer; the cloud server allocates a first registration credential to the M home devices in response to the first request, and obtains second configuration information of the M home devices based on the device type of the M home devices, where the second configuration information of the M home devices includes a first icon of the M home devices, and the first icon is a general icon of home devices of a same device type; the cloud server sends a first response to the electronic device, where the first response includes the registration credential and the second configuration information of the M home devices; the cloud server receives a registration request from a first home device, where the first home device is any one of the M home devices, and the registration request includes a second registration credential and a product serial number SN of the home device; and the cloud server allocates a device identifier to the first home device if authentication of the first home device succeeds, where that authentication of the first home device succeeds includes that the second registration credential is the same as the first registration credential.

In a possible design manner of the third aspect, the registration request further includes indication information of a product type of the home device. After that the cloud server allocates a device identifier to the first home device, the method further includes: The cloud server sends first configuration information and the device identifier of the first home device to the electronic device, where the first configuration information includes a second icon of the first home device, the first configuration information is determined based on a product type of the first home device, home devices of different product types have different first configuration information, and the second icon is a dedicated icon of home devices of a same product type.

In another possible design manner of the third aspect, the first request further includes a first account used by the electronic device to log in to a first APP, the registration request further includes a second account, and the second account is obtained by the first home device from a first message from the electronic device. That authentication of the first home device succeeds further includes: The second account is the same as the first account.

In another possible design manner of the third aspect, before that the cloud server sends first configuration information and the device identifier of the first home device to the electronic device, the method in this application further includes: The cloud server receives a second request from the electronic device, where the second request includes the first account. That the cloud server sends first configuration information and the device identifier of the first home device to the electronic device includes: The cloud server sends a second response to the electronic device, where the second response includes a device identifier and first configuration information of a home device that registers with the cloud server by using the first account, and the home device that registers with the cloud server by using the first account includes the first home device.

In another possible design manner of the third aspect, that authentication of the first home device succeeds further includes at least one of the following conditions: The second registration credential falls within a preset validity period; and the first home device is an $(M-i)^{th}$ home device that registers with the cloud server by using the first account, where i≥0, i is an integer, and the first request further includes a quantity M.

It may be understood that, for beneficial effects that can be achieved by the method in the third aspect and any possible design manner of the third aspect, refer to beneficial effects in the first aspect and any possible design manner of the first aspect. Details are not described herein again.

According to a fourth aspect, this application provides a method for configuring home devices in batches. The method may be used by an electronic device to perform batch network configuration for a plurality of home devices. A first APP is installed in the electronic device, and the electronic device includes a first antenna and a second antenna. A transmit distance of the first antenna is a first distance, a transmit distance of the second antenna is a second distance, and the first distance is less than the second distance.

In the foregoing method, the electronic device may display a first interface of the first APP. The first interface is used to trigger the electronic device to perform batch network configuration for the plurality of home devices. The electronic device may display a second interface in response to a first operation of a user on the first interface. The second interface is used to set a quantity and at least one device type of home devices to be network-configured, and the device type of the home device is classified based on a function of the home device.

Then, the electronic device may receive and display a quantity M that is set by the user on the second interface, and receive and display a device type of M home devices that is set by the user on the second interface, where M≥2, and M is a positive integer. The electronic device may request a cloud server to allocate a registration credential to the M home devices in response to a second operation of the user on the second interface. The cloud server is a server of the first APP.

Subsequently, the electronic device may broadcast a first message by using the first antenna. The first message includes the registration credential, a service set identifier SSID and an access password of a wireless local area network. A distance between each of the M home devices and the electronic device is less than the first distance. Therefore, the M home devices may receive the first message. After receiving the first message from the electronic device, any one of the M home devices (for example, a first home device) may access the wireless local area network by using the SSID and the access password.

Then, the first home device may send a registration request to the cloud server by using the wireless local area network, where the registration request includes the registration credential and an SN of the home device. After the cloud server receives the registration request from the first home device, if authentication of the first home device succeeds, the cloud server may allocate a device identifier to the first home device. In this way, a network configuration and registration process for the home device can be completed. That authentication of the first home device succeeds includes: That authentication of the first home device succeeds includes that the registration credential in the registration request is the same as the registration credential allocated by the cloud server to the M home devices.

In a possible design manner of the fourth aspect, the registration request further includes indication information of a product type of the home device. The method further includes: The electronic device displays a third interface in response to the second operation. The third interface includes a first icon of each of the M home devices and first state information of each home device, the first icon is a general icon of home devices of a same device type, and the first state information is used to indicate that the home device is in a to-be-network-configured state.

After that the cloud server allocates a device identifier to the first home device, the method in this application further includes: The cloud server sends first configuration information and the device identifier of the first home device to the electronic device; the electronic device receives the first configuration information of the first home device from the cloud server; and the electronic device updates a first icon of the first home device on the third interface to the second icon, and updates state information of the first home device to third state information.

The first configuration information includes a second icon of the first home device, the first configuration information is determined based on a product type of the first home device, home devices of different product types have different first configuration information, and the second icon is a dedicated icon of home devices of a same product type. The third state information is used to indicate that network configuration for the home device succeeds, and second state information is used to indicate that network configuration is being performed for the first home device.

In another possible design manner of the fourth aspect, after that a first home device in the M home devices receives the first message from the electronic device, the method in this application further includes: The first home device sends a first response message to the electronic device, where the first response message is used to indicate that network configuration is being performed for the home device; the electronic device receives the first response message from the first home device; the electronic device updates the first state information of the first home device on the third interface to the second state information in response to the first response message, where the second state information is used to indicate that network configuration is being performed for the first home device.

That the electronic device updates state information of the first home device to third state information includes: The electronic device updates the second state information of the first home device on the third interface to the third state information.

In another possible design manner of the fourth aspect, before that the electronic device displays a third interface, the method in this application further includes: The electronic device sends a first request to the cloud server in response to the second operation, where the first request includes the device type of the M home devices; the cloud server receives the first request from the electronic device; the cloud server allocates the registration credential to the M home devices in response to the first request, and obtains second configuration information of the M home devices based on the device type of the M home devices, where the second configuration information of the M home devices includes the first icon of the M home devices, and the first icon is a general icon of home devices of a same device type; and the cloud server sends a first response to the electronic device, where the first response includes the registration credential and the second configuration information of the M home devices.

In another possible design manner of the fourth aspect, the first message further includes a first account used by the electronic device to log in to a first application APP, and the registration request further includes the first account.

That authentication of the first home device succeeds further includes: A first account included in the first request is the same as the first account included in the registration request.

In another possible design manner of the fourth aspect, before that the cloud server sends first configuration information and the device identifier of the first home device to the electronic device, the method in this application further includes: The electronic device sends a second request to the cloud server, where the second request includes the first account; and the cloud server receives the second request from the electronic device.

That the cloud server sends first configuration information and the device identifier of the first home device to the electronic device may specifically include: The cloud server sends a second response to the electronic device. The second response includes a device identifier and first configuration information of a home device that registers with the cloud server by using the first account, and the home device that registers with the cloud server by using the first account includes the first home device.

That the electronic device receives the first configuration information of the first home device from the cloud server includes: The electronic device receives the second response from the cloud server In another possible design manner of the fourth aspect, that authentication of the first home device succeeds further includes at least one of the following conditions: The registration credential falls within a preset validity period; and the first home device is an $(M-i)^{th}$ home device that registers with the cloud server by using the first account, where $i \geq 0$, i is an integer, and the first request further includes a quantity M.

In another possible design manner of the fourth aspect, the method in this application further includes: If the electronic device does not receive the first configuration information of the first home device from the cloud server within second preset duration starting from broadcasting the first message, the electronic device updates the state information of the first home device on the third interface to fourth state information. The fourth state information is used to indicate that network configuration for the first home device fails.

It may be understood that, for beneficial effects that can be achieved by the method in the fourth aspect and any possible design manner of the fourth aspect, refer to beneficial effects in the first aspect and any possible design manner of the first aspect. Details are not described herein again.

According to a fifth aspect, this application provides an electronic device, where a first APP is installed in the electronic device, and the electronic device includes a memory, a display, a communication module, and one or more processors. The memory, the display, and the communication module are coupled to the processor. The display is configured to display an image or an interface generated by the processor, the communication module is configured to communicate with another device, and the memory is configured to store data in the electronic device. The memory is further configured to store computer program code. The computer program code includes computer instructions, and when the computer instructions are executed by the processor, the electronic device is enabled to perform the method performed by the electronic device in the first aspect or the fourth aspect and any possible design manner of the first aspect or the fourth aspect.

According to a sixth aspect, this application provides a home device. The home device includes a memory, a communication module, and one or more processors. The communication module includes a first antenna and a second antenna. A transmit distance of the first antenna is a first distance, a transmit distance of the second antenna is a second distance, and the first distance is less than the second distance. The memory and the communication module are coupled to the processor. The communication module is configured to communicate with another device, and the memory is configured to store data in the home device. The memory is further configured to store computer program code. The computer program code includes computer instructions. When the computer instructions are executed by the processor, the home device is enabled to perform the method performed by the home device in the second aspect or the fourth aspect and any possible design manner of the second aspect or the fourth aspect.

According to a seventh aspect, this application provides a cloud server. The cloud server includes a memory, a communication module, and one or more processors. The memory and the communication module are coupled to the processor. The communication module is configured to communicate with another device, and the memory is configured to store data in the cloud server. The memory is further configured to store computer program code. The computer program code includes computer instructions. When the computer instructions are executed by the processor, the cloud server is enabled to perform the method performed by the cloud server in the third aspect or the fourth aspect and any possible design manner of the third aspect or the fourth aspect.

According to an eighth aspect, this application provides a chip system. The chip system is applied to an electronic device including a display, a communication module, and a memory. The chip system includes one or more interface circuits and one or more processors. The interface circuit is interconnected to the processor by using a line. The interface circuit is configured to receive a signal from the memory, and send the signal to the processor. The signal includes computer instructions stored in the memory. When the processor executes the computer instructions, the electronic device performs the method performed by the electronic device in the first aspect or the fourth aspect and any possible design manner of the first aspect or the fourth aspect.

According to a ninth aspect, this application provides a chip system. The chip system is applied to a home device including a communication module and a memory. The communication module includes a first antenna and a second antenna, a transmit distance of the first antenna is a first distance, a transmit distance of the second antenna is a second distance, and the first distance is less than the second distance. The chip system includes one or more interface circuits and one or more processors. The interface circuit and the processor are interconnected by using a line. The interface circuit is configured to receive a signal from the memory, and send the signal to the processor, and the signal includes computer instructions stored in the memory. When the processor executes the computer instructions, the home device performs the method performed by the home device in the second aspect or the fourth aspect and any possible design manner of the second aspect or the fourth aspect.

According to a tenth aspect, this application provides a chip system. The chip system is applied to a cloud server including a communication module, and a memory. The chip system includes one or more interface circuits and one or more processors. The interface circuit is interconnected to the processor by using a line. The interface circuit is configured to receive a signal from the memory, and send the signal to the processor. The signal includes computer instructions stored in the memory. When the processor executes the computer instructions, the cloud server performs the method performed by the cloud server in the third aspect or the fourth aspect and any possible design manner of the third aspect or the fourth aspect.

According to an eleventh aspect, an embodiment of this application provides a computer storage medium. The computer storage medium includes computer instructions, and when the computer instruction runs on a device, the device is enabled to perform the method in the first aspect, the second aspect, the third aspect or the fourth aspect and any possible design manner of the first aspect, the second aspect, the third aspect, or the fourth aspect. The device may be the foregoing electronic device, home device, or cloud server.

According to a twelfth aspect, an embodiment of this application provides a computer program product. When the computer program product runs on a computer, the computer is enabled to perform the method in the first aspect, the second aspect, the third aspect or the fourth aspect and any possible design manner of the first aspect, the second aspect, the third aspect or the fourth aspect. The computer may be the foregoing electronic device, home device, or cloud server.

It may be understood that for beneficial effects that can be achieved by the electronic device according to the fifth aspect, the home device according to the sixth aspect, the cloud server according to the seventh aspect, the chip system according to the eighth aspect to the tenth aspect, the computer storage medium according to the eleventh aspect, and the computer program product according to the twelfth aspect, refer to beneficial effects in the first aspect and any possible design manner of the first aspect. Details are not described herein again.

BRIEF DESCRIPTION OF DRAWINGS

FIG. 8A to FIG. 8E are schematic diagrams of other display interfaces of an electronic device according to an embodiment of this application;

FIG. 9B-1 to FIG. 9B-3 are a flowchart of another method for configuring home devices in batches according to an embodiment of this application;

DESCRIPTION OF EMBODIMENTS

The terms "first" and "second" mentioned below are merely intended for a purpose of description, and shall not be understood as an indication or implication of relative importance or implicit indication of a quantity of indicated technical features. Therefore, a feature limited by "first" or "second" may explicitly or implicitly include one or more features. In the descriptions of embodiments, unless otherwise specified, "a plurality of" means two or more.

An embodiment of this application provides a method for configuring home devices in batches. The method is used by an electronic device to interact with a plurality of home devices (for example, home devices), to implement network configuration and registration for the plurality of home devices.

Figure 1:
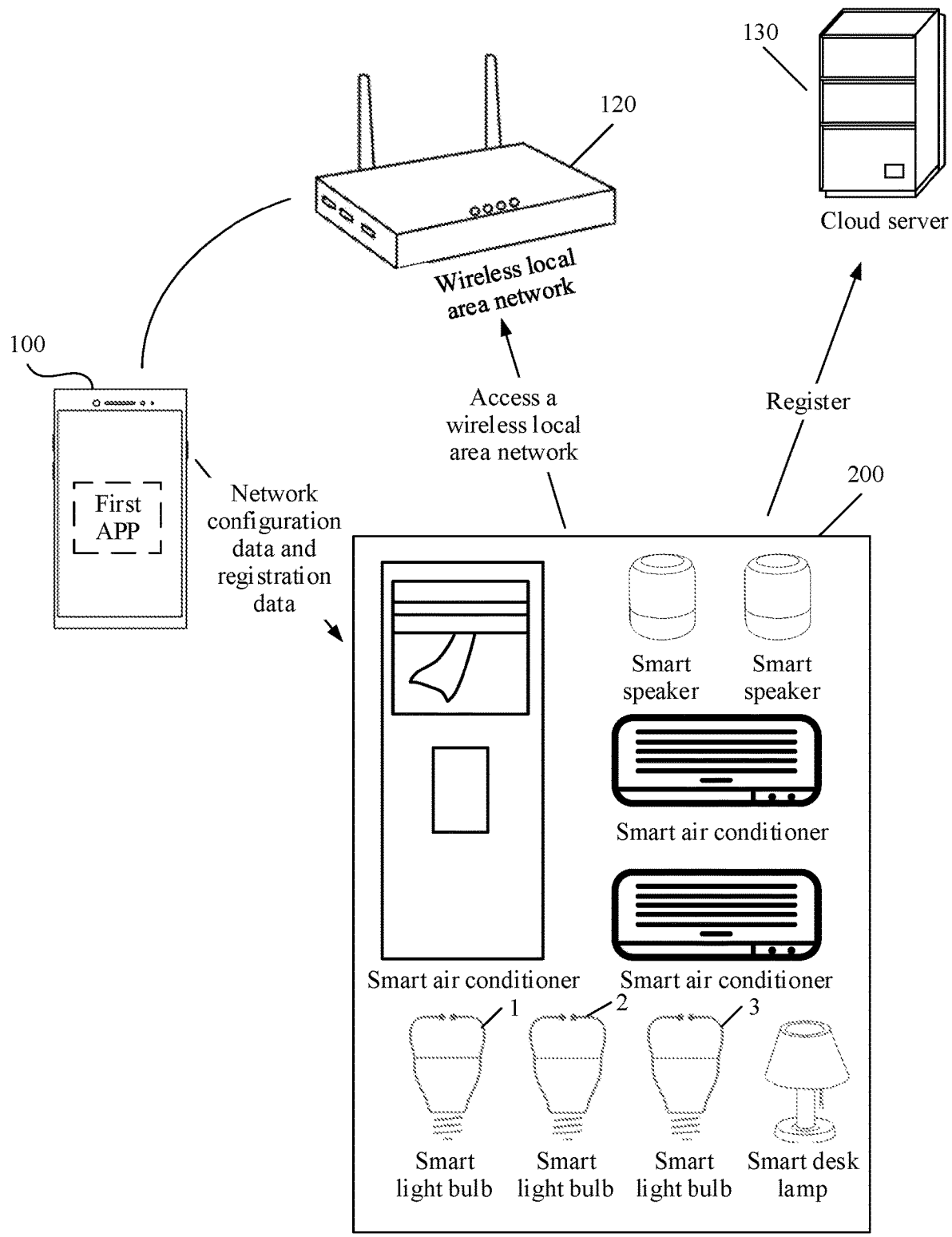
FIG. 1 is a schematic diagram of a communication system to which a method for configuring home devices in batches is applied according to an embodiment of this application.

FIG. 1 is a schematic diagram of a communication system to which a method for configuring home devices in batches is applied according to an embodiment of this application. As shown in FIG. 1, the communication system may include an electronic device 100 (such as a mobile phone), a plurality of home devices 200, a router 120, and a cloud server 130.

A first APP (also referred to as a smart home APP, a home APP, or a management APP) configured to manage a home device may be installed in the electronic device 100. The electronic device 100 may support batch network configuration and registration for a plurality of home devices 200 by using the first APP. The cloud server 130 is a server of the first APP, and is configured to manage the plurality of home devices 200. In this embodiment of this application, the home device is an internet of things (internet of things, IoT) device, and the cloud server 130 is an IoT server.

The router 120 may provide a wireless local area network, for example, a home wireless local area network. The electronic device 100 may access the wireless local area network provided by the router 120, and may further obtain an SSID and an access password of the wireless local area network. The electronic device 100 may further transmit network configuration data and registration data to the home device 200.

For example, the network configuration data may include the SSID and the access password of the wireless local area network, and the registration data may include a token (Token) used for authentication between the home device 200 and the cloud server 130, an SN of the home device 200, and the like.

The home device 200 may access, by using the SSID and the access password, the wireless local area network provided by the router 120, and then registers with the cloud server 130 by using the registration data, to complete a network configuration and registration process of the home device.

For example, the home device 200 may be any smart home device such as a smart air conditioner, a smart speaker, a smart light bulb, a smart television, a smart camera, a smart fan, an electric cooker, or a body fat scale. A specific form of the home device 200 is not limited herein in this embodiment of this application.

For example, the electronic device in this embodiment of this application may be a mobile phone, a tablet computer, a laptop, a wearable device (such as a smartwatch), a handheld computer, a notebook computer, an ultra-mobile personal computer (ultra-mobile personal computer, UMPC), a netbook, a cellular phone, or a personal digital assistant (personal digital assistant, PDA), a device that includes a display and a short-range communication module, such as an augmented reality (augmented reality, AR)/virtual reality (virtual reality, VR) device. A specific form of the electronic device is not specially limited in this embodiment of this application. The speaker may be a smart speaker.

Figure 2:
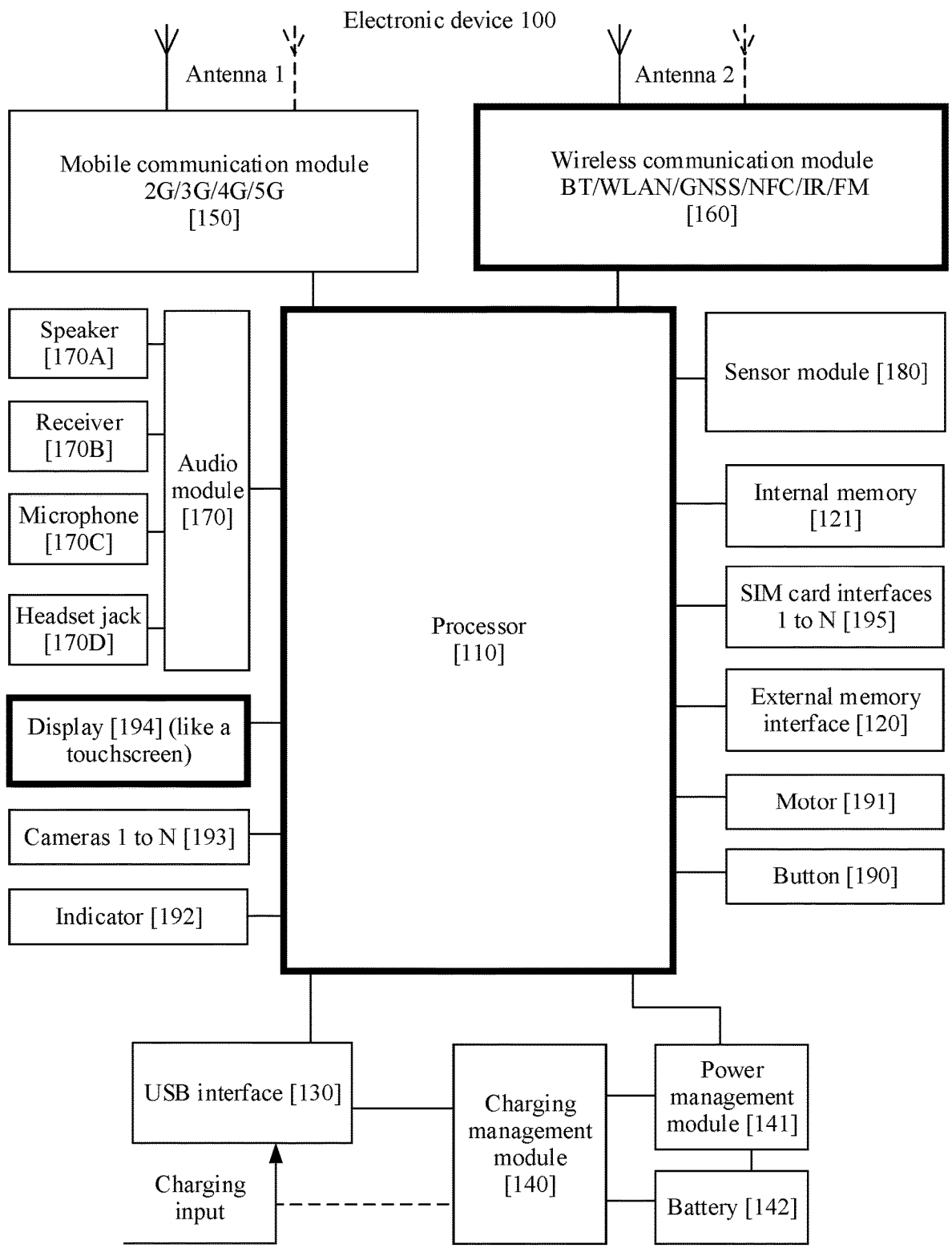
FIG. 2 is a schematic diagram of a hardware structure of a mobile phone according to an embodiment of this application.

In this embodiment of this application, an example in which the electronic device 100 shown in FIG. 1 is a mobile phone is used to describe a structure of the electronic device provided in this embodiment of this application. As shown in FIG. 2, the electronic device 100 may include a processor 110, an external memory interface 120, an internal memory 121, a universal serial bus (universal serial bus, USB) interface 130, a charging management module 140, a power management module 141, a battery 142, an antenna 1, an antenna 2, a mobile communication module 150, a wireless communication module 160, an audio module 170, a speaker 170A, a receiver 170B, a microphone 170C, a headset interface 170D, a sensor module 180, a button 190, a motor 191, an indicator 192, a camera 193, a display 194, a subscriber identification module (subscriber identification module, SIM) card interface 195, and the like.

The sensor module 180 may include sensors such as a pressure sensor 180A, a gyroscope sensor 180B, a barometric pressure sensor 180C, a magnetic sensor 180D, an acceleration sensor 180E, a distance sensor 180F, an optical proximity sensor 180G, a fingerprint sensor 180H, a temperature sensor 180J, a touch sensor 180K, an ambient light sensor 180L, and a bone conduction sensor 180M.

It may be understood that the structure shown in this embodiment does not constitute a specific limitation on the electronic device 100. In some other embodiments, the electronic device 100 may include more or fewer components than those shown in the figure, or some components may be combined, or some components may be split, or different component arrangements may be used. The components shown in the figure may be implemented by hardware, software, or a combination of software and hardware.

The processor 110 may include one or more processing units. For example, the processor 110 may include an application processor (application processor, AP), a modem processor, a graphics processing unit (graphics processing unit, GPU), an image signal processor (image signal processor, ISP), a controller, a memory, a video codec, a digital signal processor (digital signal processor, DSP), a baseband processor, and/or a neural-network processing unit (neural-network processing unit, NPU). Different processing units may be independent components, or may be integrated into one or more processors.

The controller may be a nerve center and a command center of the electronic device 100. The controller may generate an operation control signal based on an instruction operation code and a time sequence signal, to complete control of instruction reading and instruction execution.

A memory may be further disposed in the processor 110, and is configured to store instructions and data. In some embodiments, the memory in the processor 110 is a cache memory. The memory may store instructions or data that has been used or cyclically used by the processor 110. If the processor 110 needs to use the instructions or the data again, the processor may directly invoke the instructions or the data from the memory. This avoids repeated access, reduces waiting time of the processor 110, and improves system efficiency.

In some embodiments, the processor 110 may include one or more interfaces. The interface may include an inter-integrated circuit (inter-integrated circuit, I2C) interface, an inter-integrated circuit sound (inter-integrated circuit sound, I2S) interface, a pulse code modulation (pulse code modulation, PCM) interface, a universal asynchronous receiver/transmitter (universal asynchronous receiver/transmitter, UART) interface, a mobile industry processor interface (mobile industry processor interface, MIPI), a general-purpose input/output (general-purpose input/output, GPIO) interface, a subscriber identity module (subscriber identity module, SIM) interface, a universal serial bus (universal serial bus, USB) interface, and/or the like.

It may be understood that an interface connection relationship between the modules that is shown in this embodiment is merely an example for description, and does not constitute a limitation on a structure of the electronic device 100. In some other embodiments of this application, the electronic device 100 may alternatively use an interface connection manner different from that in the foregoing embodiment, or use a combination of a plurality of interface connection manners.

The charging management module 140 is configured to receive a charging input from a charger. The charger may be a wireless charger or a wired charger. In some embodiments of wired charging, the charging management module 140 may receive a charging input of a wired charger through the USB interface 130. In some embodiments of wireless charging, the charging management module 140 may receive a wireless charging input by using a wireless charging coil of the electronic device 100. The charging management module 140 may further supply power to the electronic device by using the power management module 141 when charging the battery 142.

The power management module 141 is configured to connect to the battery 142, the charging management module 140, and the processor 110. The power management module 141 receives an input of the battery 142 and/or the charging management module 140, to supply power to the processor 110, the internal memory 121, an external memory, the display 194, the camera 193, the wireless communication module 160, and the like. The power management module 141 may further be configured to monitor parameters such as a battery capacity, a battery cycle count, and a battery health state (electric leakage or impedance). In some other embodiments, the power management module 141 may alternatively be disposed in the processor 110. In some other embodiments, the power management module 141 and the charging management module 140 may alternatively be disposed in a same device.

A wireless communication function of the electronic device 100 may be implemented through the antenna 1, the antenna 2, the mobile communication module 150, the wireless communication module 160, the modem processor, the baseband processor, and the like.

The antenna 1 and the antenna 2 are configured to transmit and receive an electromagnetic wave signal. Each antenna in the electronic device 100 may be configured to cover one or more communication frequency bands. Different antennas may be further multiplexed, to improve antenna utilization. For example, the antenna 1 may be multiplexed as a diversity antenna of a wireless local area network. In some other embodiments, the antenna may be used in combination with a tuning switch.

The mobile communication module 150 can provide a solution, applied to the electronic device 100, to wireless communication including 2G, 3G, 4G, 5G, and the like. The mobile communication module 150 may include at least one filter, a switch, a power amplifier, a low noise amplifier (low noise amplifier, LNA), and the like.

The antenna 1 of the electronic device 100 is coupled to the mobile communication module 150. The mobile communication module 150 may receive an electromagnetic wave through the antenna 1, perform processing such as filtering or amplification on the received electromagnetic wave, and transmit the electromagnetic wave to the modem processor for demodulation. The mobile communication module 150 may further amplify a signal modulated by the modem processor, and convert the signal into an electromagnetic wave for radiation through the antenna 1. In some embodiments, at least some functional modules in the mobile communication module 150 may be disposed in the processor 110. In some embodiments, at least some functional modules of the mobile communication module 150 may be disposed in a same device as at least some modules of the processor 110.

The wireless communication module 160 may provide a solution that is applied to the electronic device 100 and that is for wireless communication such as a wireless local area network (wireless local area network, WLAN), Bluetooth (Bluetooth, BT), a global navigation satellite system (global navigation satellite system, GNSS), frequency modulation (frequency modulation, FM), near field communication (near field communication, NFC), or an infrared (infrared, IR) technology. For example, the WLAN may be a wireless fidelity (wireless fidelity, Wi-Fi) network.

The antenna 2 of the electronic device 100 is coupled to the wireless communication module 160. The wireless communication module 160 may be one or more components integrating at least one communication processing module. The wireless communication module 160 receives an electromagnetic wave through the antenna 2, performs frequency modulation and filtering processing on an electromagnetic wave signal, and sends a processed signal to the processor 110. The wireless communication module 160 may further receive a to-be-sent signal from the processor 110, perform frequency modulation and amplification on the signal, and convert the signal into an electromagnetic wave for radiation through the antenna 2.

The antenna 2 a may include one or more antennas. The one or more antennas may be classified into a first antenna (referred to as a weak antenna or an ultra-short-range antenna) and a second antenna (referred to as a normal antenna, also referred to as a strong antenna). A transmit distance (for example, a first distance) for transmitting a wireless signal by the first antenna is less than a transmit distance (for example, a second distance) for transmitting a wireless signal by the second antenna. The second antenna and the first antenna may be switched.

Wireless transmit power when the electronic device 100 works by using the first antenna is less than wireless transmit power when the electronic device 100 works by using the second antenna. The first distance is a distance covered by wireless transmit power when the first antenna works. The second distance is a distance covered by wireless transmit power when the second antenna works.

Figure 4A:
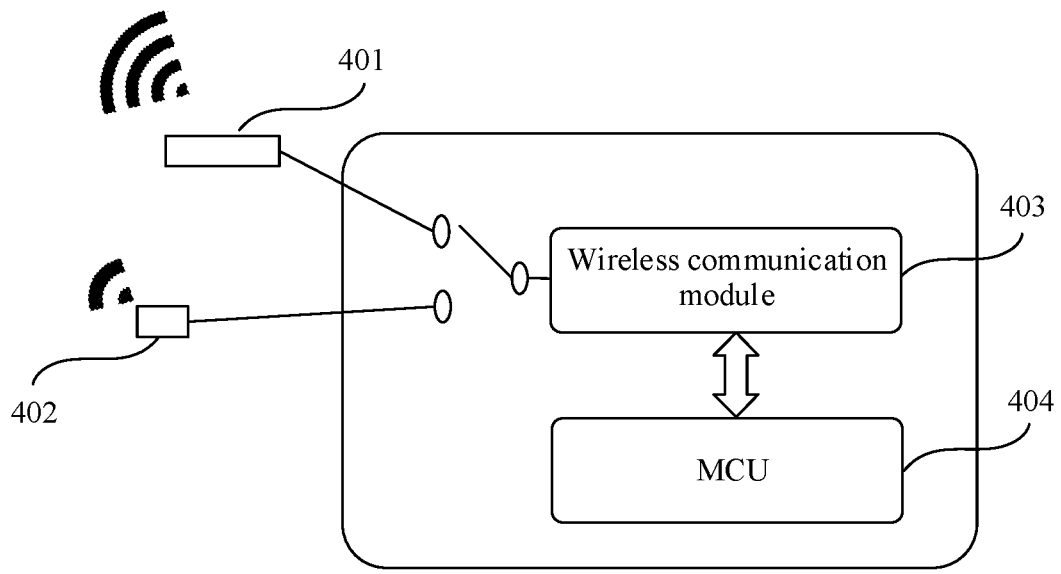
FIG. 4A is a schematic diagram of a structure of an antenna and a related component according to an embodiment of this application.

The second antenna and the first antenna implement network communication with another device (for example, the home device 200) by using a wireless communication module on the electronic device 100. FIG. 4A is a schematic diagram of an antenna structure of an electronic device 100 according to an embodiment of this application.

In an example, the second antenna and the first antenna may be two different antennas. The electronic device 100 shown in FIG. 2 may be the electronic device 40 (such as a mobile phone) shown in FIG. 4A. The electronic device 40 may include a microcontroller unit (microcontroller unit, MCU) 404, a wireless communication module 403, an antenna 401, and an antenna 402.

The antenna 401 shown in FIG. 4A is the second antenna, and the antenna 402 is the first antenna. The antenna 2 shown in FIG. 2 may include the antenna 401 and the antenna 402 shown in FIG. 4A. The wireless communication module 160 shown in FIG. 2 may be the wireless communication module 403 shown in FIG. 4A. The MCU 404 shown in FIG. 4A may be implemented by the processor 110 in FIG. 2. The wireless communication module 403 may be a Wi-Fi chip, and a radio frequency input/output (radio frequency input/output, RFIO) pin of the wireless communication module 403 is connected to the antenna 401 or the antenna 402 by using a single pole double throw switch.

The MCU 404 may include a central processing unit, a memory, a counter, a clock, an interrupt, a serial peripheral interface (serial peripheral interface, SPI), a UART interface, a universal serial bus interface, and the like. The UART interface is a universal serial data bus, and is configured to perform asynchronous communication. The bus may be a two-way communication bus, and converts to-be-transmitted data between serial communication and parallel communication.

In some embodiments, the MCU 404 exchanges information with the wireless communication module 403 by using the UART interface. The wireless communication module 403 is configured to implement wireless communication between the electronic device 100 and another device (for example, the home device 200). For a detailed description of the wireless communication module 403, refer to the detailed description of the wireless communication module 160 in the foregoing embodiment. Details are not described herein again.

The antenna 401 and the antenna 402 are configured to transmit and receive an electromagnetic wave. Further, the wireless communication module 403 converts an electromagnetic wave received from the antenna 401 or the antenna 402 into a signal, and sends the signal to the MCU 404 for processing; or the wireless communication module 403 receives a to-be-sent signal from the MCU 404, and converts the signal into an electromagnetic wave for radiation by using the antenna 401 or the antenna 402. In this embodiment of this application, the first distance for transmitting a signal by the antenna 401 is less than the second distance for transmitting a signal by the antenna 402.

In some embodiments, the MCU 404 may control switching between the antenna 401 and the antenna 402. When the electronic device 100 uses the antenna 401, if a distance between the electronic device 100 and another device (for example, the home device 200) is less than the second distance, the another device (for example, the home device 200) can receive a signal transmitted by the electronic device 100 by using the antenna 402, to implement communication between the another device and the electronic device 100. When the electronic device 100 uses the antenna 402, if a distance between the electronic device 100 and another device (for example, a mobile phone) is less than the first distance, the another device can receive a signal transmitted by the electronic device 100 by using the antenna 402, to implement communication between the another device and the electronic device 100.

For example, the electronic device 100 may send a first message to a surrounding device by using the antenna 401; and the electronic device 100 may receive, by using the antenna 402, a first response message and configuration information (for example, second configuration information and first configuration information) sent by another device. The electronic device 100 may further connect to a Wi-Fi router by using the antenna 401 or the antenna 402.

Figure 4B:
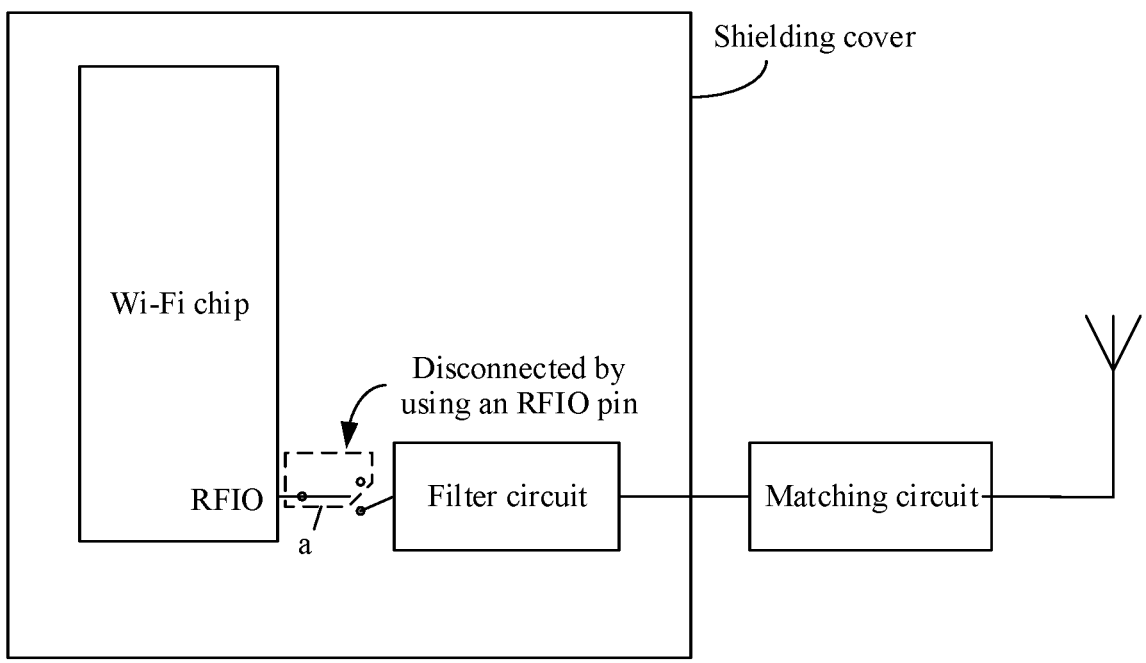
FIG. 4B is a schematic diagram of another structure of an antenna and a related component according to an embodiment of this application.
Figure 4C:
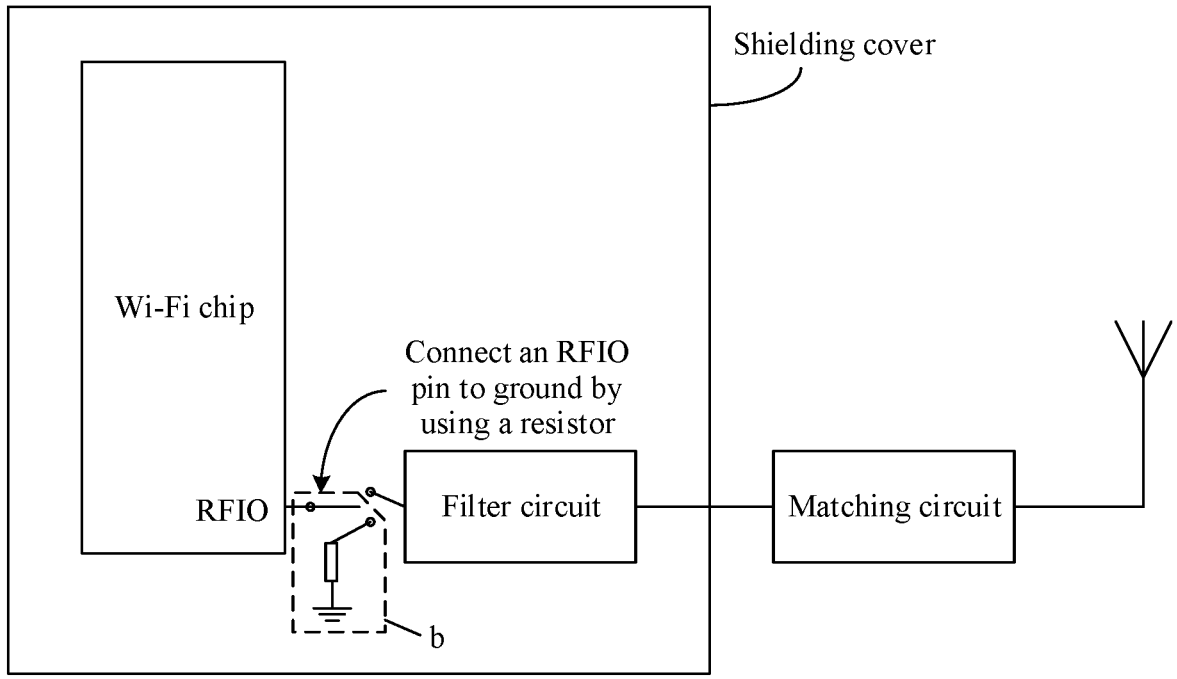
FIG. 4C is a schematic diagram of another structure of an antenna and a related component according to an embodiment of this application.
Figure 4D:
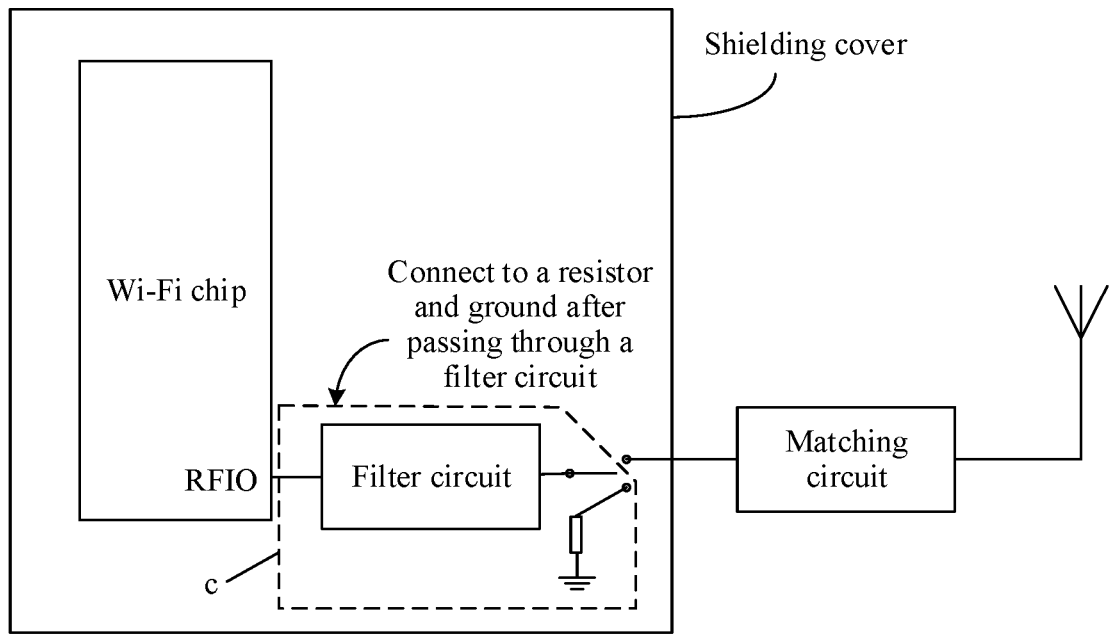
FIG. 4D is a schematic diagram of another structure of an antenna and a related component according to an embodiment of this application.

In some other embodiments, the second antenna and the first antenna may share a part of cabling, for example, descriptions in embodiments shown in FIG. 4B to FIG. 4D.

In this embodiment of this application, the electronic device 100 implements ultra-short-range communication by using the first antenna. In this embodiment of this application, the dual antennas (the first antenna and the second antenna) in the electronic device 100 may be switched by using a radio frequency switch. Physically, both the first antenna and the radio frequency switch (a first antenna shown in the dashed box in FIG. 4B to FIG. 4D) may be disposed in a shielding cover, or the first antenna may be disposed in a chip. FIG. 4B to FIG. 4D are schematic diagrams of three structures of the first antenna.

An objective of the first antenna in this embodiment of this application is to reduce a transmit distance as much as possible. A principle of constructing the first antenna may be as follows:

(1) reducing a length of the antenna, to reduce an electromagnetic wave radiated to the air;
(2) reducing radiation efficiency, and converting, by using a resistor, partial electromagnetic radiation into heat energy to be consumed; and
(3) reducing a return loss and reflecting partial radio frequency energy back to a chip.

The first antenna may be specifically implemented as follows:

(1) shortening the antenna;
(2) disconnecting a point in a path of a true antenna, or grounding the point through a resistor, an inductor, or a capacitor; and
(3) using a shielding cover.

It should be understood that specific implementations (1) and (2) of the first antenna may be implemented on a PCB board or inside a chip.

It should be further understood that a function of the shielding cover is to block a path in which an electromagnetic wave is radiated by the antenna to the receiver, so as to achieve an objective of weakening radiation.

It should be further understood that the shortening the antenna means that the first antenna is shorter than the second antenna. Structures of the three first antennas are shown in FIG. 4B to FIG. 4D. The first antennas are shown in dashed boxes in FIG. 4B to FIG. 4D. In a structure of the second antenna in FIG. 4B to FIG. 4D, a filter circuit (for example, a it-type circuit), a matching circuit (for example, a it-type circuit), and an antenna body (for example, the antenna body may be a metal cabling) outside a matching circuit are connected by using an RFIO pin. A first antenna a shown in the dashed box in FIG. 4B, a first antenna b shown in a dashed box in FIG. 4C, and a first antenna c shown in a dashed box in FIG. 4D have different lengths, but each is shorter than the second antenna. The filter circuit is configured to prevent interference, and the matching circuit is configured to match the second antenna.

For example, as shown in FIG. 4B, the first antenna a may be directly disconnected by using the radio frequency input/output (radio frequency input/output, RFIO) pin of the Wi-Fi chip in the shielding cover. The first antenna a may include an RFIO pin, a cabling, and a first-way switch (the first-way switch is not connected to any component) in a 2-way switch. The 2-way switch refers to a switch between an RFIO and the filter circuit, and the RFIO pin may be connected to or disconnected from the filter circuit by using the switch. The first-way switch is a switch that is shown in FIG. 4B and that is connected to the RFIO pin and disconnected from the filter circuit. It should be understood that the 2-way switch in this embodiment of this application may be a single pole double throw switch.

For example, as shown in FIG. 4C, the first antenna b may be connected to the ground by using a matching component (for example, a resistor) via the RFIO of the Wi-Fi chip in the shielding cover. The first antenna b may include an RFIO pin, a cabling, a first-way switch (the first-way switch is connected to a resistor) in a 2-way switch, and the resistor. A partial electromagnetic wave radiation may be converted, through resistor grounding, into the heat energy to be consumed, to reduce radiation efficiency of the first antenna b. The 2-way switch refers to a switch between the RFIO pin and each of the resistor and the filter circuit. By using the switch, the RFIO pin may be connected to the resistor and disconnected from the filter circuit, or the RFIO pin may be disconnected from the resistor and connected to the filter circuit. The first-way switch is a switch connected to the resistor and disconnected from the filter circuit.

For example, as shown in FIG. 4D, the first antenna c may be connected to a matching component (for example, a resistor) by using the RFIO pin of the Wi-Fi chip in the shielding cover, and then to the ground after passing through a chip-matched filter circuit. The first antenna c may include an RFIO pin, a cabling, a filter circuit, a first-way switch (the first-way switch is connected to a resistor) in a 2-way switch, and the resistor. A partial electromagnetic wave radiation may be converted, through resistor grounding, into the heat energy to be consumed, to reduce radiation efficiency of the first antenna b. The 2-way switch refers to a switch between the filter circuit in the shielding cover and each of the resistor and the matching circuit outside the shielding cover. By using the switch, the filter circuit in the shielding cover may be connected to the resistor and disconnected from the matching circuit outside the shielding cover, or the filter circuit in the shielding cover may be disconnected from the resistor and connected to the matching circuit outside the shielding cover. The first-way switch is a switch that connects the filter circuit in the shielding cover and the resistor.

It should be understood that the second antenna in FIG. 4B to FIG. 4C may include an RFIO pin, a cabling, a second-way switch in the 2-way switch, a filter circuit, a matching circuit, and an antenna body connected outside the matching circuit. The second-way switch is a switch that connects the RFIO pin and the filter circuit.

The second antenna in FIG. 4D may include an RFIO pin, a filter circuit, a cabling, a second-way switch in the 2-way switch, a matching circuit, and an antenna body connected outside the matching circuit. The second-way switch is a switch that connects the filter circuit in the shielding cover and the matching circuit outside the shielding cover.

It should be understood that the wireless communication module 403 shown in FIG. 4A may be the Wi-Fi chip in FIG. 4B to FIG. 4C.

The foregoing different first antenna structures cooperate with different Tx power (Tx power) settings of the Wi-Fi chip, so that different ultra-short-range communication requirements (for example, from 10 cm to 2 m) can be met.

For example, Table 1 shows communication distances of several different first antenna structures in cooperation with different transmit powers.

TABLE 1

| Antenna structure | Transmit power | |
|---|---|---|
| | Distance at a maximum transmit power | Distance at a minimum transmit power |
| First antenna a | 1 m | 10 cm |
| First antenna b | 1.5 m | 50 cm |
| First antenna c | 2 m | 1 m |

Due to a characteristic of a physical component in the chip, a difference between the maximum transmit power and the minimum transmit power of the antenna is related. If the minimum transmit power of the electronic device 100 is reduced to a very low value, the maximum transmit power is also reduced. In this way, a distance requirement during normal working is not met. In this embodiment of this application, because different smart devices have different structures and have different security performance requirements for the smart devices, manufacturers of the smart devices may use different first antenna structures and transmit powers to ensure a communication distance of the smart devices. For example, for manufacturers of different smart air conditioners, thicknesses of housings of the smart air conditioners may be different. In this case, when the first antenna structures and transmit powers are the same, communication distances at which the smart air conditioners can be discovered may also be different. Different smart device manufacturers may test and obtain, based on a structure of the smart device, a structure of the first antenna, and a specific transmit power, a safe distance at which the smart device is discovered.

Figure 4E:
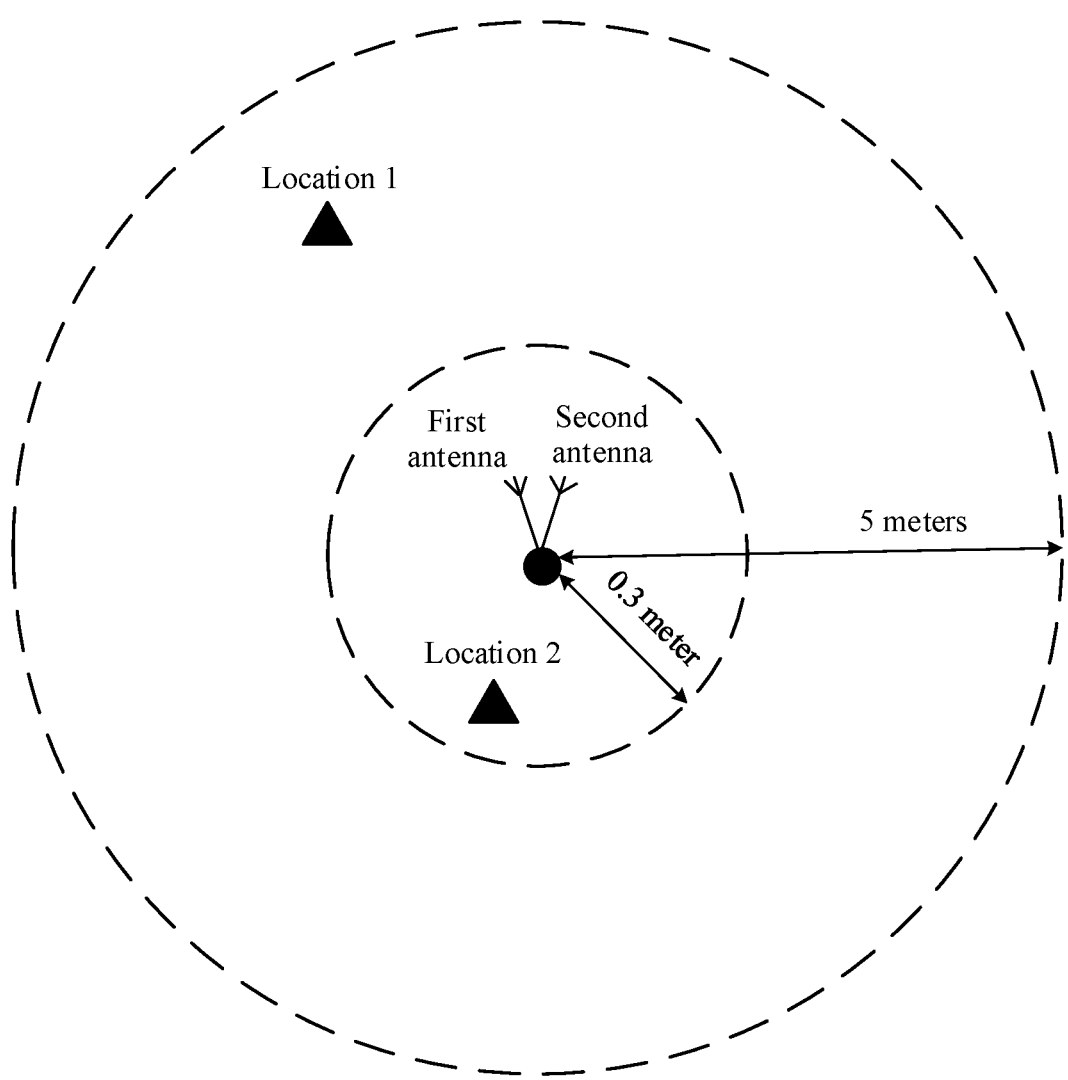
FIG. 4E is a schematic diagram of a transmit distance of an antenna according to an embodiment of this application.

With reference to the foregoing two examples, an example in which the second distance is 5 meters and the first distance is 0.3 meter is used. When the electronic device 100 uses a second antenna (that is, a strong antenna), if a distance between the electronic device 100 and another device (for example, the home device 200) is less than a second distance (for example, the another device is located at a location 1 shown in FIG. 4E), the electronic device 100 may communicate with the another device (for example, the home device 200). When the electronic device 100 uses the first antenna (that is, a weak antenna), if a distance between the electronic device 100 and another device (for example, the home device 200) is less than a first distance (for example, the another device is located at a location 2 shown in FIG. 4E), the electronic device 100 may communicate with the another device (for example, a mobile phone).

The electronic device 100 implements a display function by using the GPU, the display 194, the application processor, and the like. The GPU is a microprocessor for image processing, and is connected to the display 194 and the application processor. The GPU is configured to perform mathematical and geometric computation, and render an image. The processor 110 may include one or more GPUs that execute program instructions to generate or change display information. The display 194 may be a touchscreen, and the display 194 is configured to display an image, a video, and the like. The display 194 includes a display panel.

The electronic device 100 may implement a photographing function through the ISP, the camera 193, the video codec, the GPU, the display 194, the application processor, and the like. The ISP is configured to process data fed back by the camera 193. In some embodiments, the ISP may be disposed in the camera 193. The camera 193 is configured to capture a static image or a video. In some embodiments, the electronic device 100 may include one or N cameras 193, where N is a positive integer greater than 1.

The external memory interface 120 may be configured to connect to an external storage card, for example, a micro SD card, to extend a storage capability of the electronic device 100. The external storage card communicates with the processor 110 through the external memory interface 120, to implement a data storage function. For example, files such as music and videos are stored in the external storage card.

The internal memory 121 may be configured to store computer-executable program code. The executable program code includes instructions. The processor 110 runs the instructions stored in the internal memory 121, to perform various function applications of the electronic device 100 and data processing. For example, in this embodiment of this application, the processor 110 may execute the instructions stored in the internal memory 121, and the internal memory 121 may include a program storage area and a data storage area.

The program storage area may store an operating system, an application required by at least one function (for example, a sound playing function or an image playing function), and the like. The data storage area may store data (for example, audio data and an address book) and the like created when the electronic device 100 is used, and the like. In addition, the internal memory 121 may include a high-speed random access memory, or may include a nonvolatile memory such as at least one disk storage device, a flash memory, or a universal flash storage (universal flash storage, UFS).

The electronic device 100 may implement an audio function, for example, music playing and recording, by using the audio module 170, the speaker 170A, the receiver 170B, the microphone 170C, the headset jack 170D, the application processor, and the like.

The audio module 170 is configured to convert digital audio information into an analog audio signal for output, and is also configured to convert an analog audio input into a digital audio signal. The headset jack 170D is configured to connect to a wired headset. The headset interface 170D may be a USB interface 130, or may be a 3.5 mm open mobile terminal platform (open mobile terminal platform, OMTP) standard interface or a cellular telecommunications industry association of the USA (cellular telecommunications industry association of the USA, CTIA) standard interface.

The button 190 includes a power button, a volume button, and the like. The button 190 may be a mechanical button, or may be a touch button. The motor 191 may generate a vibration prompt. The motor 191 may be configured to provide an incoming call vibration prompt and a touch vibration feedback. The indicator 192 may be an indicator light that may be configured to indicate a charging state and a battery power change, and may further be configured to indicate a message, a missed call, a notification, and the like. The SIM card interface 195 is configured to connect to a SIM card. The SIM card may be inserted into the SIM card interface 195 or removed from the SIM card interface 195, to implement contact with or separation from the electronic device 100. The electronic device 100 may support one or N SIM card interfaces, where N is a positive integer greater than 1. The SIM card interface 195 may support a nano SIM card, a micro SIM card, a SIM card, and the like.

Figure 3:
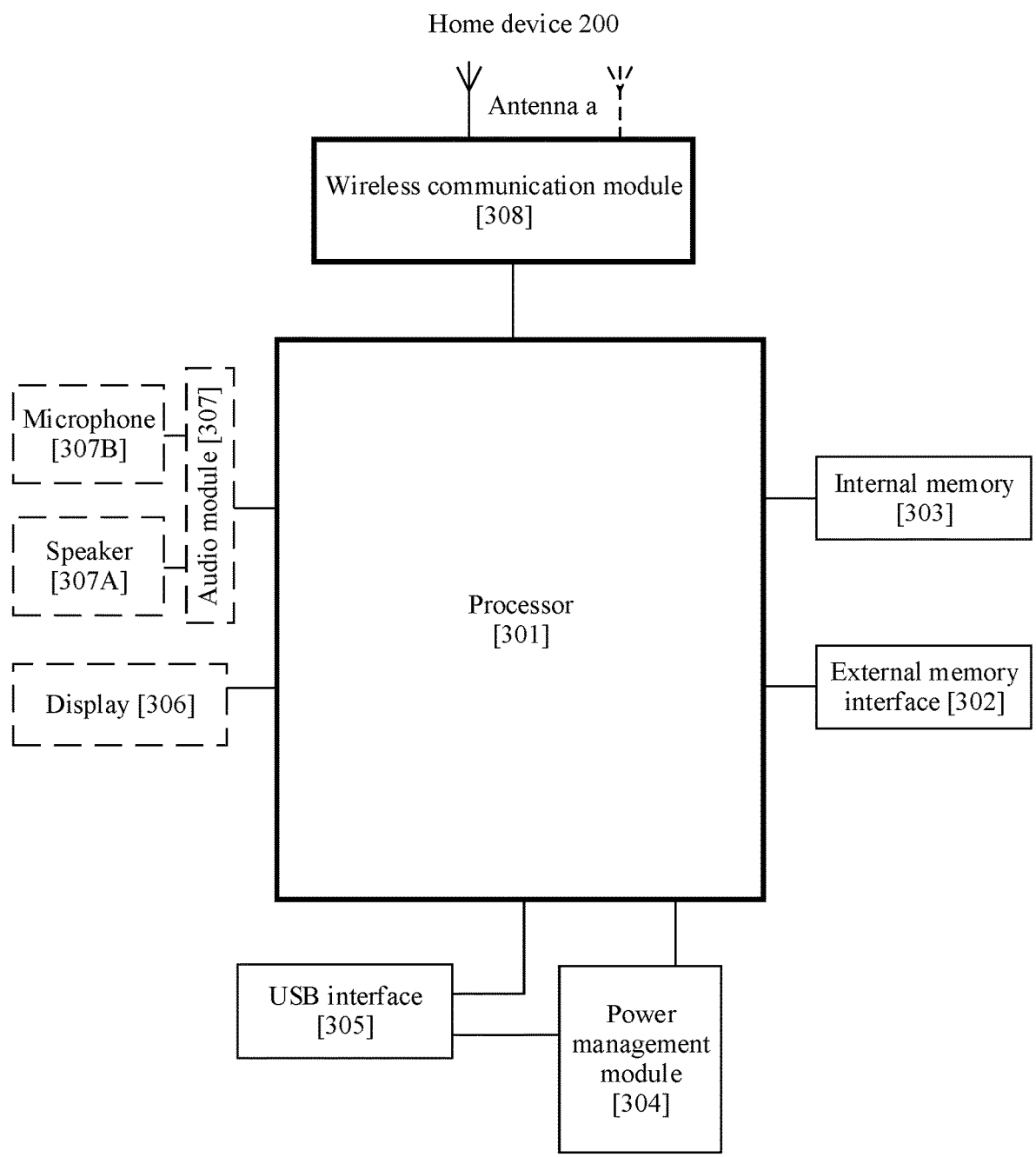
FIG. 3 is a schematic diagram of a hardware structure of a home device according to an embodiment of this application.

FIG. 3 is a schematic diagram of a structure of a home device 200 according to an embodiment of this application. As shown in FIG. 3, the home device 200 may include a processor 301, an external memory interface 302, an internal memory 303, a USB interface 305, a power management module 304, an antenna a, a wireless communication module 308, and another functional module. The another function module is configured to implement a related function of the home device 200. For example, the smart speaker may include an audio module 307, a loudspeaker 307A, a display 306, and the like. The smart television may alternatively include an audio module 307, a loudspeaker 307A, a display 306, and the like. For another example, the smart air conditioner may include a cooling module and the like, and the smart light bulb may include a light emitting module and the like.

The processor 301 may include one or more processing units. For example, the processor 301 may include an AP, a modem processor, a GPU, an ISP, a controller, a memory, a video codec, a DSP, a baseband processor, and/or an NPU. Different processing units may be independent components, or may be integrated into one or more processors. A memory may be further disposed in the processor 301, and is configured to store instructions and data.

The power management module 304 is configured to connect to a power supply. The power management module 304 may be further connected to the processor 301, the internal memory 303, the display 306, the wireless communication module 308, and the like. The power management module 304 receives an input of a power supply through the USB interface 305, and supplies power to the processor 301, the internal memory 303, the display 306, the wireless communication module 308, and the like. In some embodiments, the power management module 304 may alternatively be disposed in the processor 301.

A wireless communication function of the home device 200 may be implemented by using the antenna, the wireless communication module 308, and the like. The wireless communication module 308 may provide a wireless communication solution that is applied to the home device 200 and that includes a WLAN (for example, a Wi-Fi network), Bluetooth (BT), a GNSS, or the like.

The wireless communication module 308 may be one or more components integrating at least one communication processing module. The wireless communication module 308 receives an electromagnetic wave through the antenna a, performs frequency modulation and filtering processing on an electromagnetic wave signal, and sends a processed signal to the processor 301.

The wireless communication module 308 may further receive a to-be-sent signal from the processor 301, perform frequency modulation and amplification on the signal, and convert the signal into an electromagnetic wave for radiation through the antenna. In some embodiments, the antenna a of the home device 200 is coupled to the wireless communication module 308, so that the home device 200 may communicate with a network and another device by using a wireless communication technology. For example, the wireless communication module 308 in this embodiment of this application may be a Bluetooth module or a Wi-Fi module. The wireless communication module 308 is configured to transmit data with devices such as the electronic device 100, the router 120, and the cloud server 130.

The antenna a may include one or more antennas. The one or more antennas may be classified into a first antenna (a weak antenna) and a second antenna (a normal antenna, also referred to as a strong antenna). A transmit distance (for example, a first distance) for transmitting a wireless signal by the first antenna is less than a transmit distance (for example, a second distance) for transmitting a wireless signal by the second antenna. The second antenna and the first antenna may be switched. The second antenna and the first antenna implement network communication with another device (for example, a mobile phone) by using a wireless communication module on the home device 200.

In an example, as shown in FIG. 4A, the second antenna and the first antenna may be two different antennas. As shown in FIG. 4B to FIG. 4D, the second antenna and the first antenna may share a part of cabling.

The home device 200 may implement a display function by using a GPU, a display 306, an application processor, and the like. The GPU is a microprocessor for image processing, and is connected to the display 306 and the application processor. The GPU is configured to perform mathematical and geometric computation, and render an image. The processor 301 may include one or more GPUs that execute program instructions to generate or change display information.

The display 306 is configured to display an image, a video, and the like. The display 306 includes a display panel. The display panel may be an LCD, an OLED, an AMOLED, an FLED, a mini-LED, a micro-LED, a micro-OLED, a QLED, or the like. For example, in this embodiment of this application, the display 306 may be configured to display image content corresponding to audio data played by the home device 200, an operation interface of the home device 200, and the like.

The video codec is configured to compress or decompress a digital video. The home device 200 may support one or more video codecs. In this way, the home device 200 may play or record videos in a plurality of encoding formats, for example, MPEG1, MPEG2, MPEG3, and MPEG4.

The internal memory 303 may be configured to store computer-executable program code. The executable program code includes instructions. The processor 301 runs the instructions stored in the internal memory 303, to perform various function applications of the home device 200 and data processing. The internal memory 303 may include a program storage area and a data storage area. The program storage area may store an operating system, an application required by at least one function (for example, a sound playing function or an image playing function), and the like. The data storage area may store data (for example, an audio playback record) and the like created when the home device 200 is used. In addition, the internal memory 303 may include a high-speed random access memory, or may include a nonvolatile memory, for example, at least one magnetic disk storage device, a flash memory, or a UFS.

The external memory interface 302 may be configured to connect to an external storage card, for example, a micro SD card, to extend a storage capability of an advertising device 120. The external storage card communicates with the processor 301 through the external memory interface 302, to implement a data storage function. For example, files such as music and videos are stored in the external storage card.

The home device 200 may implement an audio function, for example, music playing and recording, and voice sampling, through the audio module 307, the speaker 307A, the microphone 307B, the application processor, and the like.

The audio module 307 is configured to convert digital audio information into an analog audio signal for output, and is also configured to convert an analog audio input into a digital audio signal. The audio module 307 may be further configured to code and decode an audio signal. In some embodiments, the audio module 307 may be disposed in the processor 301, or some function modules of the audio module 307 may be disposed in the processor 301. The speaker 307A, also referred to as a "loudspeaker", is configured to convert an audio electrical signal into a sound signal. The microphone 307B, also referred to as a "mike" or a "mic", is configured to collect a sound signal and convert the sound signal into an electrical signal.

All methods in the following embodiments may be implemented in an electronic device having the foregoing hardware structure and a home device having the foregoing hardware structure.

Figure 5A:
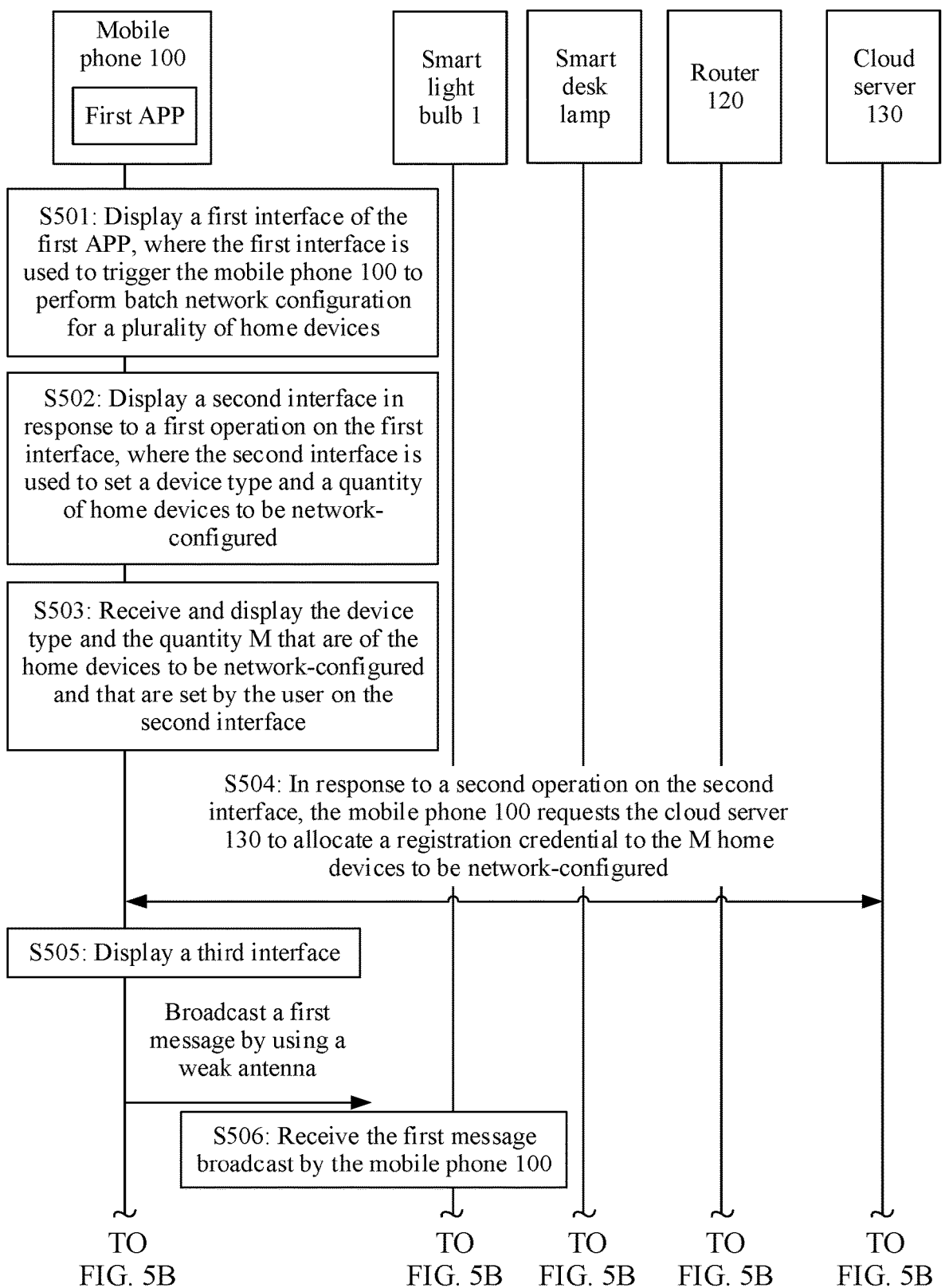
FIG. 5A to FIG. 5C are a flowchart of a method for configuring home devices in batches according to an embodiment of this application.
Figure 5B:
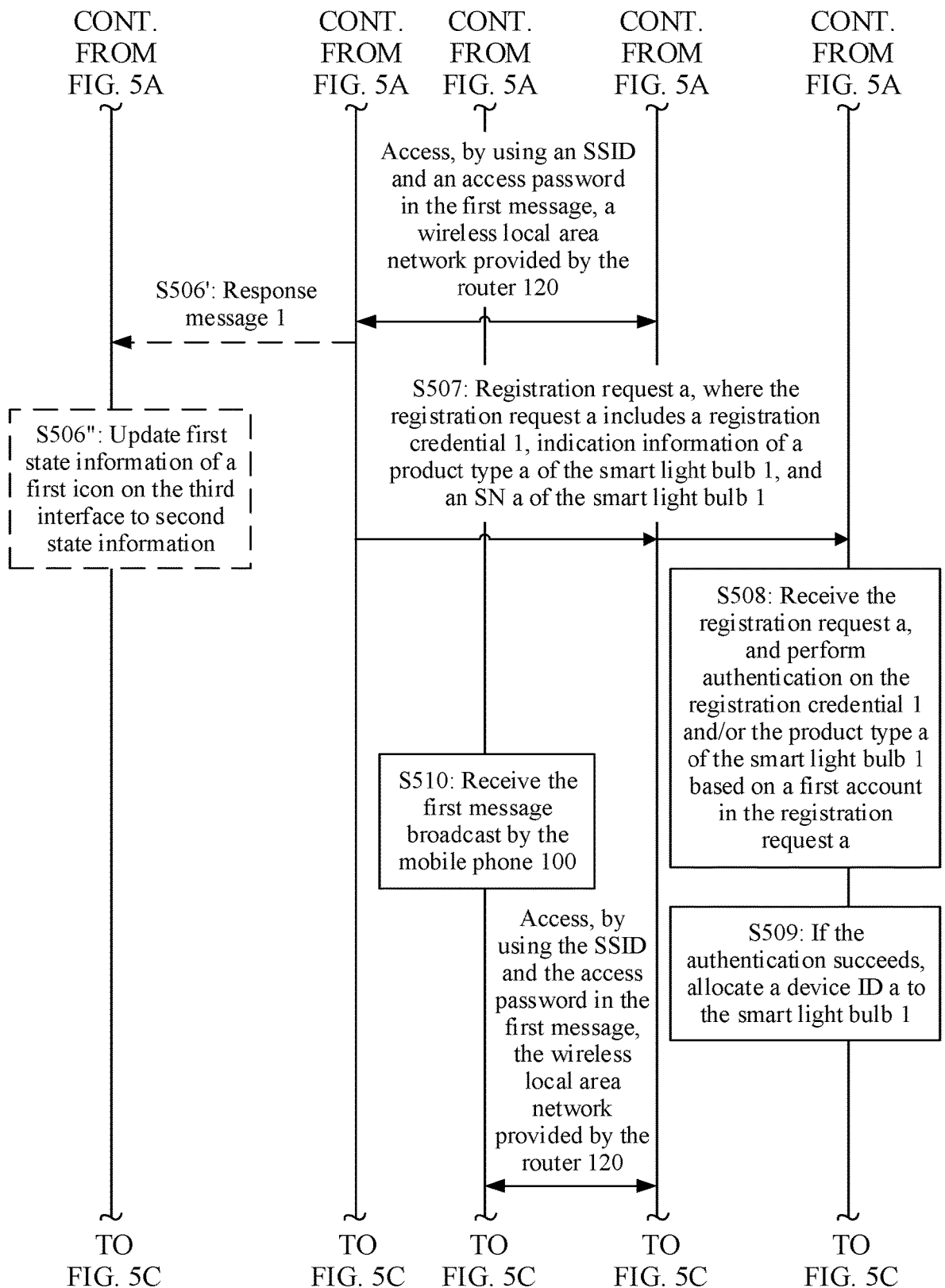
Figure 5C:
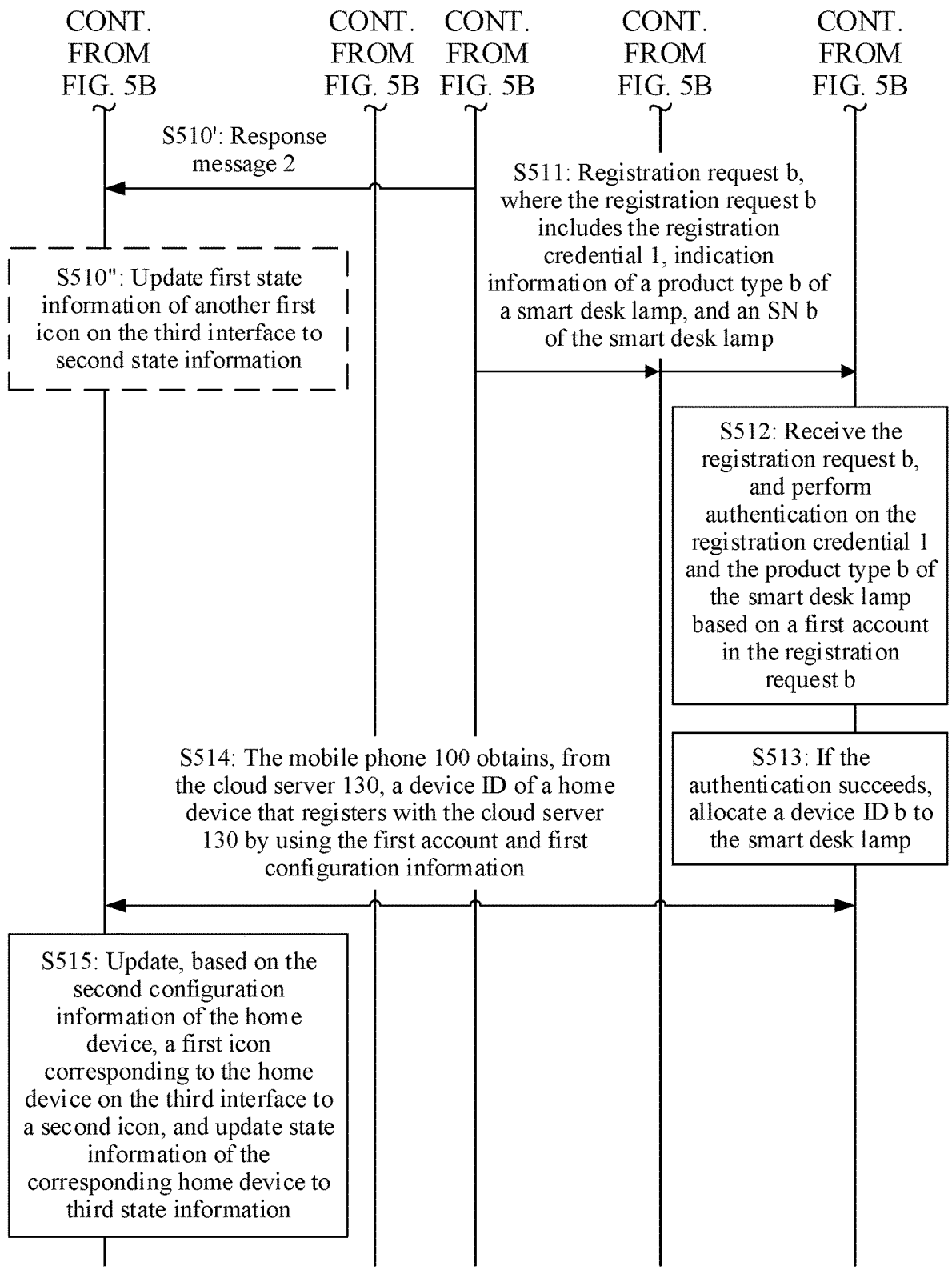

An embodiment of this application provides a method for configuring home devices in batches. The method may be applied to interaction between the electronic device 100 (for example, the mobile phone 100), the home device 200, the router 120, and the cloud server 130 shown in FIG. 1, to complete a network configuration and registration process of the home device 200. A first APP is installed in the mobile phone 100, and the cloud server 130 is an IoT cloud server of the first APP. As shown in FIG. 5A to FIG. 5C, the method in this embodiment of this application may include steps S501 to S515.

Before performing steps S501 to S515, a user may control all home devices to be network-configured to be powered on, and put all the home devices to be network-configured together. After being powered on, the home device to be network-configured may start a wireless communication module, to receive network configuration data from the mobile phone 100. All home devices to be network-configured are put together, so that it can be convenient for the user to use the mobile phone 100 to separately approach the home devices to be network-configured, and implement batch network configuration for the home devices in a manner in which the mobile phone 100 approaches the home device at a short distance (for example, within 30 millimeters) in a short time (for example, 1 second).

S501: The mobile phone 100 displays a first interface of a first APP, where the first interface is used to trigger the mobile phone 100 to perform batch network configuration for a plurality of home devices.

Figure 6:
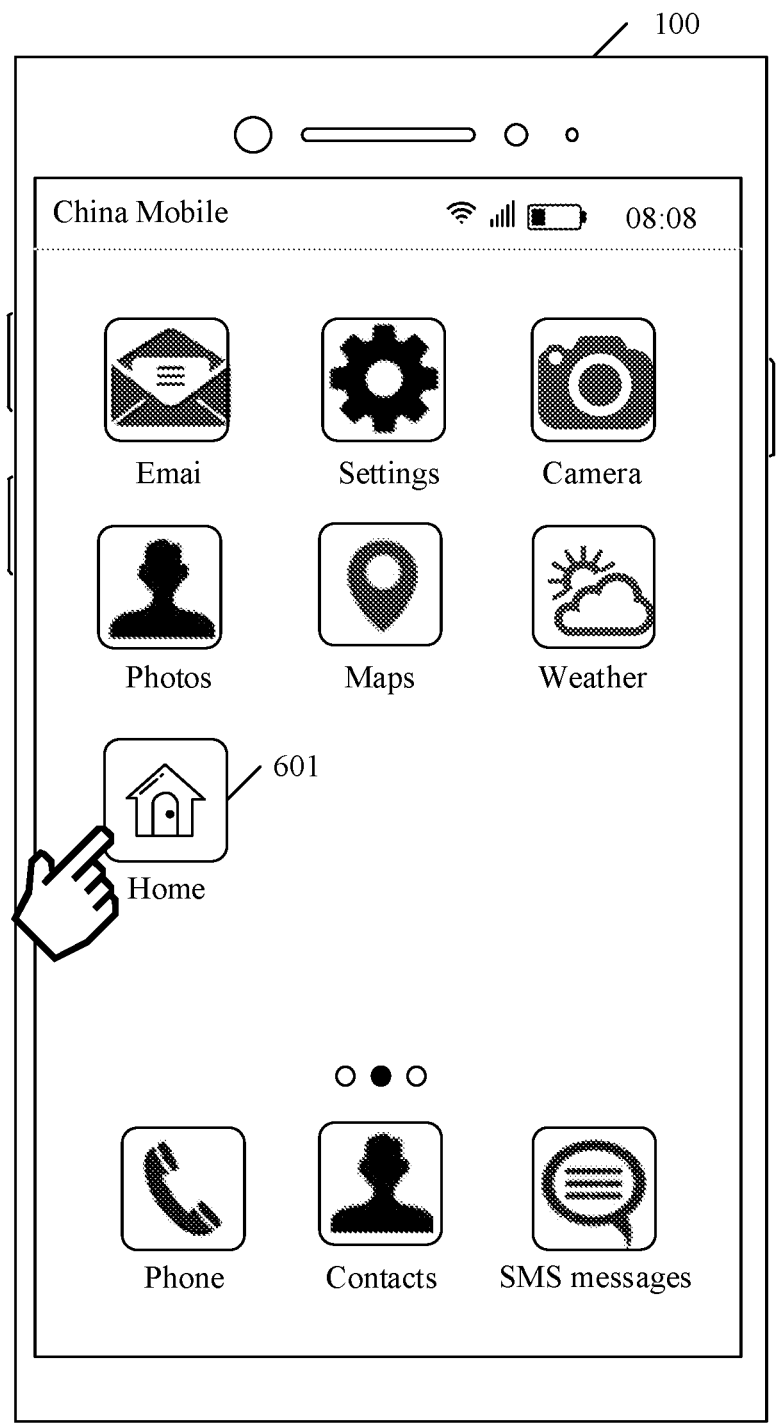
FIG. 6 is a schematic diagram of a display interface of a mobile phone 100 according to an embodiment of this application.

For example, the first APP in this embodiment of this application may be an application corresponding to an icon "home" 601 shown in FIG. 6. As shown in FIG. 6, the mobile phone 100 may receive a tap operation performed by a user on the icon "home" 601. In response to the tap operation, the mobile phone 100 may start the first APP, and display a home page 701 (namely, the first interface 701) of the first APP shown in FIG. 7A. The first interface 701 includes an option used to trigger the mobile phone 100 to perform batch network configuration for a plurality of home devices, for example, a "batch network configuration" option 703.

Figure 15A:
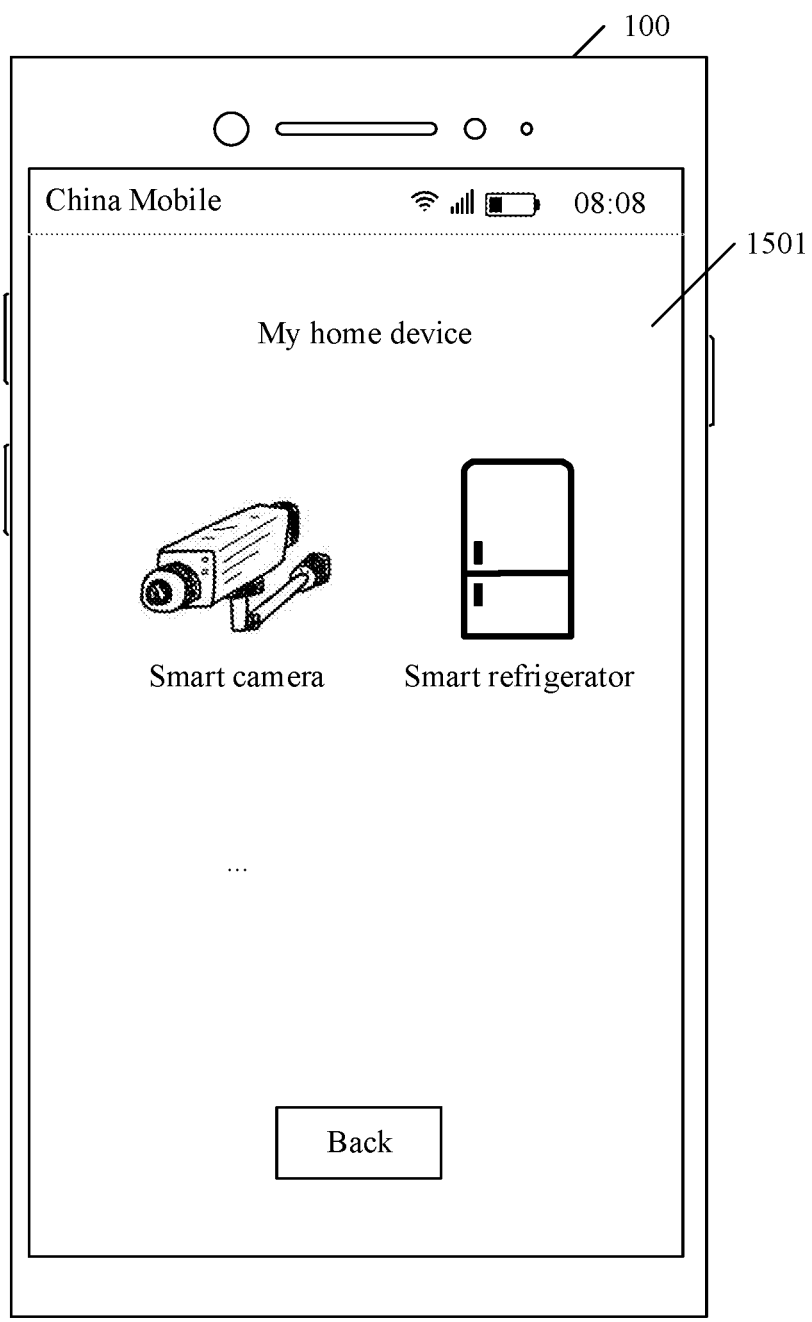
FIG. 15A and FIG. 15B are schematic diagrams of other display interfaces of an electronic device according to an embodiment of this application.

Further, the first interface 701 may further include a "my home device" option 702. The "my home device" option 702 is used to trigger the mobile phone 100 to control a home device for which network configuration succeeds. For example, in response to the tap operation (such as a click operation) performed by the user on the "my home device" option 702, the mobile phone 100 may display a home device management interface 1501 shown in FIG. 15A. As shown in FIG. 15A, the home device management interface 1501 includes management options of a smart camera and a smart refrigerator. It can be learned from FIG. 15A that network configuration for the smart camera and the smart refrigerator succeeds. That the network configuration succeeds in this embodiment of this application means that the home device has accessed a wireless local area network provided by the router 120 and registered with the cloud server 130.

S502: The mobile phone 100 displays a second interface in response to a first operation on the first interface. The second interface is used to set a device type and a quantity of home devices to be network-configured.

The first operation may be a tap operation performed by the user on an option that is in the first interface and that is used to trigger the mobile phone 100 to perform batch network configuration for a plurality of home devices. For example, the first operation may be a tap operation (for example, a click operation) performed by the user on the "batch network configuration" option 703 in the first interface 701 shown in FIG. 7A. Alternatively, the first operation may be a preset gesture input by the user on the first interface, for example, any gesture such as an L-shaped gesture, an S-shaped gesture, or a √-shaped gesture.

Figures 7A, 7B:
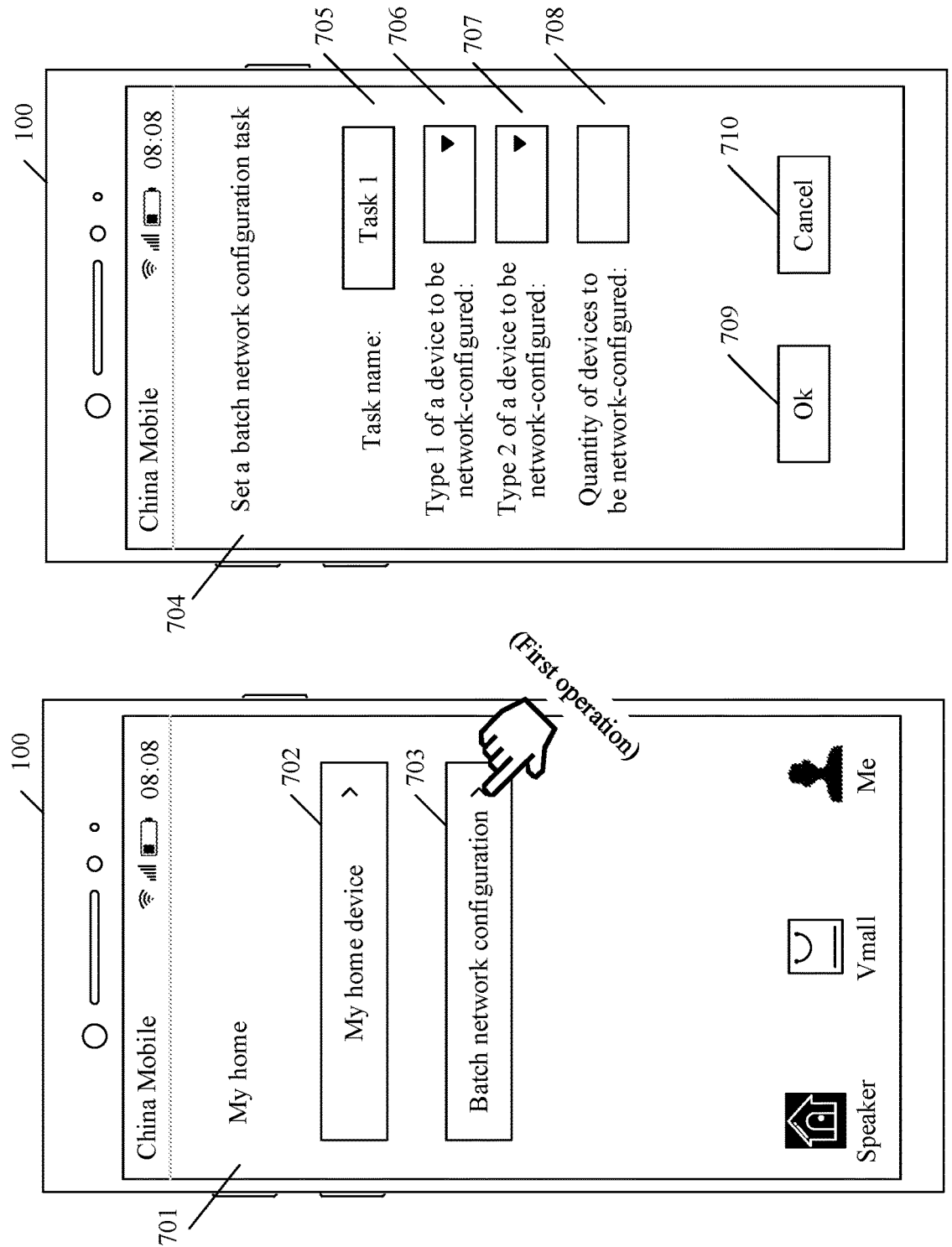
FIG. 7A to FIG. 7C are schematic diagrams of other display interfaces of an electronic device according to an embodiment of this application.

In response to the first operation performed by the user on the "batch network configuration" option 703 shown in FIG. 7A, the mobile phone 100 may display a second interface 704 shown in FIG. 7B. The second interface 704 is used to set a device type and a quantity M of home devices to be network-configured. For example, the second interface 704 may include: a setting item for a quantity of devices to be network-configured devices, for example, a setting item 708 for a "quantity of devices to be network-configured"; and a setting item for a type of at least one device to be network-configured, for example, a setting item 706 for a "type 1 of a device to be network-configured" and a setting item 707 for a "type 2 of a device to be network-configured".

The setting item 708 for the "quantity of devices to be network-configured" is used to set a quantity of home devices to be network-configured. The setting item 706 for "type 1 of a device to be network-configured" and a setting item 707 for "type 2 of a device to be network-configured" are used to set a device type (Device Type) of a home device to be network-configured.

The device type (Device Type) of the home device may be determined based on a function of the home device. For example, based on functions of various home devices, device types of the home devices may include: an air conditioner, a washing machine, a light, a floor sweeping robot, a rice cooker, a television, a fan, and the like.

The foregoing device type may be referred to as a device category of a home device, and each device category (that is, Device Type) may be further classified into a plurality of product types (product types). The product type may be referred to as a device subcategory of a home device. For example, home devices of a same device type may be classified into home devices of different product types based on a manufacturer and/or a product model.

For example, for a home device whose device type is an air conditioner, home devices of the following plurality of product types may be included, for example, an air conditioner whose product model is a produced by a manufacturer 1, an air conditioner whose product model is b produced by a manufacturer 1, an air conditioner whose product model is c produced by a manufacturer 2, and an air conditioner whose product model is d produced by a manufacturer 3.

In conclusion, the product type of the home device may not only indicate the device type of the home device, but also indicate information such as a manufacturer and/or a product model of the home device.

It may be understood that, for home devices of a same product type, a manufacturer may produce a large quantity of home devices. A product serial number SN of a home device may uniquely identify each home device. For example, a plurality of air conditioners of a same product type have different SNs.

S503: The mobile phone 100 receives and displays the device type and the quantity M that are of the home devices to be network-configured and that are set by the user on the second interface.

For example, in the following implementation, the method in this embodiment of this application is described by using an example in which the mobile phone 100 performs batch network configuration for lights (including a smart light bulb 1, a smart light bulb 2, a smart light bulb 3, and a smart desk lamp) shown in FIG. 1. In this example, the device type (device type) of the home device to be network-configured is "light", and the quantity M=4.

Figure 8A:
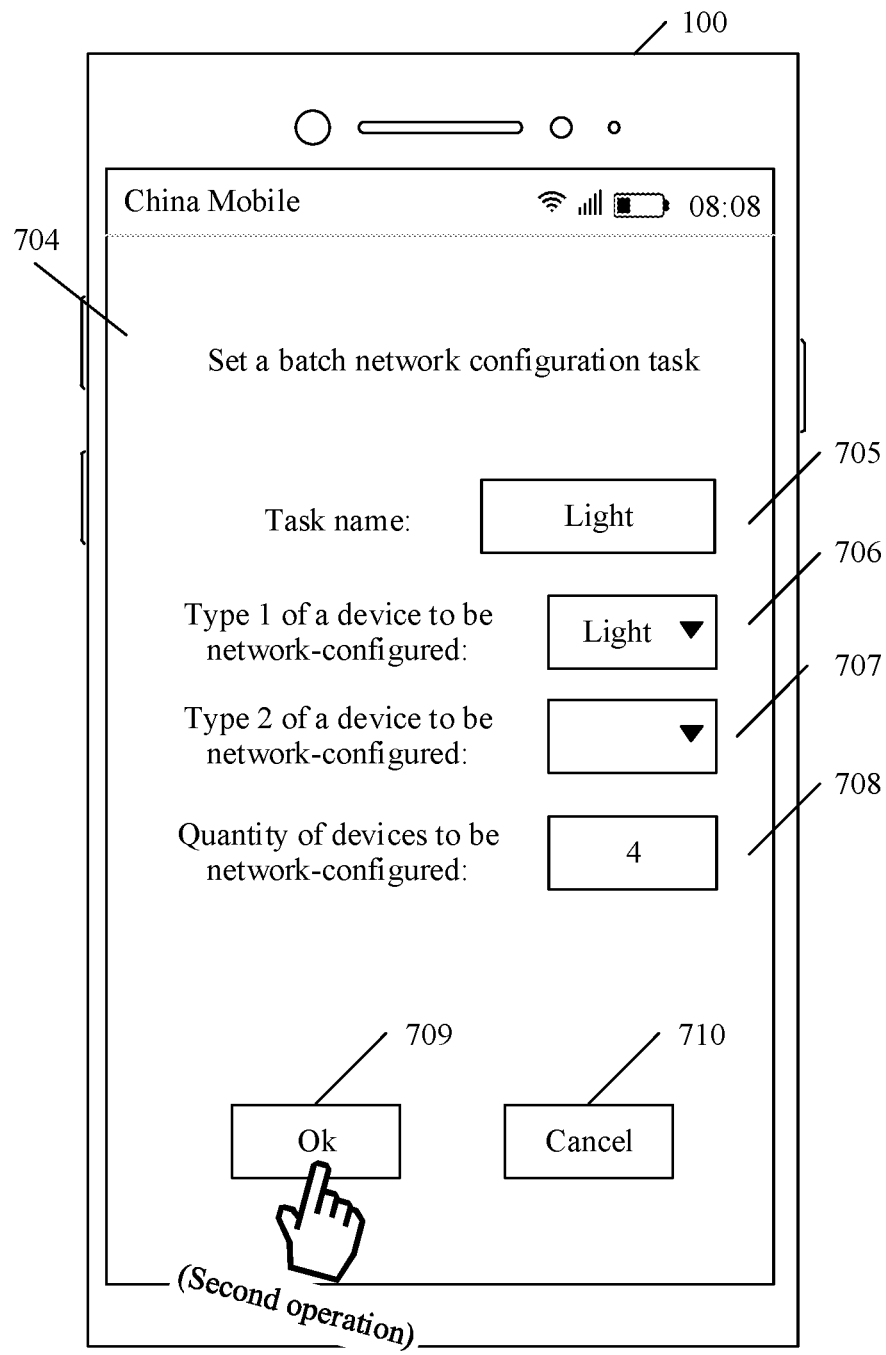

For example, as shown in FIG. 8A, the mobile phone 100 may receive and display the quantity 4 of home devices to be network-configured and that is set by the user in the setting item 708 for the "quantity of home devices to be network-configured", and receive and display a device type "light" of a home device to be network-configured and that is set in the setting item 706 for "type 1 of a home device to be network-configured".

Optionally, the second interface may further include a task name setting item for batch network configuration. For example, the task name setting item is a "task name" setting item 705 shown in FIG. 7B. The task name setting item is configured to set a task name of this batch network configuration.

The user can set a task name of batch network configuration to task 1, task 2, or task 3.

Figures 8B, 8C:
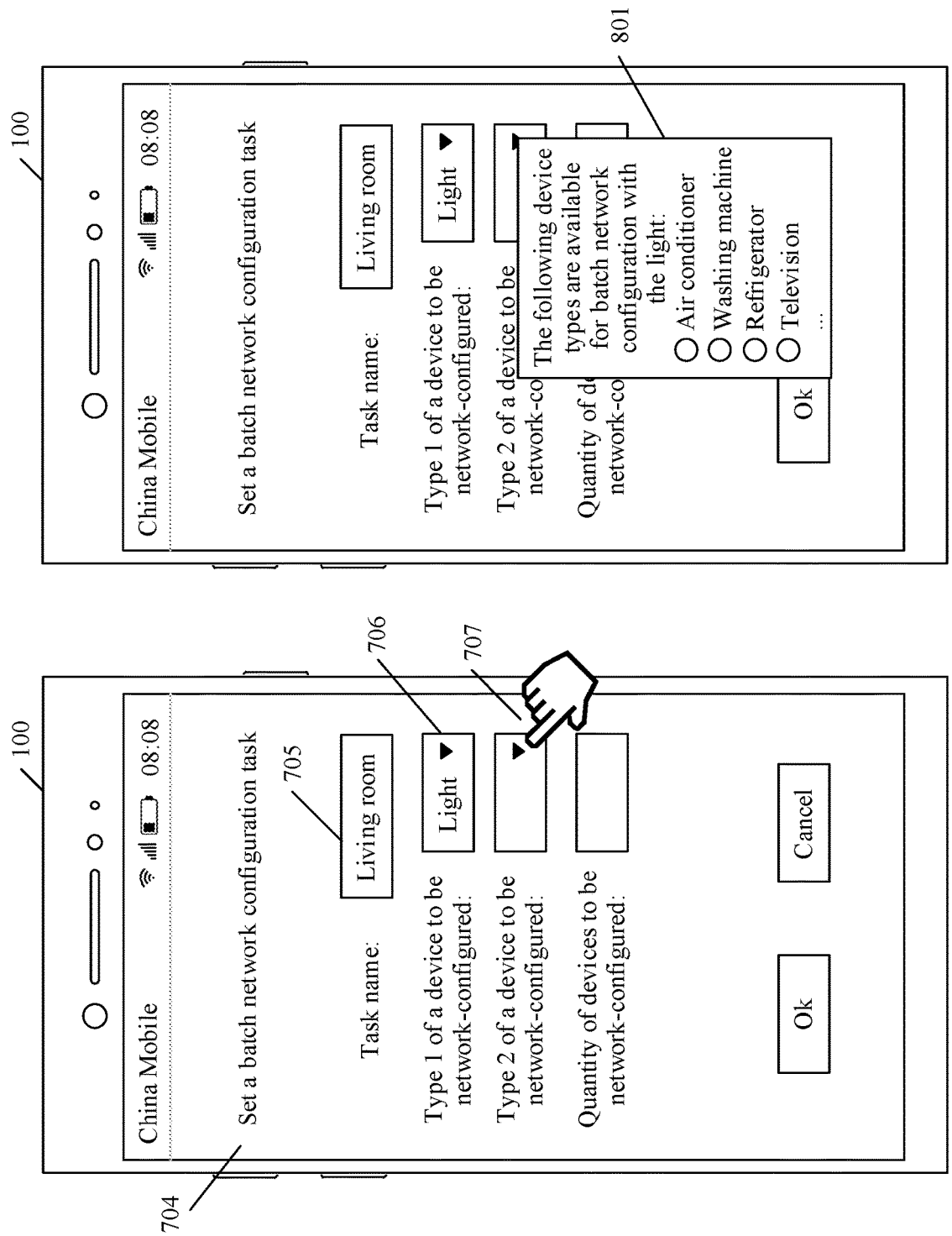

Alternatively, when the user performs network configuration for home devices of various device types in batches based on the device type of the home device, the user may set a task name of batch network configuration based on the device type, such as a smart speaker, a light, a smart refrigerator, or a smart washing machine. For example, as shown in FIG. 8A, the task name set in the "task name" setting item 705 is "light". Alternatively, when the user performs batch network configuration for home devices of various device types based on a placement area of the home device, the user may set a task name, based on an area in which a home device that currently needs network configuration is located, such as a bedroom, a living room, a restaurant, or the like for batch network configuration For example, as shown in FIG. 8B, the task name set in the "task name" setting item 705 is "living room".

It should be noted that the second interface includes a type setting item of at least one device to be network-configured, for example, the setting item 706 for "type 1 of a device to be network-configured", and the setting item 707 for "type 2 of a device to be network-configured". The user can set different device types for different devices to be network-configured.

For example, it is assumed that the user wants to perform batch network configuration for the three smart air conditioners and the two smart speakers shown in FIG. 1 at a time. In this case, the mobile phone 100 may receive and display a device type "air conditioner" (not shown in the figure) selected by the user in the setting item 706 for "type 1 of a device to be network-configured device" in the second interface 704 shown in FIG. 7B, receive a device type "speaker" (not shown in the figure) selected by the user in the setting item 707 for "type 2 of a device to be network-configured", and display a quantity 5 (not shown in the figure) input by the user in the setting item 708 for the "quantity of home devices to be network-configured".

In other words, the mobile phone 100 may receive one or more device types set by the user on the second interface. To be specific, the mobile phone 100 may perform batch network configuration for home devices of a same device type at a time, or may perform batch network configuration for a plurality of home devices of different device types at a time. This is not limited in this embodiment of this application.

It should be noted that only home devices with a same network configuration process can be configured in batches in the same network configuration process. For example, home devices of a same device type have a same network configuration process, and may be configured in batches in the same network configuration process. Home devices of different device types may have a same network configuration process, and may be configured in batches in the same network configuration process. Most home devices have a same network configuration process, and may be configured in batches in the same network configuration process. However, some home devices have network configuration processes different from network configuration processes of other home devices, and cannot be configured in batches in a same network configuration process with the other home devices. A reason that different home devices have different network configuration processes may include at least the following two aspects.

(1): Different home devices support different Wi-Fi types, to have different network configuration processes. For example, some home devices support the Wi-Fi 6 standard, while currently most home devices support the Wi-Fi 4 standard and/or the Wi-Fi 5 standard. A network configuration process of a home device that supports the Wi-Fi 6 standard is different from a network configuration process of a home device that supports the Wi-Fi 4 standard and/or the Wi-Fi 5 standard.

(2): Some home devices not only need register with the cloud server 130 as IoT devices, but also need to be used as other functional devices to provide a service for a user or another device. For example, some routers not only serve as IoT devices to register with the cloud server 130, but also serve as gateways to access a network and provide a wireless local area network for another home device. The network configuration process of this type of router is different from a network configuration process of another home device.

To avoid a network configuration failure caused by different network configuration processes of home devices of a plurality of device types that are set by the user on the second interface, the mobile phone 100 may prompt, in the following implementation, the user to select home devices with a same network configuration process to perform batch network configuration.

The second interface includes a type setting item of the at least one device to be network-configured. The type setting item of the at least one network device to be network-configured includes a first type setting item and a second type setting item, for example, the setting item 706 for "type 1 of a device to be network-configured", and the setting item 707 for "type 2 of a device to be network-configured" shown in FIG. 7B, FIG. 8A, or FIG. 8B.

In an implementation, the mobile phone 100 may receive and display the first device type that is set by the user in the first type setting item. For example, the mobile phone 100 may receive and display the first device type "light" set by the user in the setting item 706 for "type 1 of a device to be network-configured" shown in FIG. 8B.

Then, the mobile phone 100 receives a tap operation performed by the user on a drop-down menu button in the second type setting item. In response to the tap operation, the mobile phone 100 may display a plurality of options of the second device type. Network configuration processes of the plurality of home devices of the second device type are the same as the network configuration process of the home device of the first device type, and batch network configuration may be performed in one network configuration process.

For example, the mobile phone 100 may receive a tap operation performed by the user on a drop-down menu button in the setting item 707 for "type 2 of a device to be network-configured" shown in FIG. 8B. In response to the tap operation, the mobile phone 100 may display a device type selection window 801 shown in FIG. 8C. The device type selection window 801 includes a plurality of second device type options, such as an option of an air conditioner, an option of a washing machine, an option of a refrigerator, and an option of a television. The network configuration processes of the air conditioner, washing machine, refrigerator, and television are the same as a network configuration process of a light, so that batch network configuration can be performed in one network configuration process.

Optionally, the device type selection window 801 may further include prompt information "the following device types are available for batch network configuration with the light".

In this implementation, the mobile phone 100 may provide, in the second type setting item, the user with an option of a device type that can be used for batch network configuration with home devices of the first device type that is set in the first type setting item. In this way, the user may set, in the second type setting item, a device type that can be used for batch network configuration with home devices of the first device type. In this way, a success rate of batch network configuration can be increased.

In another implementation, the mobile phone 100 may receive and display the first device type that is set by the user in the first type setting item. Then, the mobile phone 100 receives a tap operation performed by the user on a drop-down menu button in the second type setting item. In response to the tap operation, the mobile phone 100 may display a plurality of options of the third device type. The mobile phone 100 may receive a selection operation performed by the user on a fourth device type option among the plurality of third device type options. The fourth device type is one of the foregoing plurality of third device types. A network configuration process of the home device of the fourth device type is different from the network configuration process of the home device of the first device type, and batch network configuration cannot be performed in one network configuration process. In response to a selection operation performed by the user on the fourth device type option, the mobile phone 100 may send first prompt information. The first prompt information is used to notify that the network configuration process of the home device of the fourth device type is different from the network configuration process of the home device of the first device type. The first prompt information may further prompt the user to reset the device type in the second type setting item.

For example, the mobile phone 100 may receive a tap operation performed by the user on a drop-down menu button in the setting item 707 for "type 2 of a device to be network-configured" shown in FIG. 8B. In response to the tap operation, the mobile phone 100 may display a device type selection window 802 shown in FIG. 8D. The device type selection window 802 includes a plurality of third device type options, such as an option of an air conditioner, an option of a router, an option of a refrigerator, and an option of a television. The network configuration processes of the air conditioner, refrigerator, and television are the same as a network configuration process of a light, so that batch network configuration can be performed in one network configuration process. However, the network configuration process of the router may be different from the network configuration process of the light, and batch network configuration cannot be performed in one network configuration process.

In response to a selection operation performed by the user on the option (that is, the fourth device type option) of the router shown in FIG. 8D, the mobile phone 100 may display first prompt information 803 shown in FIG. 8E, for example, "a risk of a network configuration failure may exist in batch network configuration between the router and the light. Please confirm again." The first prompt information may further include an "ok" button and a "reset" button. The "ok" button is used to trigger the mobile phone 100 to display the fourth device type in the second type setting item. The "reset" button is used to trigger the mobile phone 100 to redisplay the plurality of third device type options, so that the user reselects a device type.

In this implementation, when the user sets, in the second type setting item, an option of a device type that has a network configuration failure risk in batch network configuration of home devices of the first device type, prompt information is sent to the user. In this way, a possibility of a network configuration failure caused by an improper device type selected by the user can be reduced, and a success rate of batch network configuration can be increased. In addition, network configuration experience of the user may be further prompted.

In some other embodiments, the second interface may include a code scanning control used to trigger the mobile phone 100 to enable a code scanning function. A two-dimensional code tag or a bar code tag may be pasted on the home device. The user may control the mobile phone 100 to scan a two-dimensional code tag or a bar code tag pasted on a home device to be network-configured. The mobile phone 100 may obtain, by scanning the two-dimensional code tag or the bar code tag, the device type of the home device to be network-configured. For example, the setting item 706 for "type 1 of a device to be network-configured" and the setting item 707 for "type 2 of a device to be network-configured" on the second interface may be replaced with a scanning control.

S504: In response to a second operation on the second interface, the mobile phone 100 requests the cloud server 130 to allocate a registration credential to M home devices to be network-configured.

The second operation is used to trigger the mobile phone 100 to request the cloud server 130 to allocate a registration credential to the M home devices to be network-configured. For example, the second operation may be a preset gesture input by the user on the second interface, for example, any gesture such as an L-shaped gesture, an S-shaped gesture, or a √-shaped gesture. The second operation is different from the foregoing first operation.

For another example, the second interface includes a button used to trigger the mobile phone 100 to request the cloud server 130 to allocate the registration credential to the M home devices to be network-configured, for example, an "ok" button 709 shown in FIG. 7B or FIG. 8A. In response to a second operation (for example, a tap operation) performed by the user on the "ok" button 709, the mobile phone 100 may request the cloud server 130 to allocate the registration credential to the M home devices to be network-configured. A "cancel" button 710 shown in FIG. 7B or FIG. 8A is used to trigger the mobile phone 100 to cancel a batch network configuration task. For example, in response to a tap operation performed by the user on the "cancel" button 710, the mobile phone 100 may display the first interface 701 shown in FIG. 7A.

For a specific method for requesting, by the mobile phone 100, the cloud server 130 to allocate the registration credential to the M home devices to be network-configured, refer to detailed descriptions in the following embodiments. Details are not described herein again.

S505: The mobile phone 100 displays a third interface, and broadcasts the first message by using a weak antenna.

The first message is broadcast by the mobile phone 100 by using the weak antenna (that is, the first antenna), and therefore may be referred to as an ultra-short-range message or a short-range message. The third interface includes first icons of the M home devices to be network-configured and first state information of the home device to be network-configured. The first state information is used to indicate that the home device is in a to-be-network-configured state, that is, a state of waiting for network configuration. For example, in response to the second operation performed by the user on the second interface (for example, a tap operation performed by the user on the "ok" button 709 shown in FIG. 8A), the mobile phone 100 may display a third interface 901 shown in FIG. 9A. The third interface 901 includes first state information of four lights, for example, "to be network-configured".

The first icon of each of the M home devices is obtained based on a device type of the home device. The first icon corresponding to each device type is a general icon of a home device of this device type. In other words, for home devices of a same device type, first icons of the home devices are the same. For example, the third interface 901 shown in FIG. 9A includes first icons of four lights, such as a first icon 904, a first icon 905, a first icon 906, and a first icon 907. The four lights include three smart light bulbs and one smart desk lamp shown in FIG. 1. Although the smart light bulb shown in FIG. 1 is different from the smart desk lamp, because a device type of both the smart light bulb and the smart desk lamp is "light", the four first icons on the third interface 901 are the same.

In some embodiments, the mobile phone 100 (for example, the first APP of the mobile phone 100) may pre-store a first icon (that is, a general icon) of a home device of each device type. In this way, in response to the second operation, the mobile phone 100 may search pre-stored general icons of home devices of a plurality of device types for the first icon of the home device of the device type that is set by the user on the second interface, and then the mobile phone 100 may display the third interface including the first icon.

For example, the mobile phone 100 may pre-store general icons of home devices of various device types shown in Table 2.

TABLE 2

| Device type and general icon | |
|---|---|
| Device type (device type) | General icon |
| Device type A (for example, a light) | General icon a |
| Device type B (for example, a washing machine) | General icon b |
| . . . | . . . |

In some other embodiments, in response to the second operation, the mobile phone 100 may obtain, from the cloud server 130, the first icon of the home device of the device type that is set by the user on the second interface.

Specifically, in response to the foregoing second operation, the mobile phone 100 may send, to the cloud server 130, indication information of the device type set by the user on the second interface. After receiving the indication information of the device type, the cloud server 130 may send second configuration information (also referred to as common configuration information) of a home device of the device type to the mobile phone 100.

The general configuration information may alternatively be referred to as a general profile. The cloud server 130 stores general profiles of home devices of a plurality of device types. General configuration information (for example, a general profile) of a home device of each device type may include a general identifier (that is, a first identifier) of a home device of this device type.

Optionally, a general profile of a home device of each device type may further include other configuration information of a home device of this device type, and the other configuration information may include information such as an icon of a basic function of the home device of this device type. For example, other configuration information of a home device whose device type is "light" may include an on/off icon, a brightness adjustment icon, and the like. For another example, other configuration information of a home device whose device type is "air conditioner" may include an on/off icon, a temperature adjustment icon, and the like.

In some other embodiments, when requesting the cloud server 130 to allocate the registration credential to the M home devices to be network-configured, the mobile phone 100 may obtain, from the cloud server 130, a general profile of a home device of a device type that is set by the user on the second interface.

In this embodiment, in response to the second operation on the second interface, the mobile phone 100 may perform a neighborhood aware network (neighborhood aware network, NAN) broadcast and network configuration process. Specifically, steps S504 and S505 may be replaced with steps S1 to S4 shown in FIG. 9B-1 and FIG. 9B-2. That is, the foregoing NAN broadcast and network configuration process may include steps S1 to S4.

S1: The mobile phone 100 sends a first request to the cloud server 130 in response to the second operation on the second interface. The first request includes a first account and indication information of the device type set by the user on the second interface.

The first request is used to request the cloud server 130 to allocate a registration credential token to the M home devices of the foregoing device type. The registration credential token is used to perform authentication when the M home devices of the foregoing device type register with the cloud server 130.

S2: The cloud server 130 receives the first request from the mobile phone 100, allocates a registration credential 1 to the M home devices of the foregoing device type, and stores the first account, the device type, the registration credential 1, and a correspondence between the first account, the device type, and the registration credential 1.

The cloud server 130 may allocate a same registration credential to a plurality of home devices for which batch network configuration is performed at a time. For example, the cloud server 130 may allocate the same registration credential 1 to the M home devices of the foregoing device type. However, for home devices that do not belong to same batch network configuration, the cloud server 130 allocates different registration credentials to the home devices. For example, the cloud server 130 may store an APP account, a device type, and a registration credential that are shown in Table 3, and a correspondence between the app account, the device type, and the registration credential.

TABLE 3

| APP account, device type, and registration credential | | |
|---|---|---|
| APP account | Device type | Registration credential |
| Account-1 | Device type C (for example, an air conditioner) | Token 2 |
| | Device type B (for example, a washing machine) | |
| Account-1 | Device type D (for example, a speaker) | Token 3 |
| . . . | . . . | . . . |
| Account-2 (For example, a first account) | Device type A (for example, a light) | Token 1 |

As shown in Table 3, when an electronic device (for example, a tablet computer) of a first APP login account-1 performs batch network configuration for a home device (for example, an air conditioner) of the device type C and the device type B (for example, a washing machine), the registration credential allocated by the cloud server 130 to the air conditioner and the washing machine for current batch network configuration is token 2. When a tablet computer of the first APP login account-1 performs batch network configuration for a home device (for example, a speaker) of the device type D, the registration credential allocated by the cloud server 130 to the speaker for current batch network configuration is token 3. The token 3 is different from token 2.

When an electronic device (for example, the mobile phone 100) of a first APP login account-2 (for example, the foregoing first account) performs batch network configuration for a home device (for example, a light) of the device type A, the registration credential allocated by the cloud server 130 to the air conditioner and the washing machine for this batch network configuration is token 1 (that is, the foregoing registration credential 1). The token 1 is different from token 2, and the token 1 is different from token 3.

The registration credential may be randomly generated by the cloud server 130; or the registration credential may be generated by the cloud server 130 by using a preset algorithm. This is not limited in this embodiment of this application.

In some other embodiments, the first request further includes a quantity M of home devices to be network-configured. In this embodiment, the cloud server 130 may further store the first account, the foregoing device type, the quantity M, the registration credential 1, and a correspondence between the first account, the foregoing device type, the quantity M, and the registration credential 1. For example, the cloud server 130 may store an APP account, a device type, a quantity of home devices to be network-configured, a registration credential, and a correspondence between the app account, the device type, the quantity of home devices to be network-configured, and the registration credential that are shown in Table 4.

TABLE 4

APP account, device type, quantity of home devices to be network-configured, and registration credential

| APP account | Device type | Quantity of home devices to be network-configured | Registration credential |
|---|---|---|---|
| Account-1 | Device type C (for example, an air conditioner) Device type B (for example, a washing machine) | 3 | Token 2 |
| Account-1 | Device type D (for example, a speaker) | 2 | Token 3 |
| ... | ... | ... | ... |
| Account-2 (For example, a first account) | Device type A (for example, a light) | 4 | Token 1 |

S3: The cloud server 130 sends a first response to the mobile phone 100. The first includes second configuration information and the registration credential 1.

The second configuration information is general configuration information of a home device of a device type that is set by the user on the second interface, that is, a general profile.

It should be noted that, in this embodiment of this application, the mobile phone 100 may communicate with the cloud server 130 in an encryption manner. In other words, in a process which the mobile phone 100 performs wireless communication with the cloud server 130, all transmitted data is encrypted. In this way, data security of wireless communication can be improved. For example, a key or a password used by the mobile phone 100 to perform wireless communication with the cloud server 130 may be negotiated by the mobile phone 100 and the cloud server 130.

S4: The mobile phone 100 receives the first response, obtains, from the second configuration information in the first response, a first icon of the home device to be network-configured, displays a third interface, and broadcasts a first message by using a weak antenna.

The third interface includes the first icon. The third interface further includes first state information of the home device to be network-configured.

Optionally, the third interface may further include second prompt information. The second prompt information is used to prompt the user to make the mobile phone 100 approach the home device to be network-configured. For example, the third interface 901 shown in FIG. 9A may further include second prompt information 908 "Put the mobile phone close to devices to be network-configured."

Figure 9A:
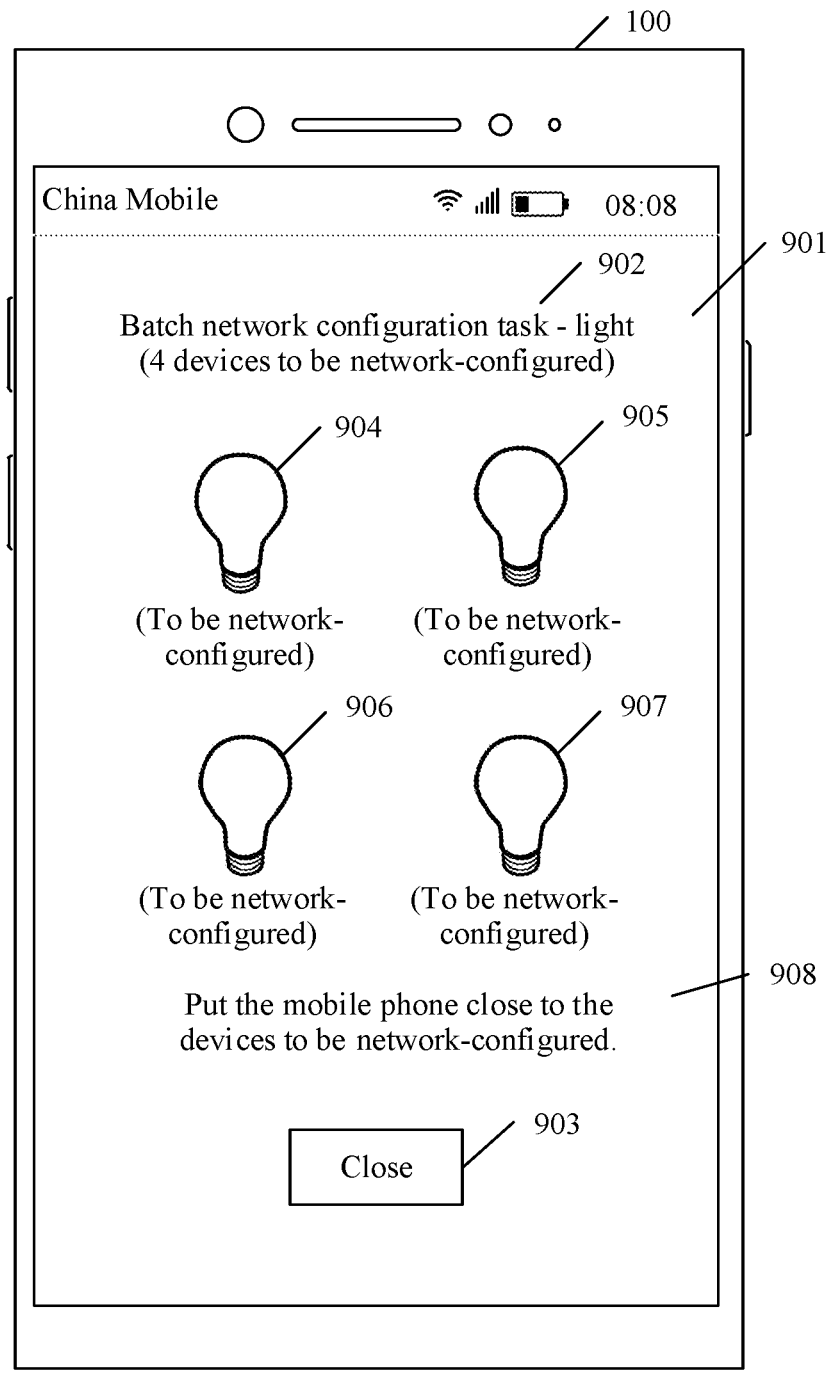
FIG. 9A is a schematic diagram of another display interface of an electronic device according to an embodiment of this application.

Optionally, the third interface may further include indication information used to indicate a device type and a quantity of home devices to be network-configured, for example, indication information 902 shown in FIG. 9A.

The first message (namely, an ultra-short-range message or a short-range message) in this embodiment of this application may include an SSID and an access password that are of the wireless local area network and that are provided by the router 120, and the registration credential 1. The first message may further include the first account. The first account and the registration credential 1 are used to perform authentication when the home device registers with the cloud server 130.

For example, the mobile phone 100 may send the first message at a high frequency. For example, the mobile phone 100 may send K first messages per second. For example, K may be any value such as 100, 150, 200, 300, 500, or 600.

In step S505 or S4, a time at which the mobile phone 100 broadcasts the first message by using the weak antenna may be determined based on the quantity M of home devices to be network-configured. A larger quantity M of the home devices to be network-configured indicates a longer time for the mobile phone 100 to broadcast the first message by using the weak antenna.

An effective transmission distance for the mobile phone 100 to perform wireless communication by using the weak antenna is a first distance. An effective transmission distance for the mobile phone 100 to perform wireless communication by using a strong antenna is a second distance. For example, the second distance may be any distance such as 5 meters, 3 meters, 4 meters, or 6 meters. The first distance is a distance less than 0.1 meter, such as 3 centimeters, 4 centimeters, or 5 centimeters.

In other words, when the mobile phone 100 uses the strong antenna, if a distance between the mobile phone 100 and a home device is less than the second distance, the mobile phone 100 may communicate with the home device. When the mobile phone 100 uses the weak antenna, if a distance between the mobile phone 100 and the home device is less than the first distance, the mobile phone 100 may communicate with the home device.

It may be understood that an effective transmission distance for the mobile phone 100 to perform wireless communication by using the weak antenna is a first distance (for example, 0.3 meter). The first message sent by the mobile phone 100 can be received only when a distance between another device (for example, the home device 200) and the mobile phone 100 is less than the first distance. However, the first message sent by the mobile phone 100 cannot be received when a distance between another device and the mobile phone 100 is greater than the first distance. After receiving the first message, the another device may access, by using the SSID and the access password in the first message, the wireless local area network provided by the router 120, or may register with the cloud server 130 by using the registration credential 1 in the first message.

In this embodiment of this application, ultra-short-range communication is used, so that it can be ensured that the first message (that is, an ultra-short-range message or a short-range message) sent by the mobile phone 100 is not received by another device, and security of data transmission between the mobile phone 100 and the home device can be ensured. Further, another device can be prevented from accessing, by using the SSID and the access password in the first message, the wireless local area network provided by the router 120, and another device can be prevented from registering with the cloud server 130 by using the registration credential 1 in the first message, so that user information security is protected.

After step S505, the user may put, based on a prompt on the third interface, the mobile phone 100 close to a home device to be network-configured 200 (for example, the smart light bulb or the smart desk lamp shown in FIG. 1). The user may hold the mobile phone 100 close to each home device to be network-configured for 1 second to 2 seconds. In this way, all home devices to be network-configured can receive the first message. In this embodiment of this application, that the mobile phone 100 may be close to the home device to be network-configured means that a distance between the mobile phone 100 and the home device to be network-configured is 3 centimeters to 5 centimeters.

After putting the mobile phone 100, by the user, close to the home device to be network-configured (for example, the smart light bulb 1) enables a distance between the mobile phone 100 and the smart light bulb 1 to be within the first distance, the smart light bulb 1 may receive the first message sent by the mobile phone 100. After step S505, the method in this embodiment of this application may further include steps S506 to S509.

S506: The smart light bulb 1 receives the first message broadcast by the mobile phone 100, and accesses, by using the SSID and the access password in the first message, the wireless local area network provided by the router 120.

For a method for accessing, by the home device to be network-configured 200, the wireless local area network provided by the router 120 by using the SSID and the access password, refer to related descriptions in a conventional technology. Details are not described herein again.

Figure 10A:
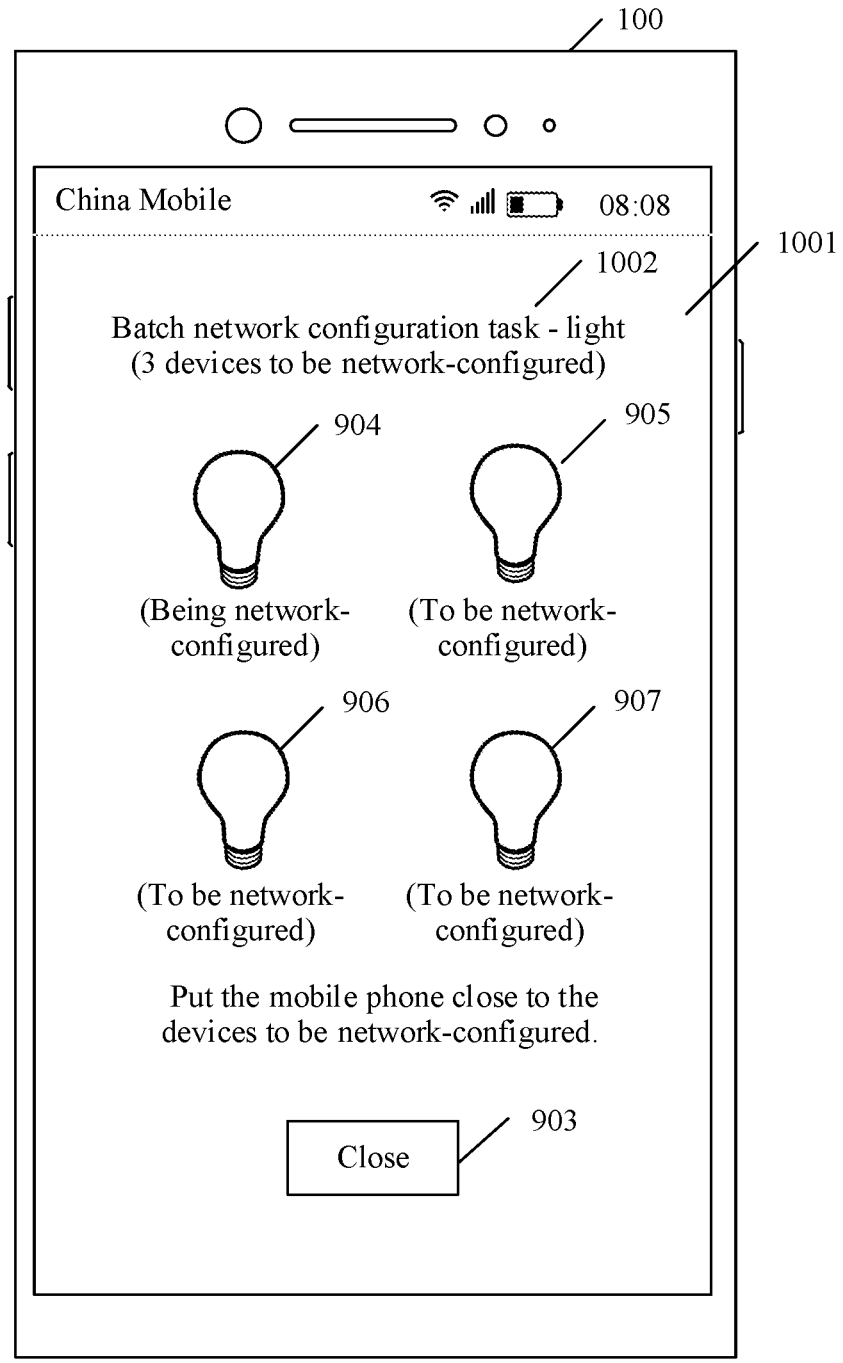
FIG. 10A and FIG. 10B are schematic diagrams of other display interfaces of an electronic device according to an embodiment of this application.

In some embodiments, after the smart light bulb 1 receives the first message broadcast by the mobile phone 100, or after the smart light bulb 1 accesses the wireless local area network provided by the router 120, the method in this embodiment of this application further includes steps S506' and S506". S506': The smart light bulb 1 may send a response message 1 of the first message to the mobile phone 100. The response message 1 is used to indicate that network configuration is being performed for the smart light bulb 1. After receiving the response message 1, the mobile phone 100 may perform step S506". S506": The mobile phone 100 updates first state information of a first icon on the third interface to second state information. The second state information is used to indicate that network configuration is being performed for the home device. For example, the mobile phone 100 may display a third interface 1001 shown in FIG. 10A, and first state information "to be network-configured" of the first icon 904 on the third interface 1001 is updated to second state information "being network-configured". Optionally, the mobile phone 100 may further update indication information for indicating a quantity of home devices to be network-configured in the third interface. For example, the mobile phone 100 may update the indication information 902 shown in FIG. 9A to indication information 1002 shown in FIG. 10A.

In this embodiment, the mobile phone 100 may update a network configuration state of the home device in time. For example, the mobile phone 100 may update the first state information (for example, "to be network-configured") to the second state information (for example, "being network-configured") in time. In this way, it can be convenient for the user to learn a network configuration progress of the home device, and user experience in a network configuration process of the home device can be improved.

In some other embodiments, the response message 1 may further include an identifier of the smart light bulb 1. The identifier of the smart light bulb 1 is different from a device identifier (Device ID) allocated by the cloud server to the smart light bulb 1. The identifier of the smart light bulb 1 may be an identifier that is of the smart light bulb 1 and that can be used to uniquely identify the smart light bulb 1 before delivery. For example, the identifier of the smart light bulb 1 may be an SN of the smart light bulb 1.

S507: The smart light bulb 1 sends a registration request a to the cloud server 130. The registration request a includes a registration credential 1, a first account, indication information of a product type (Product Type) a of the smart light bulb 1, and an SN a of the smart light bulb 1.

The product type a of the smart light bulb 1 is a subtype of the device type of the smart light bulb 1. For detailed descriptions of the product type, the device type, and the SN, refer to related descriptions in the foregoing embodiments. Details are not described herein again.

S508: The cloud server 130 receives the registration request a, and performs authentication on the registration credential 1 and/or the product type a of the smart light bulb 1 based on the first account in the registration request a.

It can be learned from the foregoing description that the cloud server 130 stores a registration credential allocated by the cloud server 130, an APP account that requests to allocate the registration credential, a device type of a home device that is to use the registration credential, and a correspondence between the registration credential, the APP account and the device type. For example, the cloud server 130 may store the APP account, the device type, and the registration credential that are shown in Table 2 and Table 3, and a correspondence between the APP account, the device type, and the registration credential.

Figures 1, 9B:
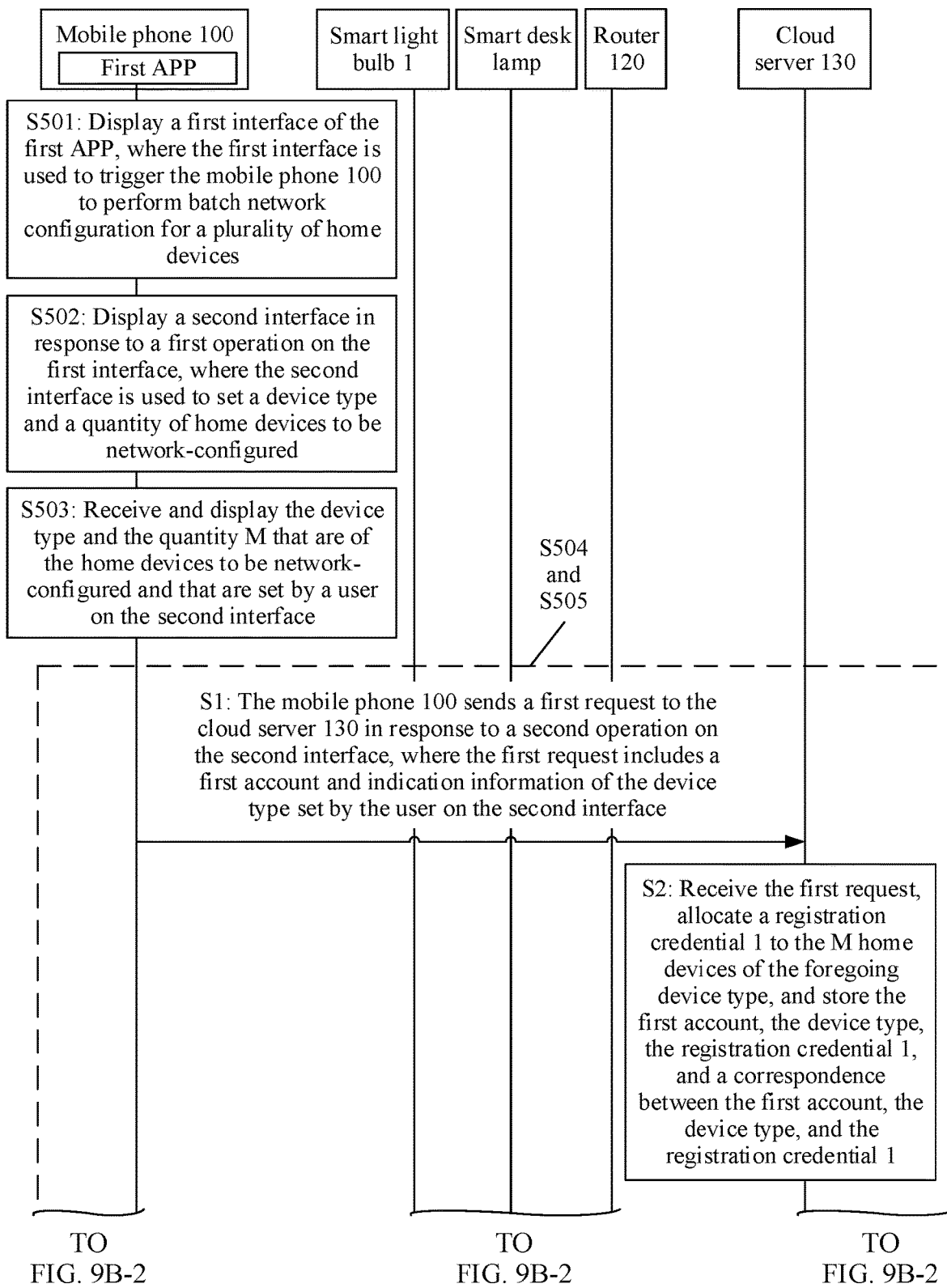
Figures 2, 9B:
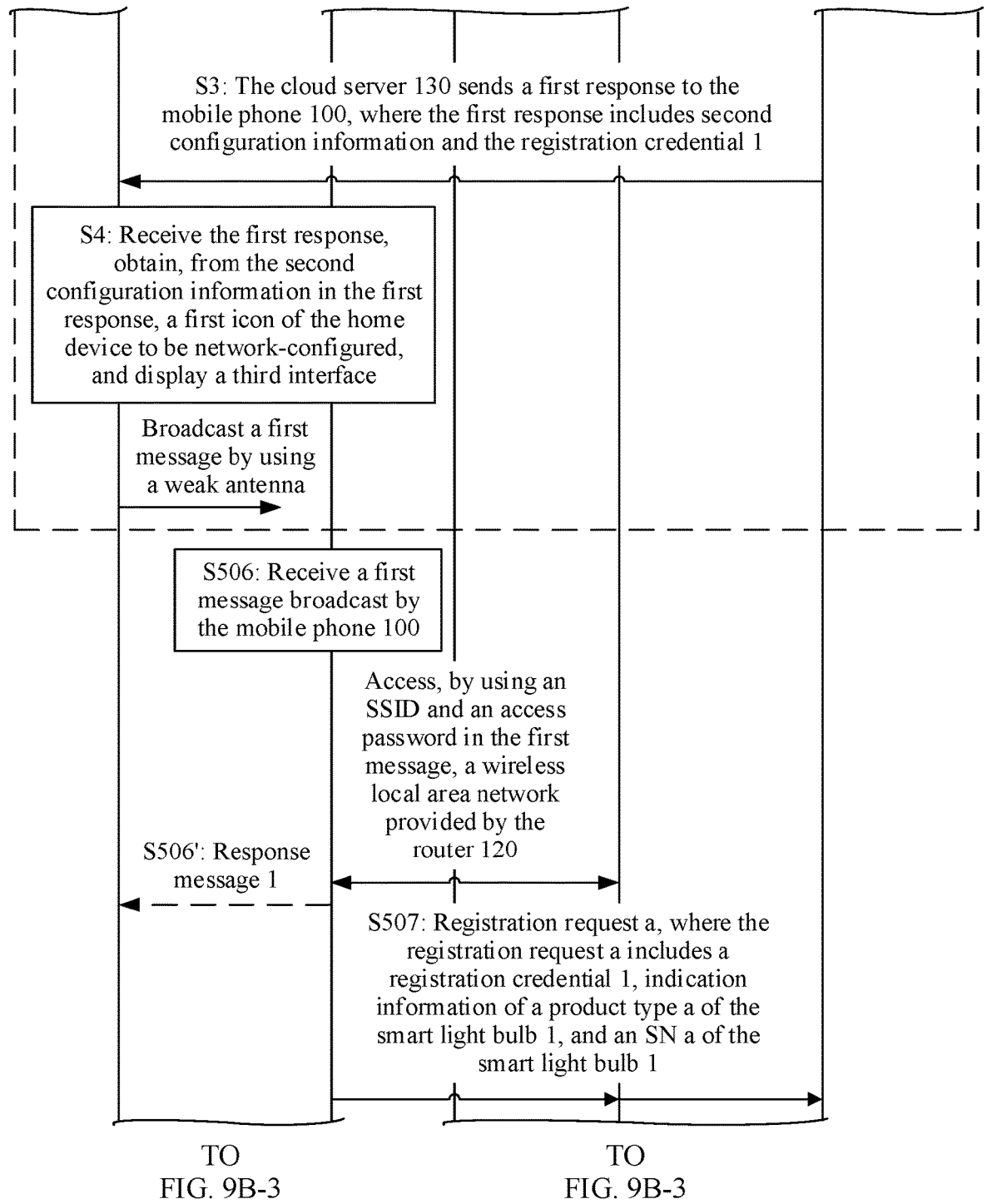
Figures 3, 9B:
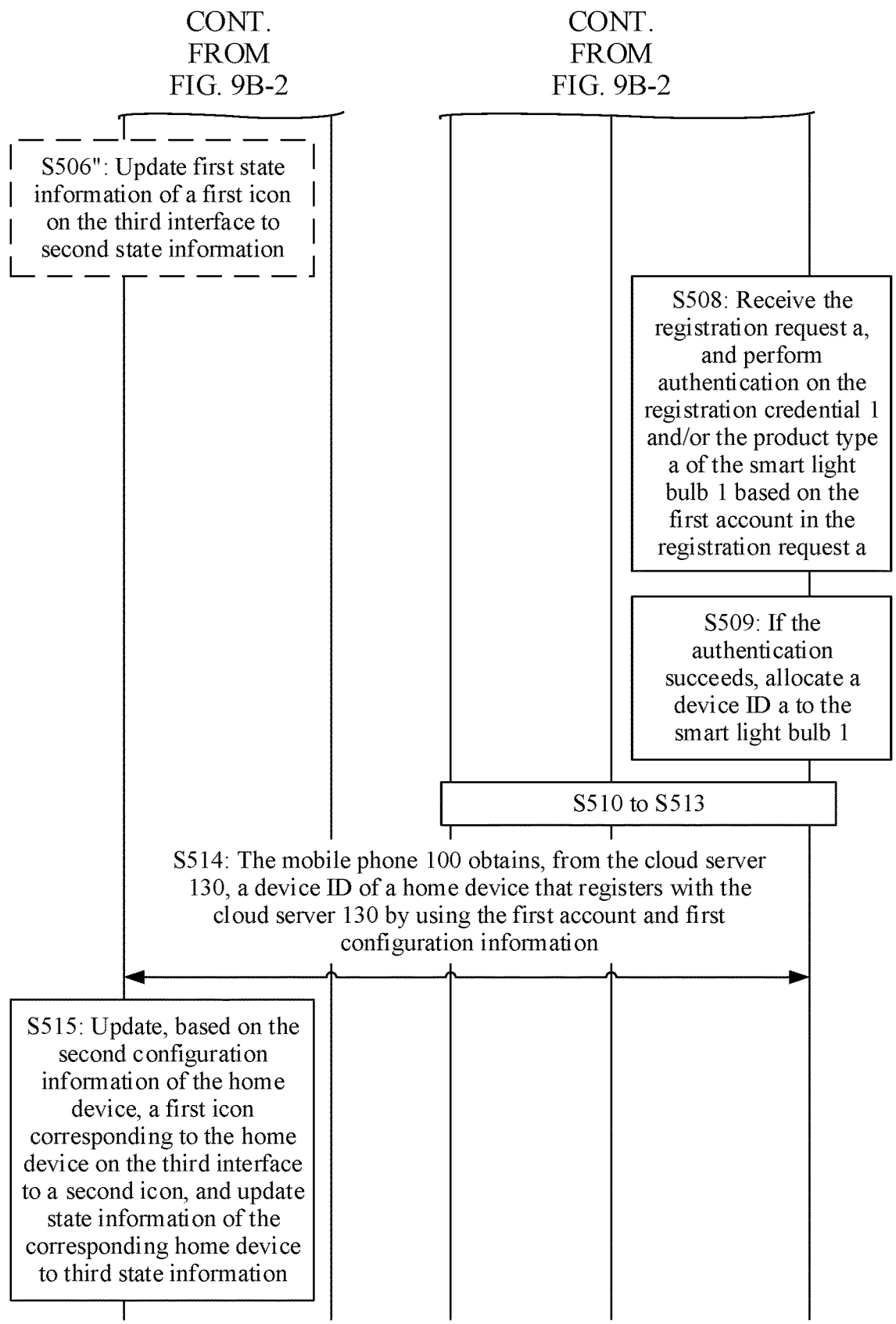
Figure 9C:
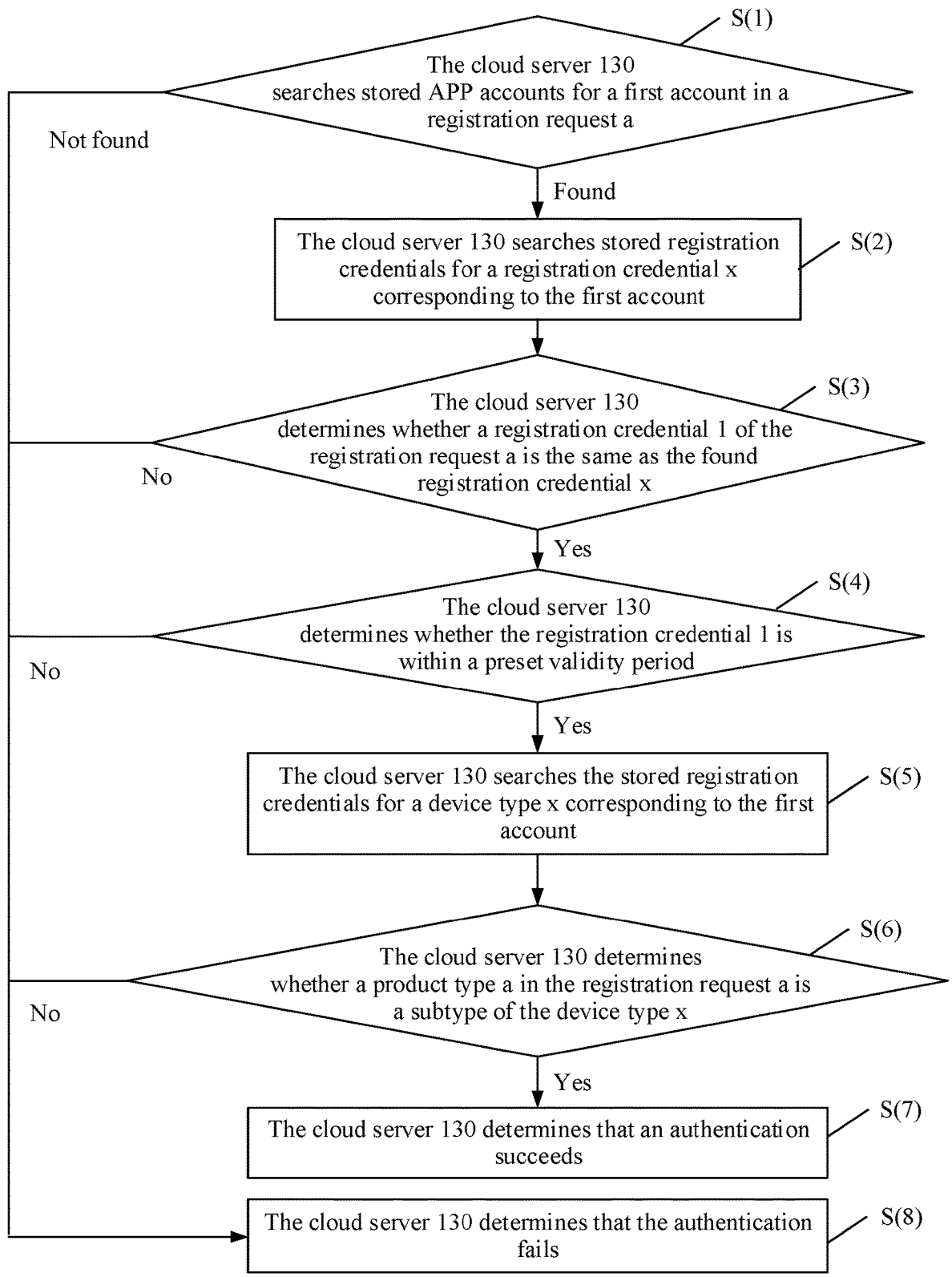
FIG. 9C is a flowchart of a method for performing authentication by a cloud server according to an embodiment of this application.

Based on this, as shown in FIG. 9C, that the cloud server 130 performs authentication on the registration credential 1 and the product type a of the smart light bulb 1 based on the first account in the registration request a may include steps S(1) to S(8).

S(1): The cloud server 130 searches stored APP accounts for the first account in the registration request a.

After step S(1), if the cloud server 130 finds the first account, it indicates that an electronic device has logged in to the first APP by using the first account to request the cloud server 130 to apply for a registration credential for a home device to be network-configured. In this case, the cloud server 130 may perform step S(2).

After step S(1), if the cloud server 130 does not find the first account, it indicates that no electronic device logs in to the first APP by using the first account to request the cloud server 130 to apply for a registration credential for a home device to be network-configured. The first account may be a false account. In this case, the cloud server 130 may perform step S(8) to determine that the authentication fails.

S(2): The cloud server 130 searches stored registration credentials for a registration credential x corresponding to the first account. After step S(2), the cloud server 130 may perform step S(3).

S(3): The cloud server 130 determines whether the registration credential 1 of the registration request a is the same as the found registration credential x.

After step S(3), if the registration credential 1 in the registration request a is the same as the found registration credential x, it indicates that the registration credential 1 is a registration credential allocated by the cloud server 130 to the home device to be network-configured. In this case, the cloud server 130 may perform step S(4).

After step S(3), if the registration credential 1 in the registration request a is different from the found registration credential x, it indicates that the registration credential 1 is not the registration credential allocated by the cloud server 130 to the home device to be network-configured. The registration credential 1 is a false certificate. In this case, the cloud server 130 may perform step S(8) to determine that the authentication fails.

S(4): The cloud server 130 determines whether the registration credential 1 is within a preset validity period.

The preset validity period of the registration credential refers to first preset duration starting from the time when the cloud server 130 allocates the registration credential to the home device to be network-configured. For example, the first preset duration may be 30 minutes, 15 minutes, 10 minutes, 1 hour, 2 hours, 3 hours, or the like. The first preset duration may be preconfigured; or the first preset duration may be set by a user.

When allocating the registration credential 1 to the home device to be network-configured, the cloud server 130 may set a timestamp, to record start time within a preset validity period of the registration credential 1. The cloud server 130 performs step S(4), may search for the timestamp of the registration credential 1, and determine, based on current time, the start time recorded in the timestamp, and the first preset duration, whether the registration credential 1 falls within the preset validity period.

After step S(4), if the registration credential 1 is within the preset validity period, the cloud server 130 may perform step S(5). If the registration credential 1 is not within the preset validity period, the cloud server 130 may perform step S(8) to determine that the authentication fails.

It should be noted that step S(4) is optional, and the cloud server 130 may not perform step S(4). Specifically, after step S(3), if the registration credential 1 in the registration request a is the same as the found registration credential x, the cloud server 130 may directly perform step S(5).

S(5): The cloud server 130 searches the stored registration credential for a device type x corresponding to the first account. After step S(5), the cloud server 130 may perform step S(6).

S(6): The cloud server 130 determines whether a product type a in the registration request a is a subtype of the device type x.

The cloud server 130 may store a plurality of product types in each device type. The plurality of product types in each device type may be pre-entered into the cloud server 130. Only a product type of a home device generated by a vendor certified by the cloud server 130 is entered into the cloud server 130. For example, the cloud server 130 may store a device type and product type table shown in Table 5.

TABLE 5

Device type and product type table

| Device type | Product type |
|---|---|
| Device type C (for example, an air conditioner) | Product type c<br>Product type d<br>. . . |
| Device type B (for example, a washing machine) | Product type e<br>. . . |
| Device type D (for example, a speaker) | Product type f<br>. . . |
| . . . | |
| Device type A (for example, a light) | Product type a (for example, a product type of a smart light bulb 1)<br>Product type b (for example, a product type of a smart desk lamp) |
| Device type B (for example, a washing machine) | Product type g<br>. . . |

As shown in Table 5, the cloud server 130 stores a plurality of product types in the device type A (for example, the light), for example, the product type a (that is, the product type of the smart light bulb 1) and the product type b (that is, the product type of the smart desk lamp).

After step S(6), if the product type a in the registration request a is a subtype of the device type x, it indicates that a home device of the product type a is a home device authenticated by the cloud server 130. In this case, the cloud server 130 may perform step S(7) to determine that the authentication succeeds.

After step S(6), if the product type a in the registration request a is not a subtype of the device type x, it indicates that a home device of the product type a is not a home device authenticated by the cloud server 130. In this case, the cloud server 130 may perform step S(8) to determine that the authentication fails.

S(7): The cloud server 130 determines that the authentication succeeds.

S(8): The cloud server 130 determines that the authentication fails.

In some other embodiments, the cloud server 130 may further first perform authentication on the product type a of the smart light bulb 1, and then perform authentication on the registration credential 1. For example, in this embodiment, after the cloud server 130 performs step S(1), if the cloud server 130 does not find the first account, the cloud server 130 performs step S(8). After step S(1), if the cloud server 130 finds the first account, perform step S(5). After step S(5), the cloud server 130 may perform step S(6). After step S(6), if the product type a in the registration request a is not a subtype of the device type x, the cloud server 130 may perform step S(8). After step S(6), if the product type a in the registration request a is a subtype of the device type x, the cloud server 130 may perform steps S(2) to S(4). After step S(4), if the registration credential 1 is within the preset validity period, the cloud server 130 may perform step S(7); or if the registration credential 1 is not within the preset validity period, the cloud server 130 may perform step S(8).

It should be noted that step S(4) is optional, and the cloud server 130 may not perform step S(4). Specifically, after step S(3), if the registration credential 1 in the registration request a is the same as the found registration credential x, the cloud server 130 may directly perform step S(7).

In some other embodiments, the first request further includes a quantity M of home devices to be network-configured. As shown in Table 4, the cloud server 130 further stores the quantity M. In this embodiment, the cloud server 130 may further determine whether a quantity of home devices that request to be registered by using the registration credential 1 exceeds the quantity M. For example, when the smart light bulb 1 is a $m^{th}$ home device that requests to be registered by using the registration credential 1, the authentication may succeed, where $1 \leq m \leq M$, and m is an integer; or when the smart light bulb 1 is an $(M+k)^{th}$ home device that requests to be registered by using the registration credential 1, the authentication fails, where $k \geq 1$, and k is an integer.

After step S508, if the authentication succeeds, the cloud server 130 may perform step S509 to allocate a device identifier (Device ID) to the smart light bulb 1. If the authentication fails, the cloud server 130 does not allocate a device ID to the smart light bulb 1.

In some embodiments, if the cloud server 130 determines that the registration credential 1 is not within the preset validity period, the cloud server 130 may delete, from Table 3 or Table 4, information such as the APP account, the device type, and the quantity of home devices to be network-configured that correspond to the registration credential 1.

S509: If the authentication succeeds, the cloud server 130 allocates a device ID a to the smart light bulb 1.

After step S509, the cloud server 130 may store SN a, the device ID a, and a correspondence between the SN a and the device ID a of the smart light bulb 1. The SN a is used to uniquely identify the smart light bulb 1.

Optionally, the cloud server 130 may store registration information of a home device 5 that has registered with the cloud server 130, for example, an APP account used by the home device in the cloud server 130, a product type of the home device, an SN of the home device, and a device ID of the home device.

For example, after the cloud server 130 allocates the device ID a to the smart light bulb 1, the cloud server 130 may store registration information of the smart light bulb 1 shown in Table 6.

TABLE 6

| Registration information of a smart light bulb 1 | | | |
| --- | --- | --- | --- |
| APP account | Product type | SN of a home device | Device ID of a home device |
| Account-2 (For example, a first account) | Product type a | *a* | Device ID a |

It may be understood that after putting the mobile phone 100 close to the smart light bulb 1, the user may immediately put the mobile phone 100 close to the smart desk lamp. After a distance between the mobile phone 100 and the smart desk lamp falls within the first distance, the smart desk lamp may receive the first message sent by the mobile phone 100. After step S505, the method in this embodiment of this application may further include steps S510 to S513. It should be noted that, in this embodiment of this application, steps S510 to S513 and steps S506 to S509 may be performed in parallel. In other words, the mobile phone 100 does not need to perform network configuration for home devices one by one. Instead, in a manner of broadcasting the first message, network configuration is being performed for a home device that receives the first message. In other words, according to the method in this embodiment of this application, asynchronous parallel network configuration can be implemented for a plurality of home devices, so that efficiency of batch network configuration for the large quantity of home devices can be improved.

S510: The smart desk lamp receives the first message broadcast by the mobile phone 100, and accesses, by using the SSID and the access password in the first message, the wireless local area network provided by the router 120.

In some embodiments, after the smart desk lamp receives the first message broadcast by the mobile phone 100, or after the smart desk lamp accesses the wireless local area network provided by the router 120, the method in this embodiment of this application further includes steps S510' and S510". S510': The smart desk lamp sends a response message 2 of the first message to the mobile phone 100. The response message 2 is used to indicate that network configuration is being performed for the smart desk lamp. After receiving the response message 2, the mobile phone 100 may perform S510". S510": The mobile phone 100 updates first state information of another first icon on the third interface to second state information. The second state information is used to indicate that network configuration is being performed for the home device. For example, the mobile phone 100 may display a third interface 1003 shown in FIG. 10B, and the first state information "to be network-configured" of the first icon 905 on the third interface 1003 is updated to the second state information "being network-configured". Optionally, the mobile phone 100 may further update indication information for indicating a quantity of home devices to be network-configured in the third interface. For example, the mobile phone 100 may update the indication information 1002 shown in FIG. 10A to indication information 1004 shown in FIG. 10B.

In this embodiment, the mobile phone 100 may update the network configuration state of the home device in time. For example, the mobile phone 100 may update the first state information (for example, "to be network-configured") to the second state information (for example, "being network-configured") in time. In this way, it can be convenient for the user to learn a network configuration progress of the home device, and user experience in a network configuration process of the home device can be improved.

S511: The smart desk lamp sends a registration request b to the cloud server 130. The registration request b includes the registration credential 1, a first account, indication information of a product type b of a smart desk lamp, and an SN b of the smart desk lamp.

S512: The cloud server 130 receives the registration request b, and performs authentication on the registration credential 1 and/or the product type b of the smart desk lamp based on the first account in the registration request b.

After step S512, if the authentication succeeds, the cloud server 130 may perform step S513 to allocate a device identifier (Device ID) to the smart desk lamp. If the authentication fails, the cloud server 130 does not allocate a device ID to the smart desk lamp.

S513: If the authentication succeeds, the cloud server 130 allocates a device ID b to the smart desk lamp.

After step S513, the cloud server 130 may store SN b of the smart desk lamp, the device ID b, and a correspondence between the SN b and the device ID b. The SN b is used to uniquely identify the smart desk lamp.

After step S513, the cloud server 130 may store registration information of a home device that has registered with the cloud server 130. For example, after the cloud server 130 allocates the device ID a to the smart desk lamp, the cloud server 130 may store registration information of the smart desk lamp shown in Table 7.

TABLE 7

Registration information of a smart desk lamp

| APP account | Product type | SN of a home device | Device ID of a home device |
|---|---|---|---|
| Account-2 (For example, a first account) | Product type b | *a* | Device ID a |

It may be understood that, when the mobile phone 100 approaches the smart light bulb 2 and the smart light bulb 3 shown in FIG. 1, the smart light bulb 2 and the smart light bulb 3 may receive the first message broadcast by the mobile phone 100; and the smart light bulb 2 and the smart light bulb 3 may access, based on information carried in the first message, the wireless local area network provided by the router 120 to request to register with the cloud server 130 (not shown in the figure). For a method in which the smart light bulb 2 and the smart light bulb 3 access the wireless local area network provided by the router 120 to request to register with the cloud server 130, refer to steps S506 to S509 or steps S510 to S513 in the foregoing embodiment. Details are not described herein again in this embodiment of this application.

In some other embodiments, after allocating the device ID to the home device, the cloud server 130 may send a registration response to the home device. The registration response is used to indicate that the home device has successfully registered with the cloud server 130. The registration response may include a device ID allocated by the cloud server 130 to the home device. For example, the cloud server 130 may send the registration response a to the smart light bulb 1. The registration response a may include the device ID a. The cloud server 130 may send the registration response b to the smart desk lamp. The registration response b may include the device ID b.

After receiving the registration response, the home device may send third prompt information. The third prompt information is used to indicate that the home device has successfully registered with the cloud server 130. For example, the third prompt information may be a preset indicator prompt, a preset voice prompt, or a preset text prompt. This is not limited in this embodiment of this application.

The home device sends the third prompt information after successfully registering with the cloud server 130, so that the user can learn a network configuration state of each home device, and the user can quickly filter out a home device for which network configuration fails, and reconfigure a network for the home device for which the network configuration fails.

It should be noted that, to ensure data security in a process of communication between the home device and the cloud server 130, the home device (for example, the smart light bulb 1, the smart desk lamp, the smart light bulb 2, or the smart light bulb 3) may establish a secure connection channel with the cloud server 130, and then interact with the cloud server 130 by using the secure connection channel. For a method for establishing the secure connection channel between the home device and the cloud server 130, refer to related descriptions in a conventional technology. Details are not described herein again.

It may be understood that, if the cloud server 130 allocates the device ID to the home device, it indicates that network configuration for the home device succeeds. If the cloud server 130 does not allocate the device ID to the home device, it indicates that network configuration for the home device fails. If authentication performed by the cloud server 130 on a registration request initiated by a home device fails, it indicates that network configuration for the home device fails.

It can be learned from the foregoing embodiment that, after the mobile phone 100 broadcasts the first message in step S505, the home device that receives the first message interacts with the cloud server 130, to complete a home device registration process. For example, after step S505, the smart light bulb 1 interacts with the cloud server 130, and a process of registering the smart light bulb 1 with the cloud server 130 may be completed by performing steps S506 to S509. For another example, after step S505, the smart desk lamp interacts with the cloud server 130, and a process of registering the smart desk lamp with the cloud server 130 may be completed by performing steps S510 to S513.

In other words, in this embodiment of this application, after the mobile phone 100 performs step S505 to broadcast the first message, the mobile phone 100 does not need to participate in the registration process of the home device with the cloud server 130. Therefore, after performing steps S501 to S505 to perform network configuration for a batch of home devices, the mobile phone 100 may perform a next batch network configuration task in response to an operation of the user without waiting for registration of the batch of home devices to be completed, so as to perform batch network configuration for a next batch of home devices. In this way, batch network configuration efficiency of the mobile phone 100 can be improved.

It may be understood that the mobile phone 100 may trigger network configuration tasks of a plurality of groups of home devices in batches based on an operation of the user. Each group of home devices includes a plurality of home devices. In other words, the mobile phone 100 may sequentially trigger a plurality of batch network configuration tasks, and each batch network configuration task is used to implement network configuration and registration processes of a plurality of home devices.

Based on this, if there is no created batch network configuration task in the first APP of the mobile phone 100, the mobile phone 100 may display the second interface in response to the first operation. The second interface may further include a task name setting item for batch network configuration. For example, the task name setting item is a "task name" setting item 705 shown in FIG. 7B. The task name setting item is configured to set a task name of this batch network configuration. For example, the user can set a task name of batch network configuration to task 1, task 2, or task 3. For another example, when the user performs network configuration for home devices of various device types in batches based on the device type (Device Type) of the home device, the user may set a task name of batch network configuration based on the device type (Device Type), such as a smart speaker, a light, a smart refrigerator, or a smart washing machine.

It should be noted that the foregoing "the mobile phone 100 logs in to the first APP by using the first account, and there is no created batch network configuration task" may be classified into the following two cases. (1) The first APP is logged in to by using the first account, and no batch network configuration task has been created. (2) The first APP is logged in to by using the first account to trigger a batch network configuration task, but the batch network configuration task has been deleted. The deleted batch network configuration task may be a completed batch network configuration task or an uncompleted batch network configuration task. For detailed descriptions of deleting the batch network configuration task, the completed batch network configuration task, and the uncompleted batch network configuration task by the mobile phone 100, refer to the detailed descriptions in the following embodiments. Details are not described herein again.

Figure 7C:
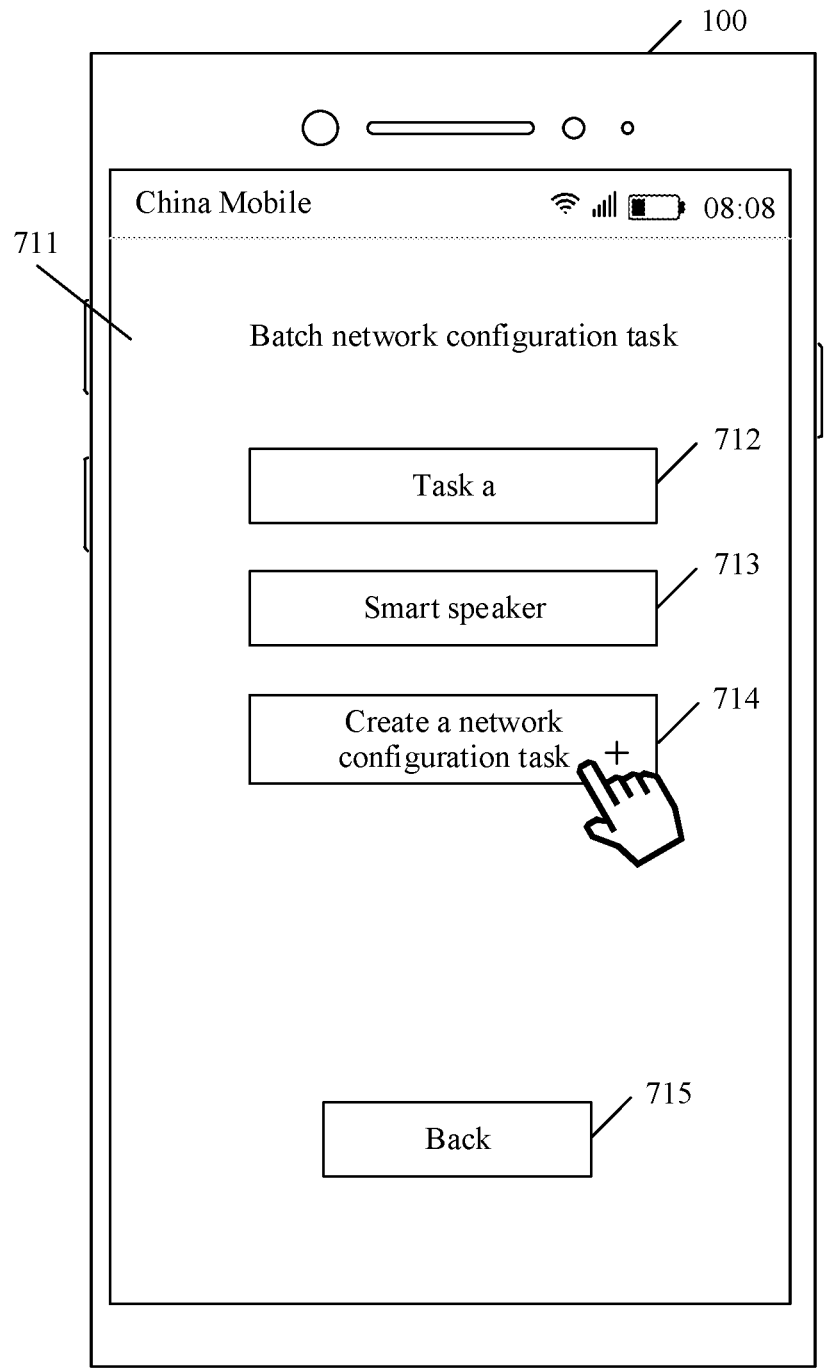

If the mobile phone 100 logs in to the first app by using the first APP, and a created batch network configuration task exists, in response to the first operation, the mobile phone 100 may display a task list interface (a network configuration task interface 711 shown in FIG. 7C).

The task list interface 711 includes a new option used to trigger the mobile phone 100 to create a batch network configuration task, for example, a "new network configuration task" option 714 shown in FIG. 7C. The "new network configuration task" option 714 is used to trigger the mobile phone 100 to create a network configuration task. For example, in response to a tap operation (for example, a click operation) performed by the user on the "new network configuration task" option 714, the mobile phone 100 may display the second interface.

The task list interface 711 further includes one or more batch network configuration tasks that have been created when the first APP is logged in to by using the first account, for example, a "task a" option 712 and a "smart speaker" option 713 shown in FIG. 7C. A task name of a batch network configuration task corresponding to the "task a" option 712 is "task a". The "task a" option 712 is used to trigger the mobile phone 100 to display a network configuration task interface (for example, the foregoing third interface) whose task name is "task a". The "smart speaker" option 713 is used to trigger the mobile phone 100 to display a network configuration task interface (for example, the foregoing third interface) whose task name is "smart speaker". The task list interface 711 further includes a "back" button 715. In response to a tap operation performed by the user on the "back" button 715, the mobile phone 100 may display the first interface 701 shown in FIG. 7A.

Further, after the home device registers with the cloud server 130, the mobile phone 100 may update an icon that is on the third interface and that has registered with the cloud server 130, for example, update the general icon to an icon specific to the home device. The mobile phone 100 may further update a state of being registered with the cloud server 130 in the third interface, for example, update a state of the home device to a registration completed state.

In some embodiments, after allocating a device ID to each home device, the cloud server 130 may send the device ID and first configuration information of the home device to the mobile phone 100. For example, after step S509, the cloud server 130 may send the device ID a and first configuration information a of the smart light bulb 1 to the mobile phone 100. For another example, after step S513, the cloud server 130 may send the device ID b and first configuration information b of the smart desk lamp to the mobile phone 100.

Figure 10B:
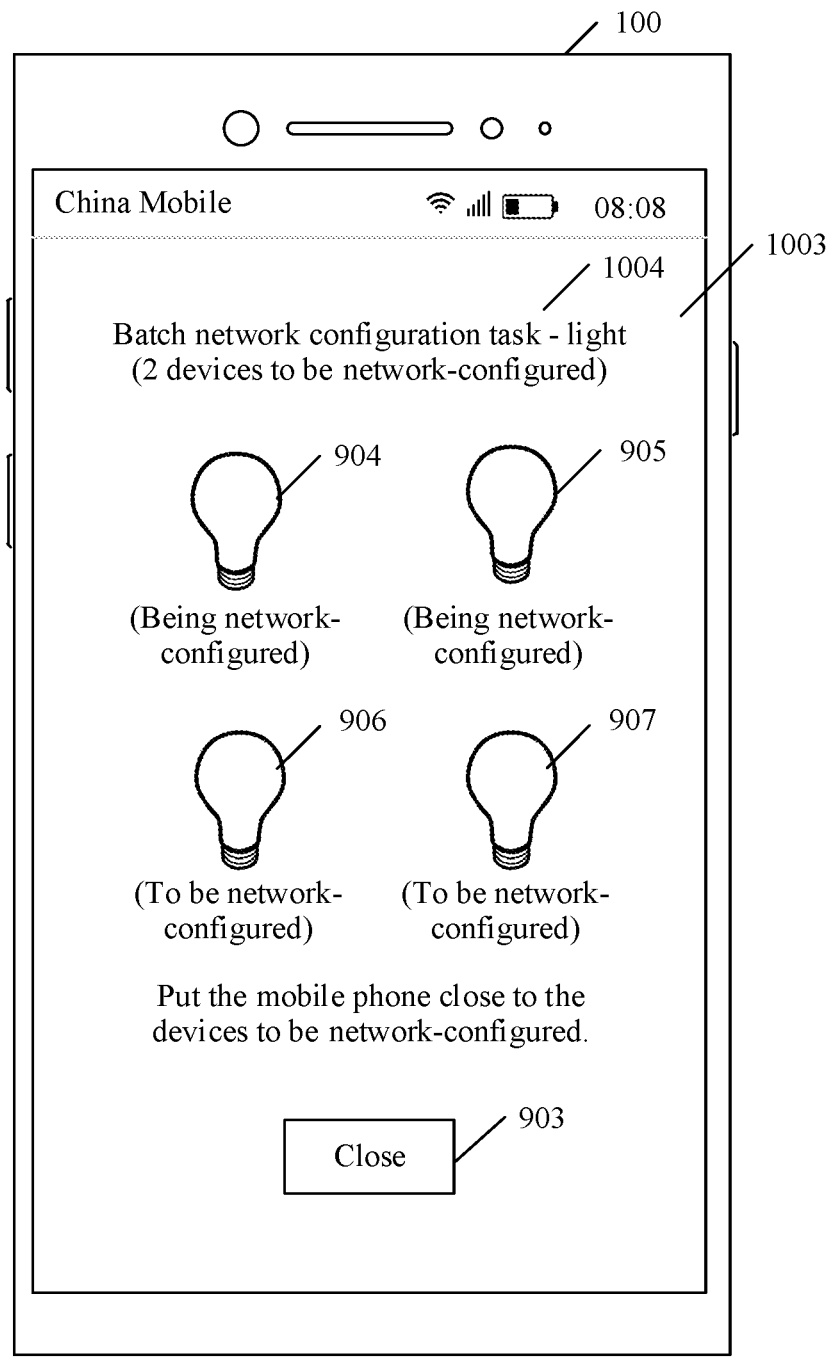
Figure 11:
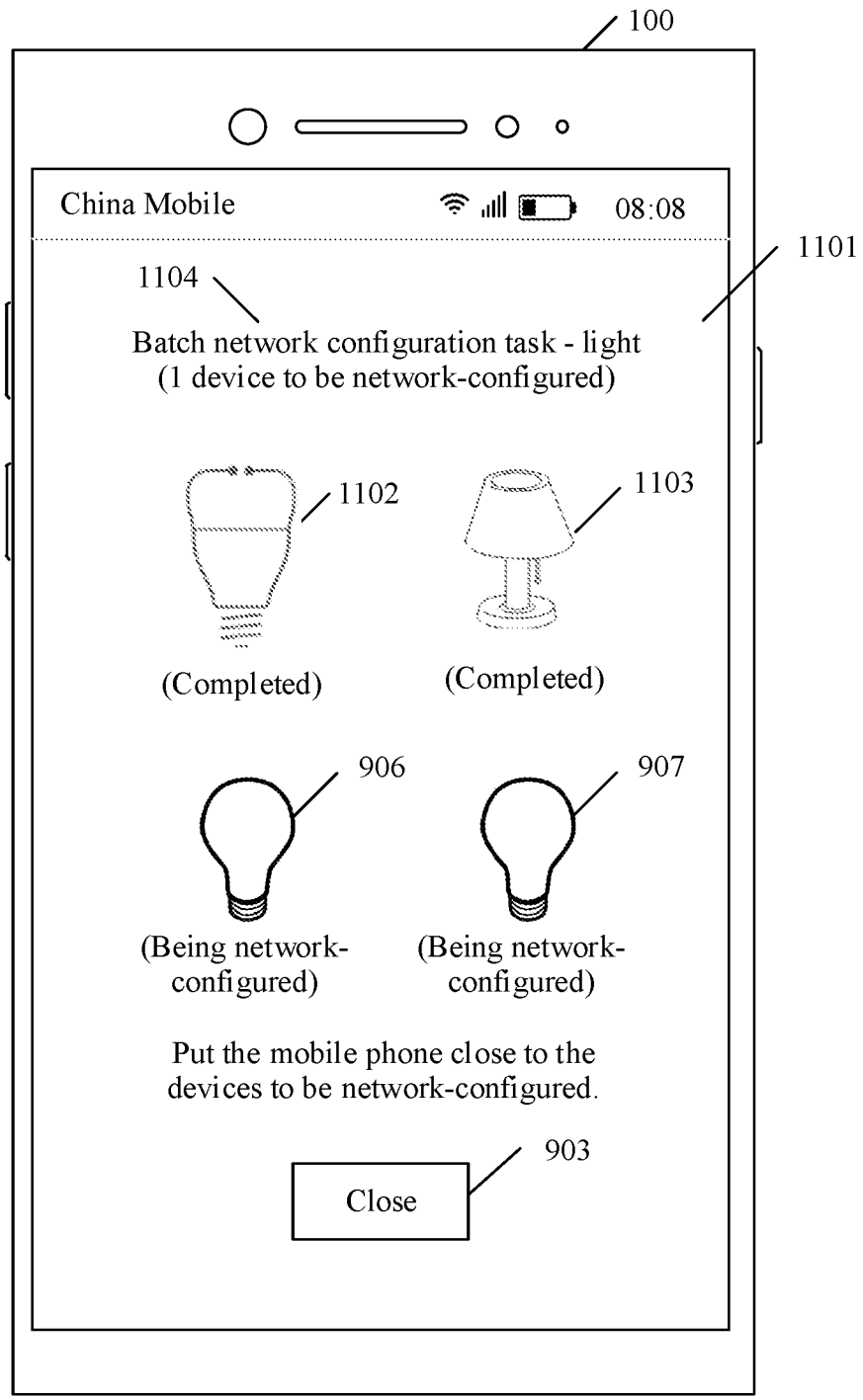
FIG. 11 is a schematic diagram of another display interface of an electronic device according to an embodiment of this application.

The first configuration information of the home device may also be referred to as specific configuration information or a specific profile of the home device. The first configuration information may include information such as a second icon specific to the home device, an interface element of a control page for implementing remote control on the home device by using the first APP, and a control instruction for implementing remote control on the home device by using the first APP. The first configuration information of the home device is different from second configuration information. For example, a second icon 1102 shown in FIG. 11 is an icon specific to the smart light bulb 1, the first icon 904 shown in FIG. 10B is a general icon of the smart light bulb 1, and the second icon 1102 is different from the first icon 904. For another example, a second icon 1103 shown in FIG. 11 is an icon specific to the smart desk lamp, the first icon 905 shown in FIG. 10B is a general icon of the smart desk lamp, and the second icon 1103 is different from the first icon 905.

In this embodiment, after receiving first configuration information of a home device, the mobile phone 100 updates a first icon of the home device on a third interface to a second icon, and updates first state information or second state information of the home device on the third interface to third state information. The third state information is used to indicate that the home device has registered with the cloud server 130.

For example, after receiving the first configuration information a of the smart light bulb 1 and the first configuration information b of the smart light bulb, the mobile phone 100 may display a third interface 1101 shown in FIG. 11. The first icon 904 of the smart light bulb 1 shown in FIG. 10B is updated to the second icon 1102 shown in FIG. 11, and the second state information "being network-configured" of the first icon 904 shown in FIG. 10B is updated to the third state information "completed" of the second icon 1102. The first icon 905 of the smart desk lamp shown in FIG. 10B is updated to the second icon 1103 shown in FIG. 11. The second state information "being network-configured" of the first icon 905 shown in FIG. 10B is updated to the third state information "completed" of the second icon 1103. Optionally, the mobile phone 100 may further update indication information for indicating a quantity of home devices to be network-configured in the third interface. For example, the mobile phone 100 may update the indication information 1004 shown in FIG. 10B to indication information 1104 shown in FIG. 11.

Figure 12A:
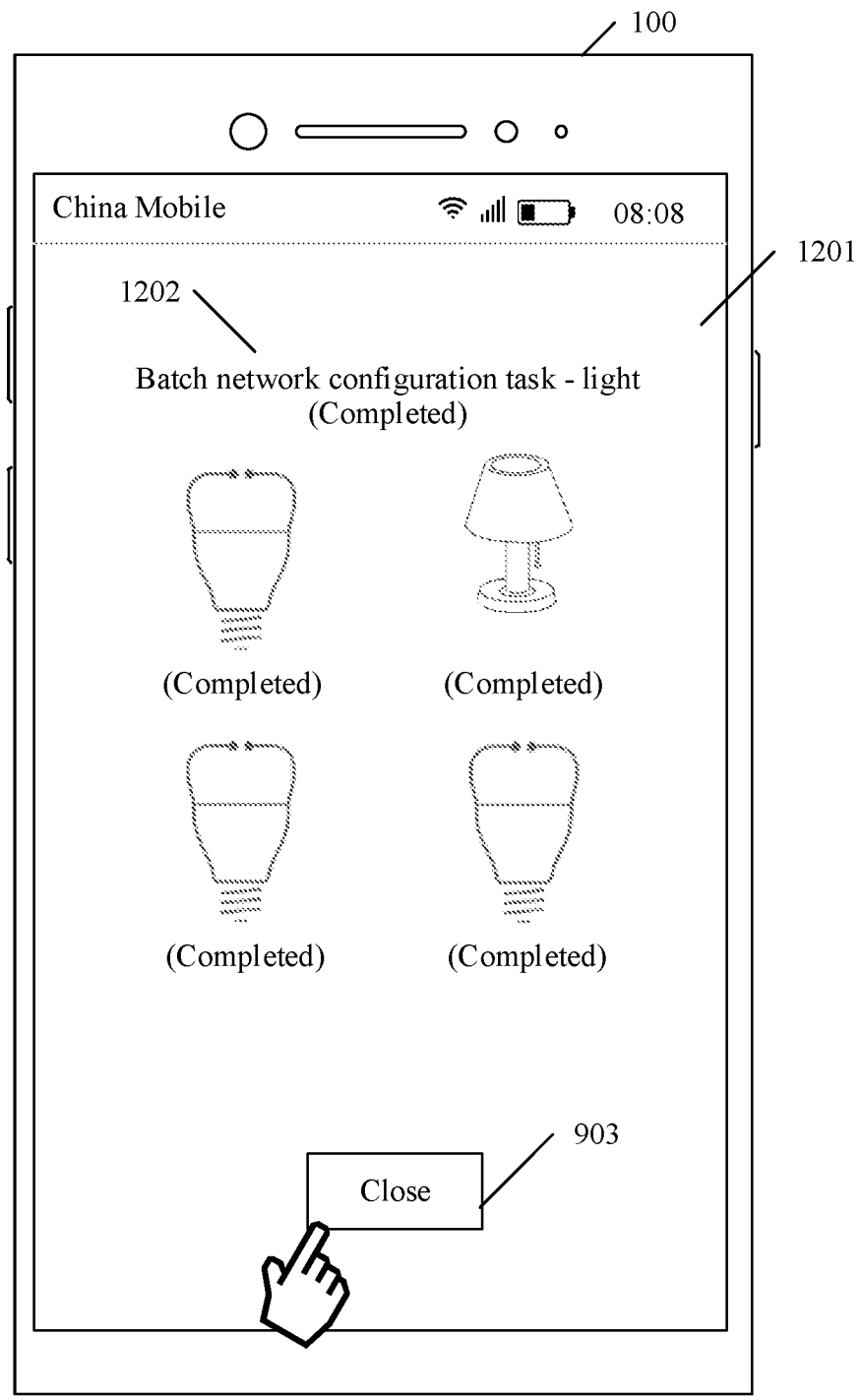
FIG. 12A and FIG. 12B are schematic diagrams of other display interfaces of an electronic device according to an embodiment of this application.

In this embodiment, if the mobile phone 100 receives the device IDs and the first configuration information of the M home devices (such as the smart light bulb 1, the smart desk lamp, the smart light bulb 2, and the smart light bulb 3), the mobile phone 100 may display a third interface 1201 shown in FIG. 12A. In the third interface 1201 shown in FIG. 12A, the mobile phone 100 displays second icons and third state information of the M home devices. Optionally, the mobile phone 100 may further update indication information for indicating a quantity of home devices to be network-configured in the third interface. For example, the mobile phone 100 may update the indication information 1004 shown in FIG. 10B to indication information 1202 shown in FIG. 12A.

The cloud server 130 may not only send a device ID and first configuration information of the home device to the mobile phone 100, but also send an identifier (for example, an SN of the home device) of the home device to the mobile phone 100. The SN of the home device may be used by the mobile phone 100 to identify a home device whose second state information needs to be updated by the mobile phone 100 to third state information based on the first configuration information.

In this embodiment, if the mobile phone 100 does not receive, within second preset duration starting from broadcasting the first message, a device ID and first configuration information of any one of the M home devices that are sent by the cloud server 130, the mobile phone 100 may determine that network configuration for the home device fails (which may also be referred to as a network configuration failure). In this case, the mobile phone 100 may update first state information or second state information of the home device in the third interface to fourth state information. The fourth state information is used to indicate that network configuration for the home device fails. For example, the second preset duration is any duration such as 1 hour, 2 hours, 3 hours, 6 hours, or 12 hours.

Figure 12B:
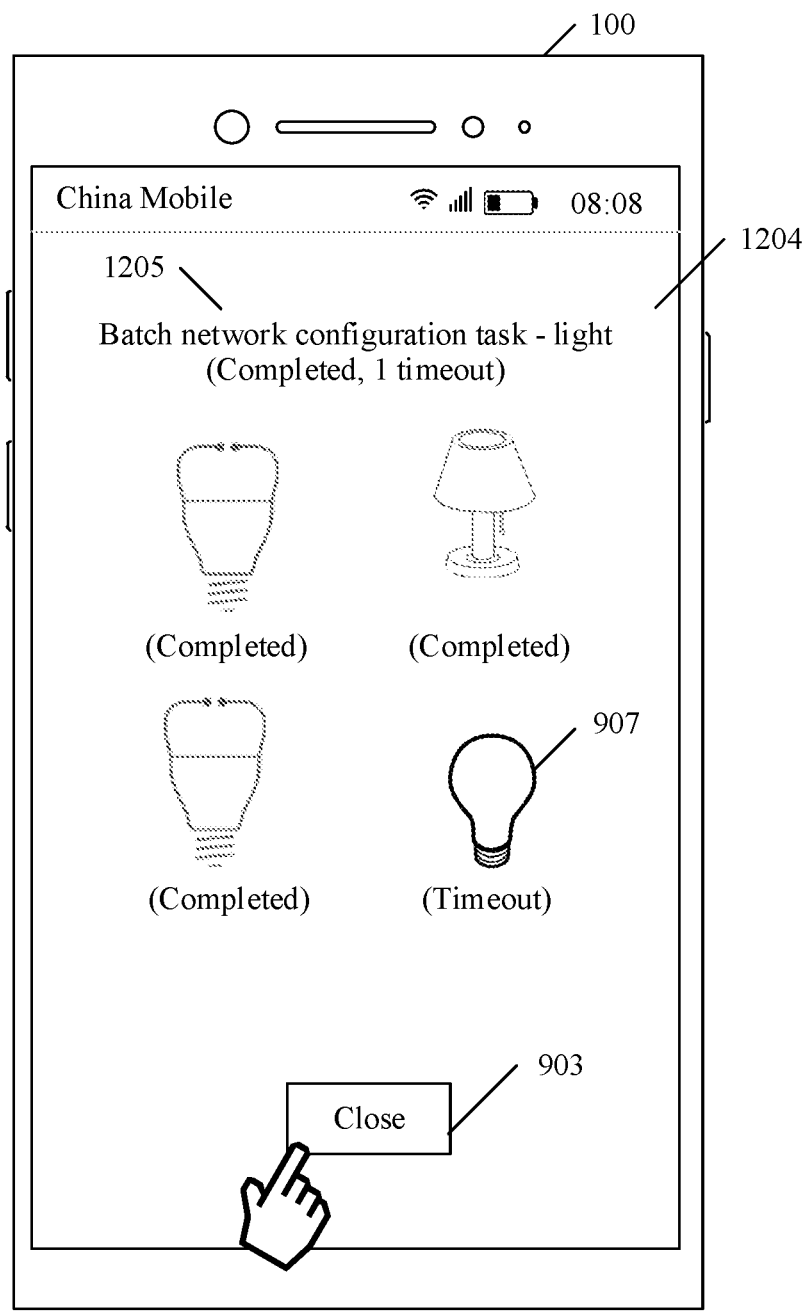

For example, it is assumed that the mobile phone 100 receives only device IDs and first configuration information of three of the foregoing four home devices within second preset duration starting from broadcasting the first message, and does not receive a device ID and first configuration information of another home device. The mobile phone 100 may display a third interface 1204 shown in FIG. 12B. In the third interface 1204 shown in FIG. 12B, the mobile phone 100 displays second icons and third state information of three home devices, and displays a first icon 907 and fourth state information (for example, "timeout") of another home device.

In this embodiment, after allocating a device ID to each home device, the cloud server 130 may send the device ID and first configuration information of the corresponding home device to the mobile phone 100 in real time. In this way, the mobile phone 100 can update the icon and the state information of the home device in the third interface in time. In this way, user experience in a process in which a user performs network configuration for a home device can be improved.

In some other embodiments, the mobile phone 100 may actively obtain, from the cloud server 130, a device ID and first configuration information of a home device that has registered with the cloud server 130. Specifically, after step S505, the mobile phone 100 may obtain, from the cloud server 130, the device ID of the home device that has registered with the cloud server 130. As shown in FIG. 5C or FIG. 9B-3, after step S505, the method in this embodiment of this application may further include steps S514 and S515.

S514: The mobile phone 100 obtains, from the cloud server 130, a device ID and first configuration information of a home device that registers with the cloud server 130 by using the first account.

Specifically, step S514 may include steps S514*a* to S514*d*.

S514*a*: The mobile phone 100 sends a second request to the cloud server 130. The second request includes the first account, and the second request is used to obtain the device ID and the first configuration information of the home device that registers with the cloud server 130 by using the first account.

Both the registration request sent by the smart light bulb 1 and the registration request sent by the smart desk lamp to the cloud server 130 include the first account. If the cloud server 130 allocates device IDs to the smart light bulb 1 and the smart desk lamp, it indicates that network configuration on the cloud server 130 for the smart light bulb 1 and the smart desk lamp by using the first account succeeds. For specific content of the first configuration information of the home device, refer to related descriptions in the foregoing embodiment. Details are not described herein again.

It should be noted that the mobile phone 100 may periodically send the second request to the cloud server 130 until the mobile phone 100 obtains, from the cloud server 130, registration results of all home devices that register with the cloud server 130 by using the first account. The registration result may be that network configuration succeeds or network configuration fails. If the cloud server 130 allocates a device ID to the home device, it indicates that network configuration for the home device succeeds. If the cloud server 130 does not allocate a device ID to the home device, it indicates that network configuration for the home device fails. If authentication performed by the cloud server 130 on a registration request initiated by a home device fails, it indicates that network configuration for the home device fails.

Alternatively, the mobile phone 100 may periodically send the second request to the cloud server 130 within third preset duration starting from broadcasting the first message. Generally, in a period of time starting from broadcasting the first message, most home devices may successfully register with the cloud server 130, and the mobile phone 100 may obtain device IDs and first configuration information of these home devices from the cloud server 130 by using the second request. If the mobile phone 130 does not obtain device IDs and first configuration information of some home devices from the cloud server 130 within the third preset duration, there is a relatively low probability that network configuration on the cloud server 130 for these home devices succeeds. Even if the mobile phone 130 continues to send the second request to the cloud server 130 after the third preset duration, the mobile phone 100 does not obtain device IDs and first configuration information of some home devices from the cloud server 130. Therefore, after the third preset duration, the mobile phone 100 may no longer send the second request.

The third preset duration is less than the second preset duration. For example, the third preset duration is any duration such as 0.5 hour, 1 hour, 2 hours, 3 hours, or 6 hours.

S514*b*: The cloud server 130 receives the second request from the mobile phone 100, and obtains, based on the first account in the second request, the device ID and the first configuration information of the home device that registers with the cloud server 130 by using the first account.

After receiving the second request from the mobile phone 100, the cloud server 130 may search for a device ID and a product type of the home device that registers by using the first account in the home devices that have registered with the cloud server 130. For example, it is assumed that when the cloud server 130 receives a second request, network configuration on the cloud server 130 for the smart light bulb 1 and the smart desk lamp succeeds. In this case, the cloud server 130 stores the registration information shown in Table 6 and Table 7. The cloud server 130 may find the device ID a and the product type a of the smart light bulb 1 registered by using the first account, and the device ID b and the product type b of the smart desk lamp registered by using the first account.

Then, the cloud server 130 may obtain first configuration information of the found home device whose product type is found. The cloud server 130 may store first configuration information of home devices of a plurality of product types. For example, the cloud server 130 may obtain the first configuration information a of the smart light bulb 1 based on the product type a, and obtain the first configuration information b of the smart desk lamp based on the product type b.

S514*c*: The cloud server 130 sends a second response to the mobile phone 100. The second response includes the device ID and the first configuration information of the home device that registers with the cloud server 130 by using the first account.

S514*d*: The mobile phone 100 receives the second response from the cloud server 130.

It should be noted that, because the mobile phone 100 may periodically send second requests to the cloud server 130, each time the cloud server 130 receives a second request, the cloud server 130 may perform steps S514*b* and S514*c* to return a second response to the mobile phone 100. The second requests periodically sent by the mobile phone 100 to the cloud server 130 may be the same, but the second response returned by the cloud server 130 to the mobile phone 100 each time may be different. Specifically, each second response may carry device IDs and first configuration information of different home devices.

For example, when the cloud server 130 receives a $1^{st}$ second request, the smart light bulb 1 and the smart desk lamp have registered with the cloud server 130, but the smart light bulb 2 and the smart light bulb 3 have not registered with the cloud server 130. In this case, a $1^{st}$ second response returned by the cloud server 130 to the mobile phone 100 may include the device IDs and the first configuration information of the smart light bulb 1 and the smart desk lamp.

When the cloud server 130 receives a $2^{nd}$ second request, the smart light bulb 2 and the smart light bulb 3 have registered with the cloud server 130. In this case, a $2^{nd}$ second response returned by the cloud server 130 to the mobile phone 100 may include the device IDs and the first configuration information of the smart light bulb 2 and the smart light bulb 3.

S515: The mobile phone 100 updates, based on the first configuration information of the home device, a first icon corresponding to the home device on the third interface to a second icon, and updates state information of the corresponding home device to third state information.

For detailed description of the first configuration information, refer to related descriptions in the foregoing embodiment. Details are not described herein again. A second icon of a home device is an icon specific to the home device. Second icons of home devices of a same product type are the same, and second icons of home devices of different product types are different. For example, the second icon 1102 shown in FIG. 11 is an icon specific to the smart light bulb 1, the second icon 1103 shown in FIG. 11 is a general icon of the smart desk lamp, and the second icon 1102 is different from the second icon 1103.

For example, it is assumed that a $1^{st}$ second response received by the mobile phone 100 includes the device IDs and the first configuration information of the smart light bulb 1 and the smart desk lamp. The display interface of the mobile phone 100 may be switched from the third interface 1003 shown in FIG. 10B to the third interface 1101 shown in FIG. 11. The first icon 904 of the smart light bulb 1 shown in FIG. 10B is updated to the second icon 1102 shown in FIG. 11, and the second state information "being network-configured" of the first icon 904 shown in FIG. 10B is updated to the third state information "completed" of the second icon 1102. The first icon 905 of the smart desk lamp shown in FIG. 10B is updated to the second icon 1103 shown in FIG. 11. The second state information "being network-configured" of the first icon 905 shown in FIG. 10B is updated to the third state information "completed" of the second icon 1103.

It should be noted that a reason that the state information of the first icon 906 and the state information of the second icon 907 are switched from the first state information (for example, "to be network-configured") shown in FIG. 10B to the second state information (for example, "being network-configured") shown in FIG. 11 is that the mobile phone 100 receives response messages of first messages sent by the smart light bulb 2 and the smart light bulb 3.

In some embodiments, all the M home devices may successfully register with the cloud server 130. For example, it is assumed that the $2^{nd}$ second response received by the mobile phone 100 includes the device IDs and the first configuration information of the smart light bulb 2 and the smart light bulb 3. The display interface of the mobile phone 100 may be switched from the third interface 1101 shown in FIG. 11 to the third interface 1201 shown in FIG. 12A. In the third interface 1201 shown in FIG. 12A, the mobile phone 100 displays second icons and third state information (for example, "completed") of the M home devices.

In some embodiments, step S515 may be replaced with the following: If the mobile phone 100 obtains, from the cloud server 130 within second preset duration starting from broadcasting the first message, the device ID and the first configuration information of the home device registered by using the first account, the mobile phone 100 updates, based on the first configuration information of the home device, the first icon of the corresponding home device on the third interface to the second icon, and updates the state information of the corresponding home device to the third state information.

In some embodiments, network configuration for some home devices may fail because authentication of the cloud server 130 fails. In this case, the cloud server 130 does not allocate a device ID to the home device, and does not transmit the first configuration information of the home device to the mobile phone 100 by using the second response.

In this embodiment, if the mobile phone 100 does not receive, within second preset duration starting from broadcasting the first message, the device ID and the first configuration information of any one of the M home devices that are sent by the cloud server 130, the mobile phone 100 may determine that network configuration for the home device fails (which may also be referred to as a network configuration failure). In this case, the mobile phone 100 may update first state information or second state information of the home device in the third interface to fourth state information. The fourth state information is used to indicate that network configuration for the home device fails. For example, the second preset duration is any duration such as 1 hour, 2 hours, 3 hours, 6 hours, or 12 hours.

For example, it is assumed that the $2^{nd}$ second response received by the mobile phone 100 includes the smart light bulb 2. In addition, the mobile phone 100 does not receive the device ID and the first configuration information of the smart light bulb 3 within the first preset duration. The display interface of the mobile phone 100 may be switched from the third interface 1101 shown in FIG. 11 to the third interface 1204 shown in FIG. 12B. In the third interface 1204 shown in FIG. 12B, the mobile phone 100 displays second icons and third state information of three home devices, and displays a first icon 907 and fourth state information (for example, "timeout") of another home device.

In this embodiment of this application, the mobile phone 100 may update the network configuration state of the home device in time. For example, the mobile phone 100 may sequentially update the network configuration state of the home device from the first state information (for example, "to be network-configured") to the second state information (for example, "being network-configured") and the third state information (for example, "completed"). In this way, it can be convenient for the user to learn a network configuration progress of the home device, and user experience in a network configuration process of the home device can be improved.

In some embodiments, the mobile phone 100 may stop broadcasting the first message in step S505 in response to the third operation of the user on the third interface. For example, the third interface shown in FIG. 9A, FIG. 10A, FIG. 10B, FIG. 11, or FIG. 12A may include a "close" button 903. The third operation may be a tap operation (for example, a click operation) performed by the user on the "close" button 903. Alternatively, the third operation may be a preset gesture input by the user on the third interface.

In a process in which the mobile phone 100 displays a network configuration task interface (that is, the third interface) of a batch network configuration task, the mobile phone 100 may keep broadcasting the first message of the batch network configuration task. However, after closing the network configuration task interface (that is, the third interface) of the batch network configuration task, the mobile phone 100 no longer broadcasts the first message of the batch network configuration task. For example, in response to the third operation performed by the user on the third interface shown in FIG. 9A, FIG. 10A, FIG. 10B, FIG. 11, or FIG. 12A that may include the "close" button 903, the mobile phone 100 may stop broadcasting the first message (that is, the first message in step S505) of the batch network configuration task whose task name is "light".

Figure 13:
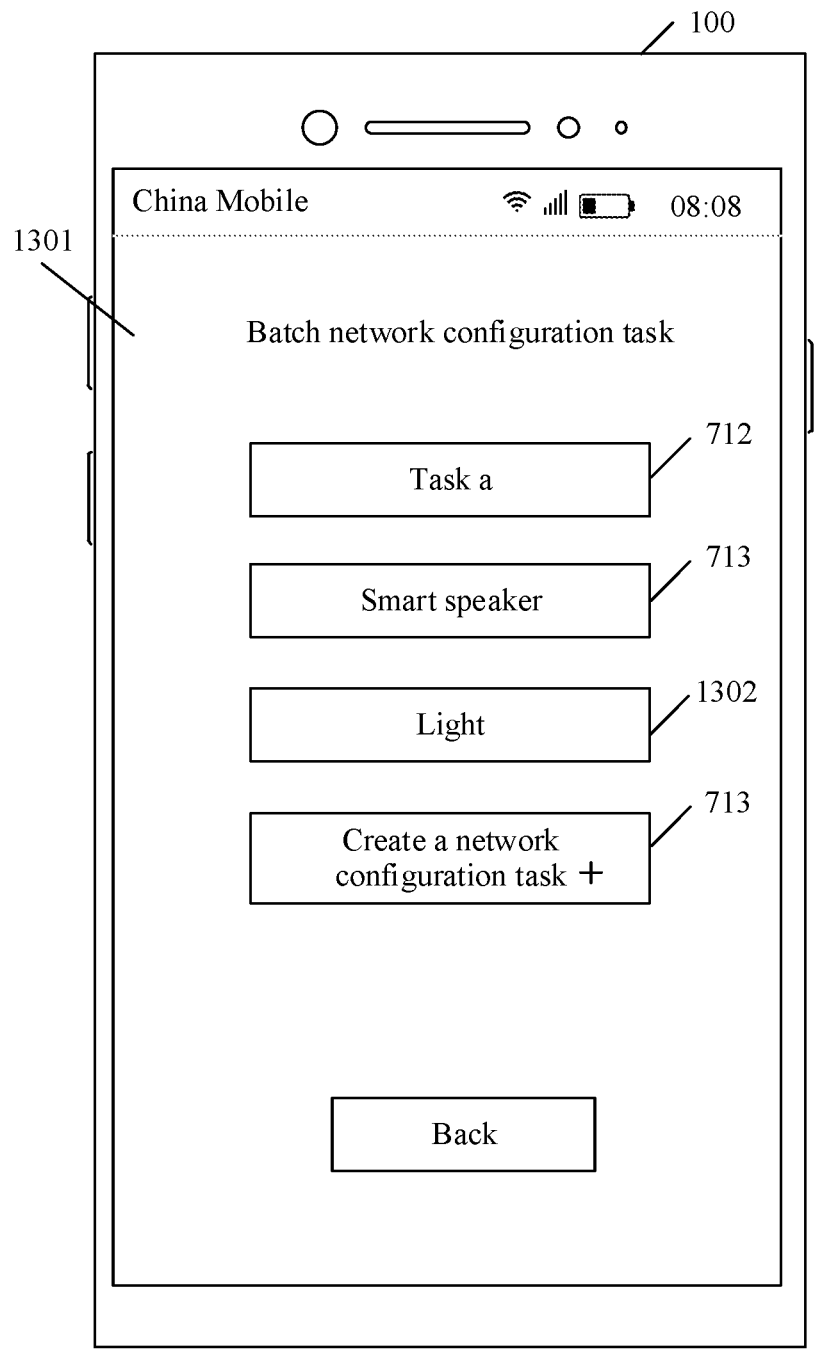
FIG. 13 is a schematic diagram of another display interface of an electronic device according to an embodiment of this application.

In addition, in response to the third operation of the user on the third interface, the mobile phone 100 may further display a task list interface. The task list interface includes a task option of a batch network configuration task corresponding to the third interface. For example, it is assumed that before the mobile phone 100 creates the batch network configuration task corresponding to the third interface, for example, the batch network configuration task whose task name is "light", two batch network configuration tasks whose task names are respectively "task a" and "smart speaker" shown in FIG. 7C have been created in the mobile phone 100. In this case, in response to the third operation performed by the user on the third interface shown in FIG. 9A, FIG. 10A, FIG. 10B, FIG. 11, or FIG. 12A, the mobile phone 100 may display a task list interface 1301 shown in FIG. 13. Compared with the task list interface shown in FIG. 7C, a task option 1302 of the batch network configuration task whose task name is "light" is added to the task list interface 1301 shown in FIG. 13.

In some other embodiments, if all the M home devices in the third interface are in the network configuration state indicated by the third state information, that is, all the M home devices have successfully registered with the cloud server 130, the mobile phone 100 may display the task list interface. For example, as shown in FIG. 12A, all home devices in the third interface 1201 are in the network configuration state indicated by the third state information (for example, "completed"). In response to a tap operation (namely, the third operation) performed by the user on the "close" button in the third interface 1201 shown in FIG. 12A, the mobile phone 100 may display the task list interface 1301 shown in FIG. 13.

In some other embodiments, if some of the M home devices in the third interface are in the network configuration state indicated by the third state information, and the other home devices are in the network configuration state indicated by the second state information or the first state information, that is, some home devices successfully register with the cloud server 130, and some home devices are registering with the cloud server 130, the mobile phone 100 may display the task list interface.

Figure 14:
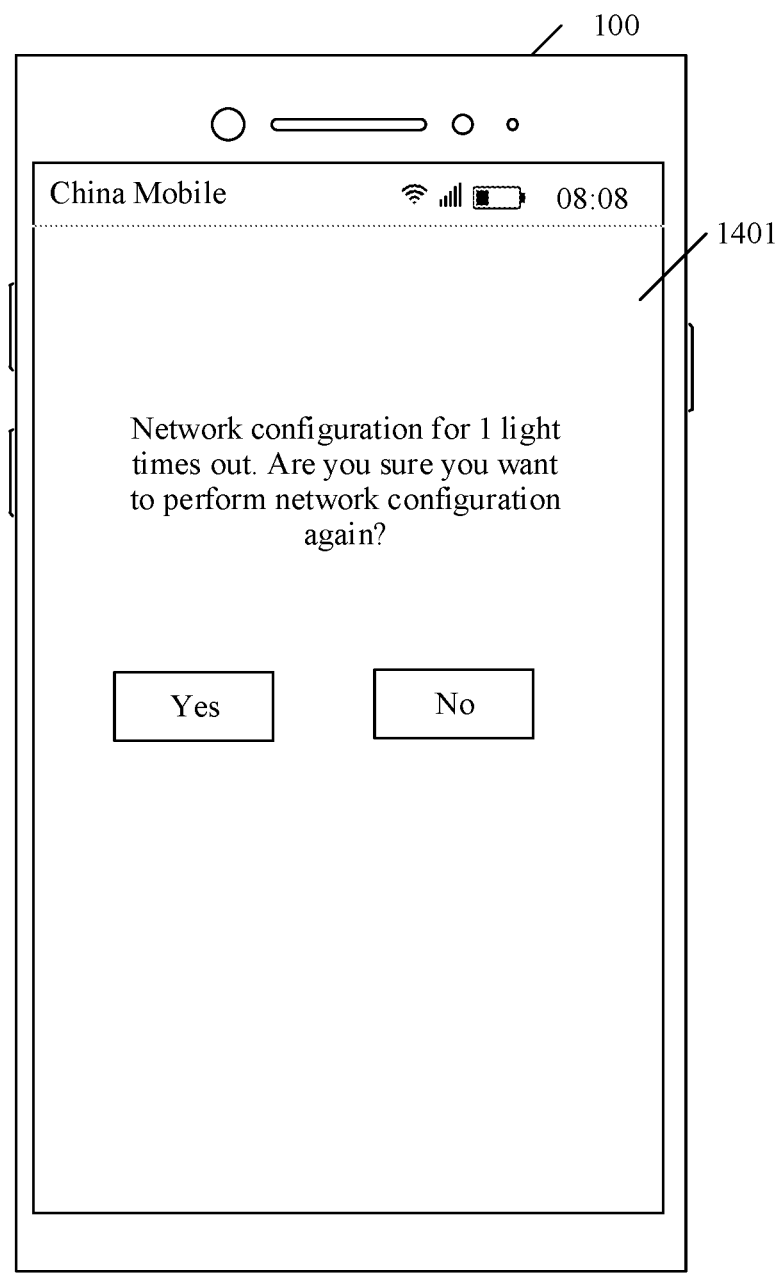
FIG. 14 is a schematic diagram of another display interface of an electronic device according to an embodiment of this application.

In some other embodiments, if the third interface includes the fourth state information, that is, network configuration fails for some of the M home devices, the mobile phone 100 may display the fourth interface. The fourth interface is used to indicate that network configuration fails for the home device, and request the user to confirm whether to reconfigure a network for the home device for which the network configuration fails. For example, in response to a tap operation (namely, the third operation) performed by the user on the "close" button in the third interface 1204 shown in FIG. 12B, the mobile phone 100 may display a fourth interface 1401 shown in FIG. 14.

In this embodiment, the mobile phone 100 may receive a fourth operation performed by the user on the fourth interface. The fourth operation is used to trigger the mobile phone 100 to reconfigure a network for the home device for which the network configuration fails. For example, the fourth operation may be a tap operation performed on a "yes" button in the fourth interface 1401. In response to the fourth operation of the user on the fourth interface, the mobile phone 100 may reconfigure a network for the home device for which network configuration fails. For example, the mobile phone 100 may request the cloud server 130 to reallocate a registration credential to the home device, and then broadcast a first message including the SSID, the access password, and the registration credential. The user may hold the mobile phone 100 close to the home device, so that the home device receives the first message. The home device may register with the cloud server 130 based on related data in the first message. For a method for registering the home device with the cloud server 130, refer to related descriptions in steps S506 to S509. Details are not described herein again.

The mobile phone 100 may further receive a fifth operation performed by the user on the fourth interface. The fifth operation is used to indicate the mobile phone 100 not to reconfigure a network for the home device for which network configuration fails. For example, the fifth operation may be a tap operation performed on a "no" button in the fourth interface 1401. In response to the fifth operation of the user on the fourth interface, the mobile phone 100 may display the foregoing task list interface, for example, the task list interface 1301 shown in FIG. 13.

Figure 15B:
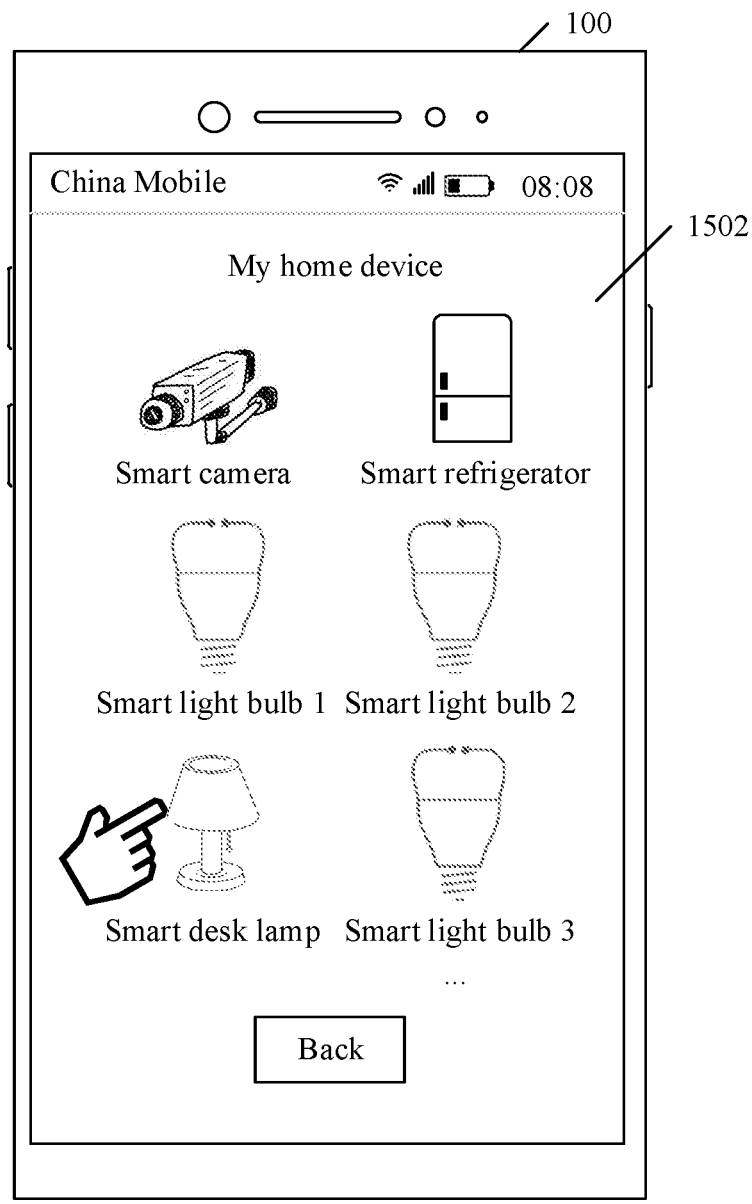

In this embodiment of this application, after network configuration is successfully performed for the M home devices, management options of the M home devices may be added to a home device management interface displayed by the mobile phone 100. For example, in response to a tap operation performed by the user on a "back" button in the task list interface 1301 shown in FIG. 13, the mobile phone 100 may display a home device management interface 1502 shown in FIG. 15B. Compared with the home device management interface 1501 shown in FIG. 15A, management options of the smart light bulb 1, the smart light bulb 2, the smart light bulb 3, and the smart desk lamp are added to the home device management interface 1502 shown in FIG. 15B.

Figure 16:
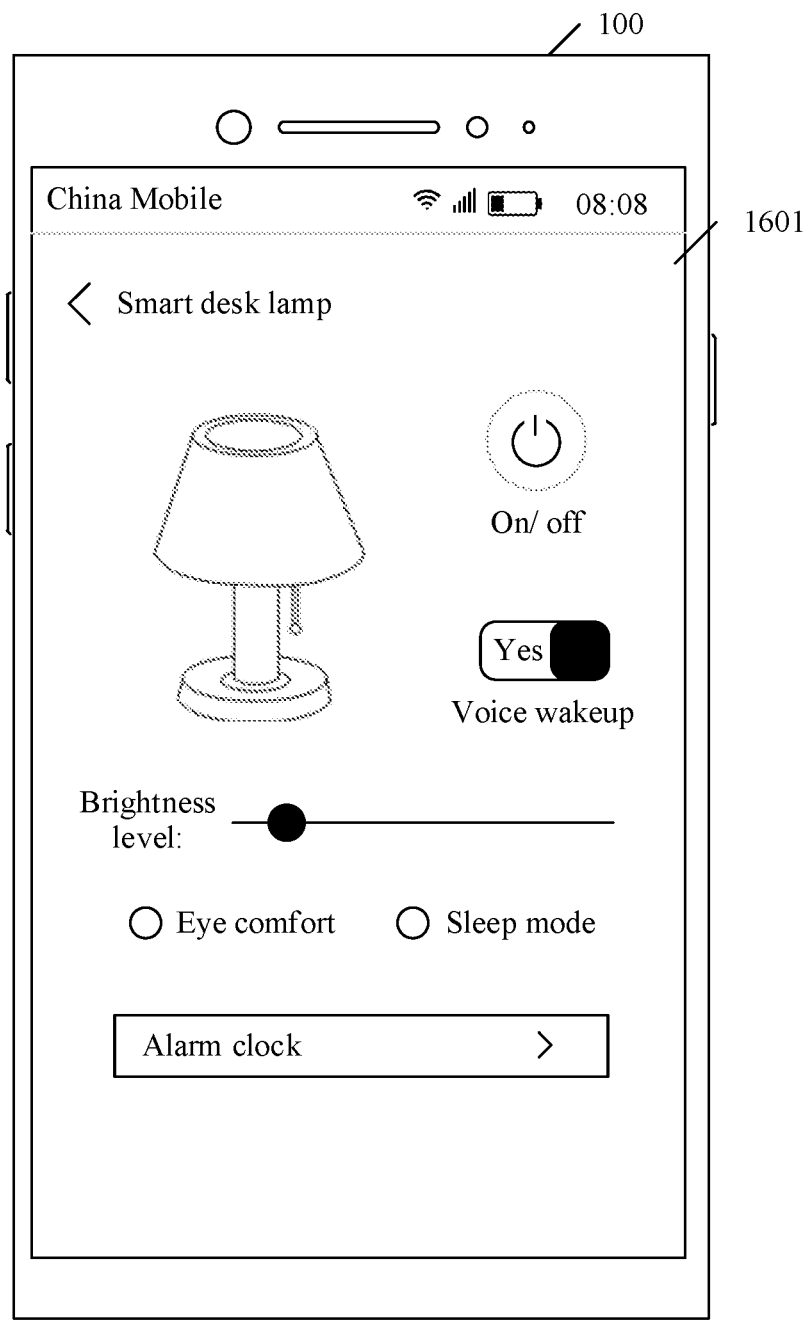
FIG. 16 is a schematic diagram of another display interface of an electronic device according to an embodiment of this application.

In response to a tap operation performed by the user on a management option of any home device on a home device management interface, the mobile phone 100 may display a control interface of the home device. For example, in response to a tap operation performed by the user on a "smart desk lamp" management option shown in FIG. 15B, the mobile phone 100 may display a control interface 1601 of the smart desk lamp shown in FIG. 16. An interface element in a control interface of each home device, a control instruction sent by the mobile phone 100 to the home device in response to an operation performed by the user on the control interface, and the like are determined by the mobile phone 100 based on first configuration information (for example, a specific Profile) of the home device.

An embodiment of this application provides a method for configuring home devices in batches. In the method, the mobile phone 100 may transmit network configuration information (including a registration credential, an SSID, an access password, and the like) to a plurality of home devices by broadcasting a first message. In this way, a home device within a safety distance (for example, a first distance) of the first message can receive the first message. The home device that receives the first message may perform asynchronous parallel network configuration by using the network configuration information in the first message.

In addition, using ultra-short-range communication can ensure that the first message sent by the mobile phone 100 is not received by another device, so that security of data transmission between the mobile phone 100 and the home device can be ensured, and user information security can be protected.

Further, the mobile phone 100 may update the network configuration state of the home device in time. For example, the mobile phone 100 may sequentially update the network configuration state of the home device from the first state information (for example, "to be network-configured") to the second state information (for example, "being network-configured") and the third state information (for example, "completed"). In this way, it can be convenient for the user to learn a network configuration progress of the home device, and user experience in a network configuration process of the home device can be improved.

Some other embodiments of this application provide an electronic device. The electronic device may include a touchscreen, a memory, and one or more processors. The touchscreen, the memory, and the processor are coupled. The memory is configured to store computer program code. The computer program code includes computer instructions. When the processor executes the computer instructions, the electronic device may perform the functions or steps performed by the mobile phone in the foregoing method embodiment. For a structure of the electronic device, refer to the structure of the electronic device 200 shown in FIG. 2.

Other embodiments of this application provide a display apparatus. The apparatus may be applied to an electronic device including the touchscreen. The apparatus is configured to perform functions or steps performed by the mobile phone in the foregoing method embodiment.

Figure 17:
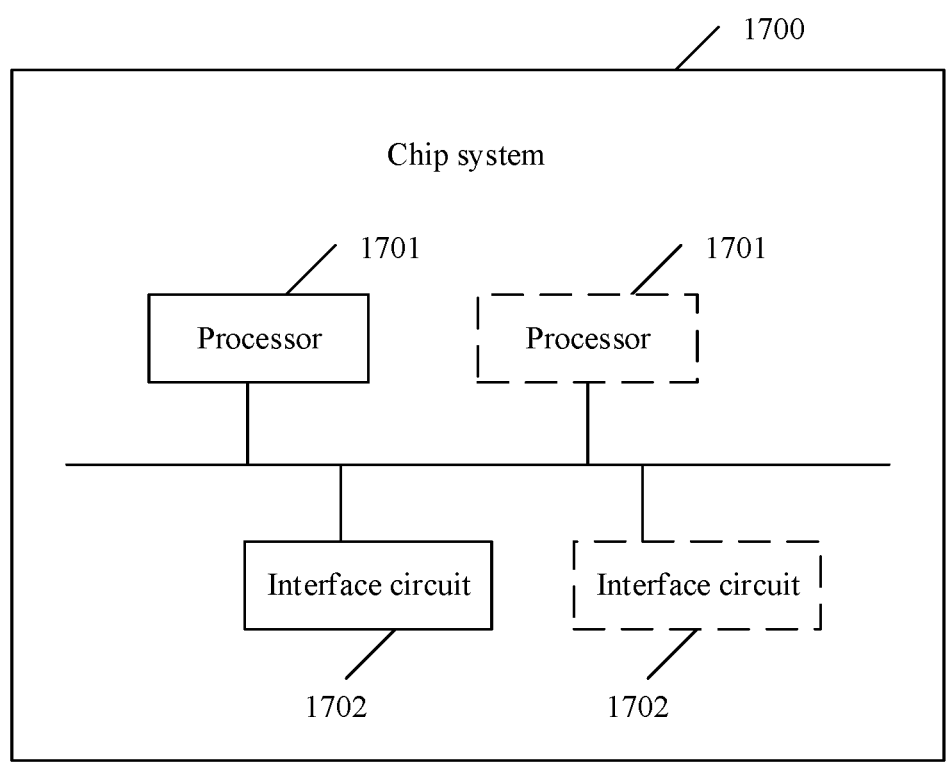
FIG. 17 is a schematic diagram of a structure of a chip system according to an embodiment of this application.

An embodiment of this application further provides a system-on-a-chip. As shown in FIG. 17, the system-on-a-chip 1700 includes at least one processor 1701 and at least one interface circuit 1702. The processor 1701 and the interface circuit 1702 may be interconnected by using a line. For example, the interface circuit 1702 may be configured to receive a signal from another apparatus (for example, a memory of an electronic device). For another example, the interface circuit 1702 may be configured to send a signal to another apparatus (for example, the processor 1701). For example, the interface circuit 1702 may read instructions stored in the memory, and send the instructions to the processor 1701. When the instructions are executed by the processor 1701, the electronic device may be enabled to perform the steps in the foregoing embodiments.

Certainly, the chip system may further include another discrete device. This is not specifically limited in this embodiment of this application.

An embodiment of this application further provides a computer storage medium. The computer storage medium includes computer instructions. When the computer instructions are run on the foregoing electronic device, the electronic device is enabled to perform functions or steps performed by a mobile phone in the foregoing method embodiments.

An embodiment of this application further provides a computer program product. When the computer program product is run on a computer, the computer is enabled to perform functions or steps performed by a mobile phone in the foregoing method embodiments.

The foregoing descriptions about implementations allow a person skilled in the art to clearly understand that, for the purpose of convenient and brief description, division of the foregoing functional modules is used as an example for illustration. In actual application, the foregoing functions can be allocated to different modules and implemented based on a requirement, that is, an inner structure of an apparatus is divided into different functional modules to implement all or some of the functions described above.

In the several embodiments provided in this application, it should be understood that the disclosed apparatus and method may be implemented in other manners. For example, the described apparatus embodiment is merely an example. For example, the module or division into the units is merely logical function division and may be other division in actual implementation. For example, a plurality of units or components may be combined or integrated into another apparatus, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may be one or more physical units, may be located in one place, or may be distributed on different places. Some or all of the units may be selected based on actual requirements to achieve the objectives of the solutions of embodiments.

In addition, functional units in embodiments of this application may be integrated into one processing unit, each of the units may exist alone physically, or two or more units may be integrated into one unit. The integrated unit may be implemented in a form of hardware, or may be implemented in a form of a software functional unit.

When the integrated unit is implemented in the form of a software functional unit and sold or used as an independent product, the integrated unit may be stored in a readable storage medium. Based on such an understanding, the technical solutions in embodiments of this application essentially, or the part contributing to the conventional technology, or all or some of the technical solutions may be implemented in the form of a software product. The software product is stored in a storage medium and includes several instructions for instructing a device (which may be a single-chip microcomputer, a chip or the like) or a processor (processor) to perform all or some of the steps of the methods described in embodiments of this application. The foregoing storage medium includes any medium that can store program code, such as a USB flash drive, a removable hard disk, a read only memory (read only memory, ROM), a random access memory (random access memory, RAM), a magnetic disk, or an optical disc.

The foregoing descriptions are merely specific implementations of this application, but are not intended to limit the protection scope of this application. Any variation or replacement within the technical scope disclosed in this application shall fall within the protection scope of this application. Therefore, the protection scope of this application shall be subject to the protection scope of the claims.

What is claimed is:

1. A method for configuring home devices in batches, used by an electronic device to perform batch network configuration for a plurality of home devices, wherein a first application (APP) is installed in the electronic device, the electronic device comprises a first antenna and a second antenna, a transmit distance of the first antenna is a first distance, a transmit distance of the second antenna is a second distance, the first distance is less than the second distance, and the method comprises:
  displaying, by the electronic device, a first interface of the first APP, wherein the first interface is used to trigger the electronic device to perform batch network configuration for the plurality of home devices;
  displaying, by the electronic device, a second interface in response to a first operation of a user on the first interface, wherein the second interface is used to set a quantity and at least one device type of home devices to be network-configured, and the device type is classified based on a function of the home device;
  receiving and displaying, by the electronic device, a quantity M that is set by the user on the second interface, and receiving and displaying a device type of M home devices that is set by the user on the second interface, wherein M≥2, and M is a positive integer;
  requesting, by the electronic device, a cloud server to allocate a registration credential to the M home devices in response to a second operation of the user on the second interface, wherein the cloud server is a server of the first APP; and
  broadcasting, by the electronic device, a first message by using the first antenna, wherein the first message comprises the registration credential, and a service set identifier (SSID) and an access password of a wireless local area network, and the first message is used to indicate the M home devices to access the wireless local area network and register with the cloud server based on the registration credential.

2. The method according to claim 1, wherein the method further comprises:
  displaying, by the electronic device, a third interface in response to the second operation of the user on the second interface, wherein the third interface comprises a first icon of each of the M home devices and first state information of each home device, the first icon is a general icon of home devices of a same device type, and the first state information is used to indicate that the home device is in a to-be-network-configured state.

3. The method according to claim 2, wherein after broadcasting, by the electronic device, the first message by using the first antenna, the method further comprises:
  receiving, by the electronic device, a first response message from a first home device, wherein the first response message is sent after the first home device receives the first message, and the first home device is any one of the M home devices; and
  updating, by the electronic device, first state information of the first home device on the third interface to second state information in response to the first response message, wherein the second state information is used to indicate that network configuration is being performed for the first home device.

4. The method according to claim 2, wherein the method further comprises:
  receiving, by the electronic device, first configuration information of the first home device from the cloud server, wherein the first configuration information comprises a second icon of the first home device, the first configuration information is determined based on a product type of the first home device, home devices of different product types have different first configuration information, and the second icon is a dedicated icon of home devices of a same product type; and
  updating, by the electronic device, a first icon of the first home device on the third interface to the second icon, and updating the first state information or the second state information of the first home device to third state information, wherein the third state information is used to indicate that network configuration for the home device succeeds, and the second state information is used to indicate that network configuration is being performed for the first home device.

5. The method according to claim 4, wherein the method further comprises:
  if the electronic device does not receive the first configuration information of the first home device from the cloud server within second preset duration starting from broadcasting the first message, updating, by the electronic device, the first state information or the second state information
  of the first home device on the third interface to fourth state information, wherein the fourth state information is used to indicate that network configuration for the first home device fails.

6. The method according to claim 4, wherein the first configuration information further comprises: an interface element and a control instruction that are used by the electronic device to remotely control a control page of the first home device via the first APP; and
  the method further comprises:
  controlling, by the electronic device, the first home device by using the first APP based on the control page and the control instruction of the first home device.

7. The method according to claim 1, wherein the requesting, by the electronic device, the cloud server to allocate the registration credential to the M home devices in response to the second operation of the user on the second interface comprises:
  sending, by the electronic device, a first request to the cloud server in response to the second operation, wherein the first request is used to request the cloud server to allocate the registration credential to the M home devices; and
  receiving, by the electronic device, a first response from the cloud server, wherein the first response comprises the registration credential.

8. The method according to claim 7, wherein the first request comprises indication information of the device type of the M home devices, and the first request is further used to obtain the first icon of the M home devices from the cloud server based on the indication information of the device type of the M home devices; and the first response further comprises second configuration information of the M home devices, and the second configuration information comprises the first icon of the M home devices.

9. The method according to claim 7, wherein the first request further comprises a quantity M of home devices to be network-configured.

10. The method according to claim 7, wherein the first request further comprises a first account used by the electronic device to log in to the first APP; and
the first message further comprises the first account.

11. The method according to claim 4, wherein before receiving, by the electronic device, the first configuration information of the first home device from the cloud server, the method further comprises:
sending, by the electronic device, a second request to the cloud server, wherein the second request comprises the first account used by the electronic device to log in to the first APP, wherein the receiving, by the electronic device, the first configuration information of the first home device from the cloud server comprises:
receiving, by the electronic device, a second response from the cloud server, wherein the second response comprises a device identifier and first configuration information of a home device that registers with the cloud server by using the first account, and the home device that registers with the cloud server by using the first account comprises the first home device.

12. A method for configuring home devices in batches, applied to a cloud server, wherein the method comprises:
receiving, by the cloud server, a first request from an electronic device, wherein the first request comprises a device type of M home devices, M≥2, and M is a positive integer;
allocating, by the cloud server, a first registration credential to the M home devices in response to the first request, and obtaining second configuration information of the M home devices based on the device type of the M home devices, wherein the second configuration information of the M home devices comprises a first icon of the M home devices, and the first icon is a general icon of home devices of a same device type;
sending, by the cloud server, a first response to the electronic device, wherein the first response comprises the registration credential and the second configuration information of the M home devices;
receiving, by the cloud server, a registration request from a first home device, wherein the first home device is any one of the M home devices, and the registration request comprises a second registration credential and a product serial number SN of the home device; and
allocating, by the cloud server, a device identifier to the first home device if authentication of the first home device succeeds, wherein that authentication of the first home device succeeds comprises that the second registration credential is the same as the first registration credential.

13. The method according to claim 12, wherein the registration request further comprises indication information of a product type of the home device; and
after allocating, by the cloud server, the device identifier to the first home device, the method further comprises:
sending, by the cloud server, first configuration information and the device identifier of the first home device to the electronic device, wherein the first configuration information comprises a second icon of the first home device, the first configuration information is determined based on a product type of the first home device, home devices of different product types have different first configuration information, and the second icon is a dedicated icon of home devices of a same product type.

14. The method according to claim 12, wherein the first request further comprises a first account used by the electronic device to log in to a first APP, the registration request further comprises a second account, and the second account is obtained by the first home device from a first message from the electronic device, wherein
that authentication of the first home device succeeds further comprises: the second account is the same as the first account.

15. The method according to claim 13, wherein before sending, by the cloud server, the first configuration information and the device identifier of the first home device to the electronic device, the method further comprises:
receiving, by the cloud server, a second request from the electronic device, wherein the second request comprises a first account used by the electronic device to log in to a first APP, wherein
the sending, by the cloud server, the first configuration information and the device identifier of the first home device to the electronic device comprises:
sending, by the cloud server, a second response to the electronic device, wherein the second response comprises a device identifier and first configuration information of a home device that registers with the cloud server by using the first account, and the home device that registers with the cloud server by using the first account comprises the first home device.

16. The method according to claim 12, wherein that authentication of the first home device succeeds further comprises at least one of the following conditions:
the second registration credential falls within a preset validity period; or
the first home device is an $(M-i)^{th}$ home device that registers with the cloud server by using the first account, i≥0, i is an integer, and the first request further comprises a quantity M.

17. An electronic device, comprising:
a first antenna and a second antenna, wherein a transmit distance of the first antenna is a first distance, a transmit distance of the second antenna is a second distance, the first distance is less than the second distance;
one or more processors; and
a memory coupled to the one or more processors and configured to store a code, wherein when executed by the one or more processors, the code causes the electronic device to perform:
displaying a first interface of a first application (APP) installed in the electronic device, wherein the first interface is used to trigger the electronic device to perform batch network configuration for a plurality of home devices;
displaying a second interface in response to a first operation of a user on the first interface, wherein the second interface is used to set a quantity and at least one device type of home devices to be network-configured, and the device type is classified based on a function of the home device;
receiving and displaying a quantity M that is set by the user on the second interface, and receiving and displaying a device type of M home devices that is set by the user on the second interface, wherein M≥2, and M is a positive integer;

requesting a cloud server to allocate a registration credential to the M home devices in response to a second operation of the user on the second interface, wherein the cloud server is a server of the first APP; and broadcasting a first message by using the first antenna, wherein the first message comprises the registration credential, and a service set identifier (SSID) and an access password of a wireless local area network, and the first message is used to indicate the M home devices to access the wireless local area network and register with the cloud server based on the registration credential.

18. The electronic device according to claim 17, wherein the code further causes the electronic device to perform:

displaying a third interface in response to the second operation of the user on the second interface, wherein the third interface comprises a first icon of each of the M home devices and first state information of each home device, the first icon is a general icon of home devices of a same device type, and the first state information is used to indicate that the home device is in a to-be-network- configured state.

19. The electronic device according to claim 18, wherein after broadcasting the first message by using the first antenna, the code further causes the electronic device to perform:

receiving a first response message from a first home device, wherein the first response message is sent after the first home device receives the first message, and the first home device is any one of the M home devices; and updating first state information of the first home device on the third interface to second state information in response to the first response message, wherein the second state information is used to indicate that network configuration is being performed for the first home device.

20. The electronic device according to claim 18, wherein the code further causes the electronic device to perform:

receiving first configuration information of the first home device from the cloud server, wherein the first configuration information comprises a second icon of the first home device, the first configuration information is determined based on a product type of the first home device, home devices of different product types have different first configuration information, and the second icon is a dedicated icon of home devices of a same product type; and updating a first icon of the first home device on the third interface to the second icon, and updating the first state information or the second state information of the first home device to third state information, wherein the third state information is used to indicate that network configuration for the home device succeeds, and the second state information is used to indicate that network configuration is being performed for the first home device.

\* \* \* \* \*